United States Patent [19]

Chan

[11] Patent Number: 5,488,709
[45] Date of Patent: Jan. 30, 1996

[54] CACHE INCLUDING DECOUPLING REGISTER CIRCUITS

[75] Inventor: Alfred K. Chan, Milpitas, Calif.

[73] Assignee: MOS Electronics, Corp., Sunnyvale, Calif.

[21] Appl. No.: 678,912

[22] Filed: Apr. 1, 1991

Related U.S. Application Data

[63] Continuation-in-part of Ser. No. 546,071, Jun. 27, 1990, abandoned.

[51] Int. Cl.$^6$ .............................. G06F 13/00; G06F 13/28
[52] U.S. Cl. .......................... 395/445; 395/458; 395/470; 395/476; 395/250
[58] Field of Search .................................. 395/425, 250, 395/470, 476, 458, 445

[56] References Cited

U.S. PATENT DOCUMENTS

| | | | |
|---|---|---|---|
| 4,075,686 | 2/1978 | Calle et al. | 395/275 |
| 4,371,927 | 2/1983 | Wilhite et al. | 395/250 |
| 4,403,288 | 9/1983 | Christian et al. | 395/275 |
| 4,577,293 | 3/1986 | Matick et al. | 395/425 |
| 4,620,275 | 10/1986 | Wallach et al. | 395/800 |
| 4,718,039 | 1/1988 | Aichelmann, Jr. et al. | 395/250 |
| 4,755,937 | 7/1988 | Glier | 395/425 |
| 4,888,741 | 12/1989 | Malinowski | 365/230.05 |
| 4,926,317 | 5/1990 | Wallach et al. | 395/400 |
| 5,056,002 | 10/1991 | Watanabe | 395/425 |
| 5,091,896 | 2/1992 | Sachs et al. | 395/250 |
| 5,193,175 | 3/1993 | Cutts, Jr. et al. | 395/575 |

OTHER PUBLICATIONS

Intel Corporation, "i486 Microprocessor Hardware Manual", 1990, pp. 6–1 to 6–39.

Primary Examiner—Glenn Gossage
Attorney, Agent, or Firm—Skjerven, Morrill, MacPherson, Franklin & Friel

[57] ABSTRACT

A memory cache apparatus compatible with a wide variety of bus transfer types including non-burst and burst transfers. The memory cache apparatus includes a random access memory, a host port, and a system port. The memory cache apparatus further includes an input register connected to the host port for selectively writing data to the random access memory and an output register connected to the system port for receiving data from the random access memory and selectively furnishing the data to the host port or the system port. In one embodiment, the input register is a memory write register, and the output register includes a read hold register and a write back register. A cache memory system decouples a main memory subsystem from a host data bus so as to accommodate parallel cache-hit and system memory transfer operations for increased system speed and to hide system memory write-back cycles from a microprocessor. Differences in the speed of the local and system buses are accommodated, and an easy migration path from non-burst mode microprocessor based systems to burst mode microprocessor based systems is provided. Various memory organizations are accommodated including direct-mapped or one-way set associative, two-way set associative, and four-way set associative.

26 Claims, 68 Drawing Sheets

KEY TO

| 03 | 02 | 01 | 00 |
|---|---|---|---|
| 48 | 07 | 66 | 2c |
| Valid & Dirty | Non-Valid | Non-Valid | Non-Valid |

FIG. 25

SPOE#
HPOEA#,
HPOEB#

KEY TO

| FIG. 30A |
| FIG. 30B |

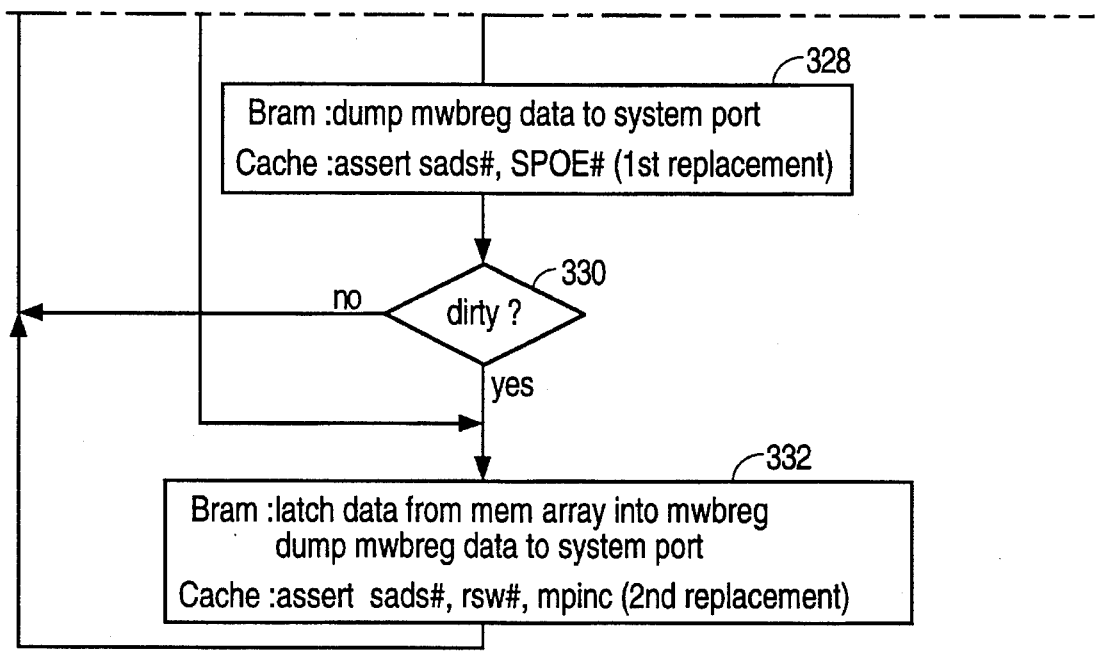
FIG. 54B
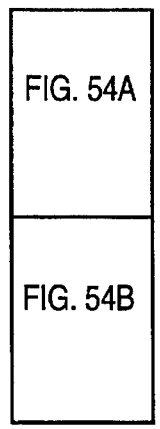

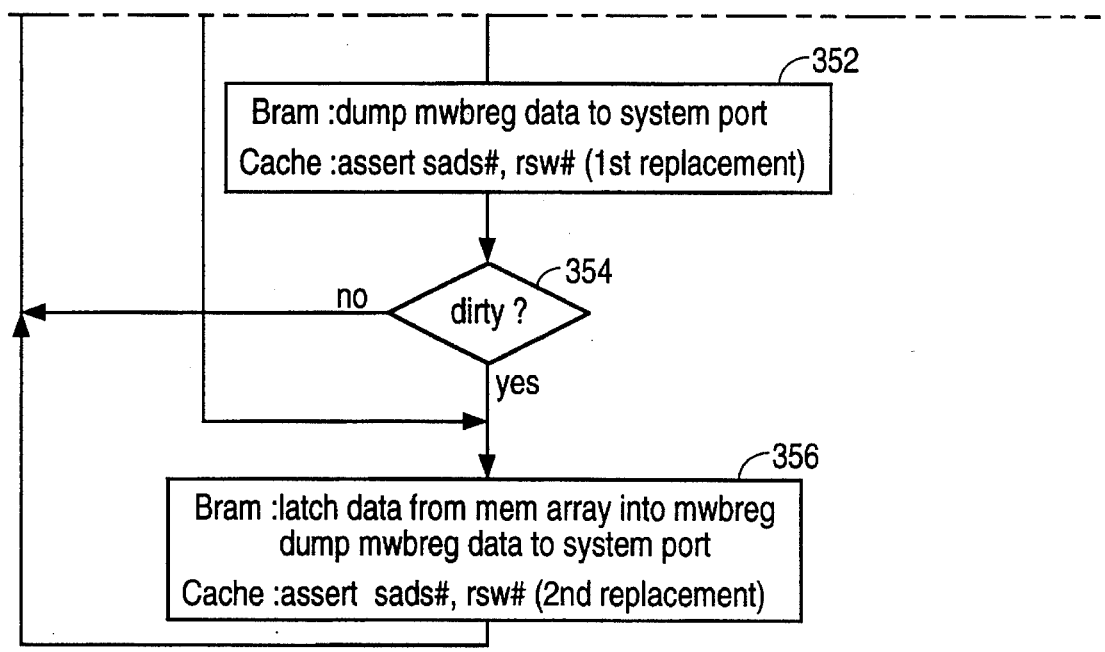
FIG. 55B
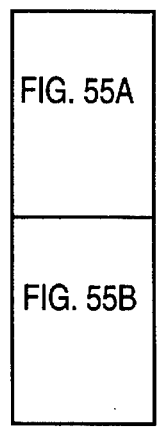
KEY TO FIG. 55
| FIG. 55A |
| FIG. 55B |

5,488,709

CACHE INCLUDING DECOUPLING REGISTER CIRCUITS

CROSS REFERENCE TO RELATED APPLICATION

This application is a continuation-in-part of copending, commonly assigned U.S. patent application Ser. No. 07/546,071 filed Jun. 27, 1990, now abandoned. The above-referenced application is incorporated herein by reference in its entirety.

BACKGROUND OF THE INVENTION

1. Field of the Invention

This invention relates to memory subsystems, and more specifically to random access cache memory systems.

2. Description of the Relevant Art

Various bus transfer mechanisms are used by present day microprocessors. The bus transfer mechanisms for two particularly popular microprocessors, the model 80386 and model 80486 microprocessors available from Intel Corporation, Santa Clara, Calif., are summarized below. Further detail is contained in various publications available from Intel Corporation, including the 386(Tm) DX Microprocessor Data Sheet, November 1989, and the i486(Tm) Microprocessor Data Sheet, April 1989.

In the model 80386 microprocessor, a complete data transfer to or from memory occurs during what is known as a "bus cycle." A bus cycle includes at least two "bus states;" a bus state is the shortest time unit of bus activity and requires one processor clock period. Additional bus states added to a single bus cycle are known as "wait states." The model 80386 microprocessor may be provided with either 16-bit or 32-bit wide memories. In a 16-bit system, each group of 16 bits is considered to be a physical word, and begins at an address that is a multiple of 2. In a 32-bit wide system, each group of 32 bits is considered to be a physical "doubleword," and begins at a byte address that is a multiple of 4. Memory addressing is flexible, and accommodates the transfer of, for example, a logical operand that spans more than one physical doubleword or one physical word, or that is a doubleword operand and begins at an address not evenly divisible by 4, or that is a word operand split between two physical doublewords. Dynamic data bus sizing is supported. The model 80386 microprocessor has separate, parallel buses for data and address. The data bus is 32-bits in width and is bi-directional. The address bus provides a 32-bit value using thirty signals for the thirty upper-order address bits, and four byte-enable signals to indicate the active bytes.

Many of the bus transfer features of the model 80386 microprocessor bus were provided in the model 80486 microprocessor bus. Some of these basic features are illustrated in FIGS. 1 and 2. FIG. 1 shows basic two clock, no wait state, single read and write cycles. The first cycle, a write cycle comprising bus states 1 and 2, is initiated when the address status signal ADS# (a "#" indicates an active low signal throughout the specification) is asserted at an edge of clock signal CLK in bus state 1. At this time, signal A2-A31 provides a valid address to the system memory; at a later time in bus state 1, signal D0-D31 makes available valid data to the system memory. When the system memory accepts data in accordance with write/read signal W/R#, the external system asserts the ready signal RDY#. In FIG. 1, this occurs at the end of bus state 2. The second cycle, a read cycle comprising bus states 3 and 4, is initiated when the address status signal ADS# is asserted at an edge of clock signal CLK in bus state 3. At this time, signal A2-A31 provides a valid address to the system memory. When the system memory returns data in accordance with write/read signal W/R#, the external system asserts the ready signal RDY#. In FIG. 1, this occurs at the end of bus state 4.

FIG. 2 shows the use of wait states. Wait states are used because the bus cycle time of many commercially available microprocessors is much shorter than the read/write time required by the conventional low cost DRAM memory generally used as system memory. A faster microprocessor must "wait" for the system memory to complete its read or write, which is accomplished by the insertion of one or more wait states into the bus cycle. For example, the second cycle of FIG. 2, which is a write cycle, includes three bus states 5, 6 and 7. Bus state 5 is analogous to bus state 1 of FIG. 1, while bus state 7 is analogous to bus state 2 of FIG. 1. Bus state 6 is a wait state, inserted because the ready signal READY# was not asserted until bus state 7. Additional wait states are asserted if necessary. The address and bus cycle definition remain valid during all wait states. Similarly, the third bus cycle, a read cycle, includes three bus states 8, 9 and 10, bus state 9 being a wait state.

The model 80486 microprocessor provides a number of additional features, including an internal cache, a burst bus mechanism for high-speed internal cache fills, and four write buffers to enhance the performance of consecutive writes to memory. Accordingly, the model 80486 microprocessor supports not only single and multiple non-burst, non-cacheable cycles, but also single and multiple burst or cacheable cycles.

Burst memory access is used to transfer data rapidly in response to bus requests that require more than a single data cycle. During a burst cycle, a new data item is strobed into the microprocessor every clock. The fastest burst cycle (no wait state) requires two clocks for the first data item (one clock for the address, one clock for the corresponding data item), with subsequent data items returned from sequential addresses on every subsequent clock. Note that in non-burst cycles, data is strobed at best in every other clock.

Burst mode operation is illustrated in FIG. 3. A burst cycle, a burst read in FIG. 3, begins with an address being driven and signal ADS# being asserted during the first bus state 12, just as in a non-burst cycle. During the four subsequent bus states, four data items 15, 17, 19 and 21 are returned. Note that during a burst cycle, ADS# is driven only with the first address. The addresses of the data occur within the same 16-byte aligned area, so that external hardware is able to calculate the addresses of the subsequent transfers in advance of the next bus state. For a word size of 32 bits, for example, the cache line is four words. The burst mode is indicated when burst ready signal BRDY# is driven active and signal RDY# is driven inactive at the end of each bus state 14, 16, 18 and 20 in the burst cycle. The external memory in signaled to end the burst when the last burst signal BLAST# is driven active at the end of the last bus state 20 in the burst cycle.

Cache memory systems have been developed to permit the efficient use of low cost, high capacity DRAM memory. Cache memory subsystems store recently used information locally in a small, fast memory. When bus transfers are limited to the microprocessor-cache data path, system speed increases.

Cache memory may be internal to the microprocessor, as in the model 80486 microprocessor of the Intel Corporation, or external. An example of an external cache memory for a typical computer system is illustrated in FIG. 4. Microprocessor 22 is connected to a local address bus 24 and a local data bus 26. Similarly, cache memory 28 is connected to the local address bus 24 and the local data bus 26. If cache controller 30 determines that data corresponding to the address requested is resident in the cache memory 28, the data is transferred over the local data bus 26. If cache controller 30 determines that the data is not resident in the cache memory 28, the address and data are transferred through cache bus buffer/latch 32A and 32B respectively to the system bus 34. Cache bus buffer/latch 32A and 32B are controlled by cache bus controller 36, which receives control information from cache controller 30. System memory 38 and system peripherals 40 are connected to the system bus 34.

The concept of "cacheable cycles" may be understood with reference to FIG. 5, which shows signals typically used in connection with the internal cache of the model 80486 microprocessor of Intel Corporation. Four data items are read from the high speed internal cache memory to the microprocessor in eight clocks without wait states. A cycle is initiated when the address status signal ADS# is asserted during bus state 42. Bus state 42 involves a cache fill, as established by activation of the cache enable signal KEN#. The signal BLAST# remains inactive during bus state 42. The first cycle terminates with the data transfer to the processor in bus state 44. Three additional data cycles consisting of, respectively, bus states 46 and 48, bus states 50 and 52, and bus states 54 and 56, are needed to complete the cache fill. Signal BLAST# remains inactive until the last transfer in the cache line fill, which occurs in bus state 56.

Cache memory has been used for burst transfers, as shown in FIG. 3. A cache fill is indicated when the signal KEN# is activate and the signal BLAST# is inactive during bus state 12. The signal BLAST# remains unknown in successive bus states 14, 16 and 18 and is activated only in the fourth successive bus state 20, so that four data items may be burst in succession. The external system informs the microprocessor that it will burst the line in by driving signal BRDY# active during the four successive bus states 14, 16, 18 and 20 in which data is transferred.

At some point after a cache write hit, main memory must be updated. The most widely used methods of updating main memory are write-through and write-back. In write-through, main memory is automatically updated at the same time the cache is written. The processor must wait until the write is completed before it may resume execution. A variation, usually called "posted" write-through, uses a buffer into which the write data is latched while the processor continues execution. The latched data is then written to main memory whenever the system bus is available. In a write-back cache, new data written to cache is not passed on to main memory until a replacement cycle occurs.

SUMMARY OF THE INVENTION

The cache memory system according to the present invention is compatible with a wide variety of bus transfer types, including non-burst and burst transfers. In burst mode, a "demand word first" wrapped around quad fetch order is supported.

The cache memory system of the present invention decouples the main memory subsystem from the host data bus, so as to accommodate parallel cache-hit and system memory transfer operations for increased system speed, and to hide system memory write-back cycles from the microprocessor. Differences in the speed of the local and system buses are accommodated, and an easy migration path from non-burst mode microprocessor based systems to burst mode microprocessor based systems is provided. In addition, various memory organizations are accommodated, including direct-mapped or one-way set associative, two-way set associative, and four-way set associative.

These and other advantages are achieved in the present invention, in accordance with which a memory cache apparatus comprises a random access memory, a host port, and a system port. The memory cache apparatus further comprises an input latch connected to the host port for selectively writing data to the memory and an output register connected to the system port for receiving data from the memory and selectively furnishing the data to the host port or to the system port. In one embodiment, the input latch is a memory write register, and the output register comprises a read hold register for furnishing data to the host port and a write back register.

The invention will be more readily understood by reference to the drawings and the detailed description. As will be appreciated by one skilled in the art, the invention is applicable to cache memory systems in general, and is not limited to the specific embodiment disclosed.

BRIEF DESCRIPTION OF THE DRAWINGS

FIGS. 9, 9A-1 and 9A-2 are diagrams illustrating a direct-mapped, one-way associative cache having one bank.

FIGS. 10, 10A-1 and 10A-2 are diagrams illustrating a two-way set associative cache having two banks.

FIG. 25 shows an example cache line used in the operation of the system to host port bypass sequence of FIG. 26.

FIGS. 54A and 54B are a state diagram illustrating sequencing during a read tag miss operation.

FIGS. 55A and 55B are a state diagram illustrating sequencing during a write tag miss operation.

DESCRIPTION OF THE EMBODIMENTS

The following includes a detailed description of the best presently contemplated mode for carrying out the invention. The description is intended to be merely illustrative of the invention and should not be taken in a limiting sense.

Figure 6:
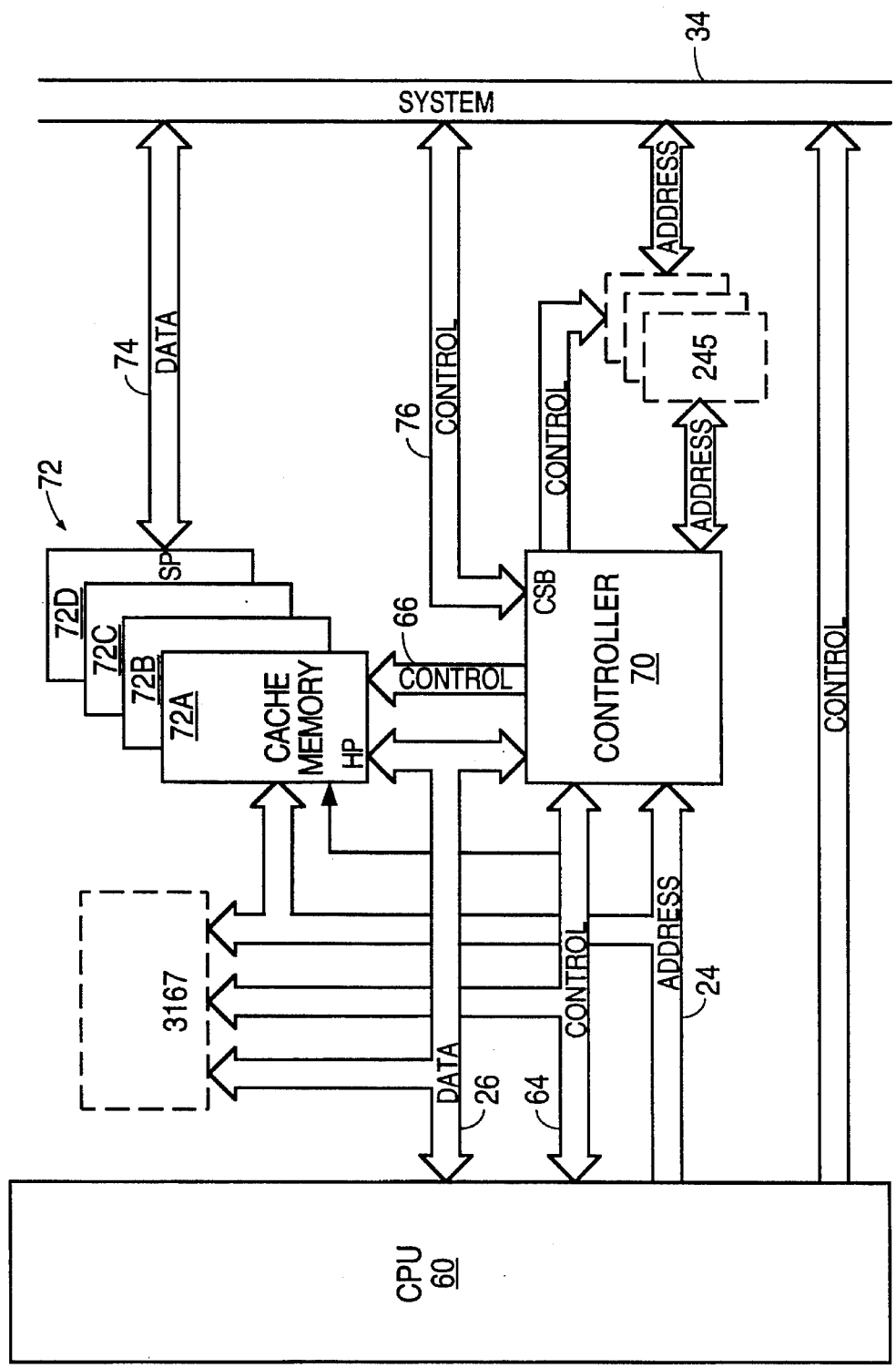
FIG. 6 is a block diagram of a computer system using a cache memory in accordance with the present invention based on the model 80386 microprocessor.

A burst RAM cache memory in accordance with the present invention is suitable for use with a variety of microprocessors. A block diagram of a computer system based on the model 80386 microprocessor 60 is shown in FIG. 6. The cache memory 72 consists of four substantially identical byte-wide burst RAM memory ICs 72A, 72B, 72C and 72D to support the 32-bit (4-byte) bus system. Address information is transferred between the microprocessor 60, the cache controller 70, and cache memory 72 over local address bus 24, while data is transferred between the microprocessor 60, the cache controller 70, and the host port HP of the cache memory 72 over the local data bus 26. Control signals are communicated between microprocessor 60 and cache controller 70 over control line 64, and control signals are communicated to the cache memory 72 over control line 66. The cache memory 72 is also provided with a system port SP, which is connected over a bidirectional multiple signal line 74 to the system bus 34. The cache controller 70 is provided with a system bus control port CSB, which is connected over a bidirectional multiple signal line 76 to the system bus 34.

Figure 7:
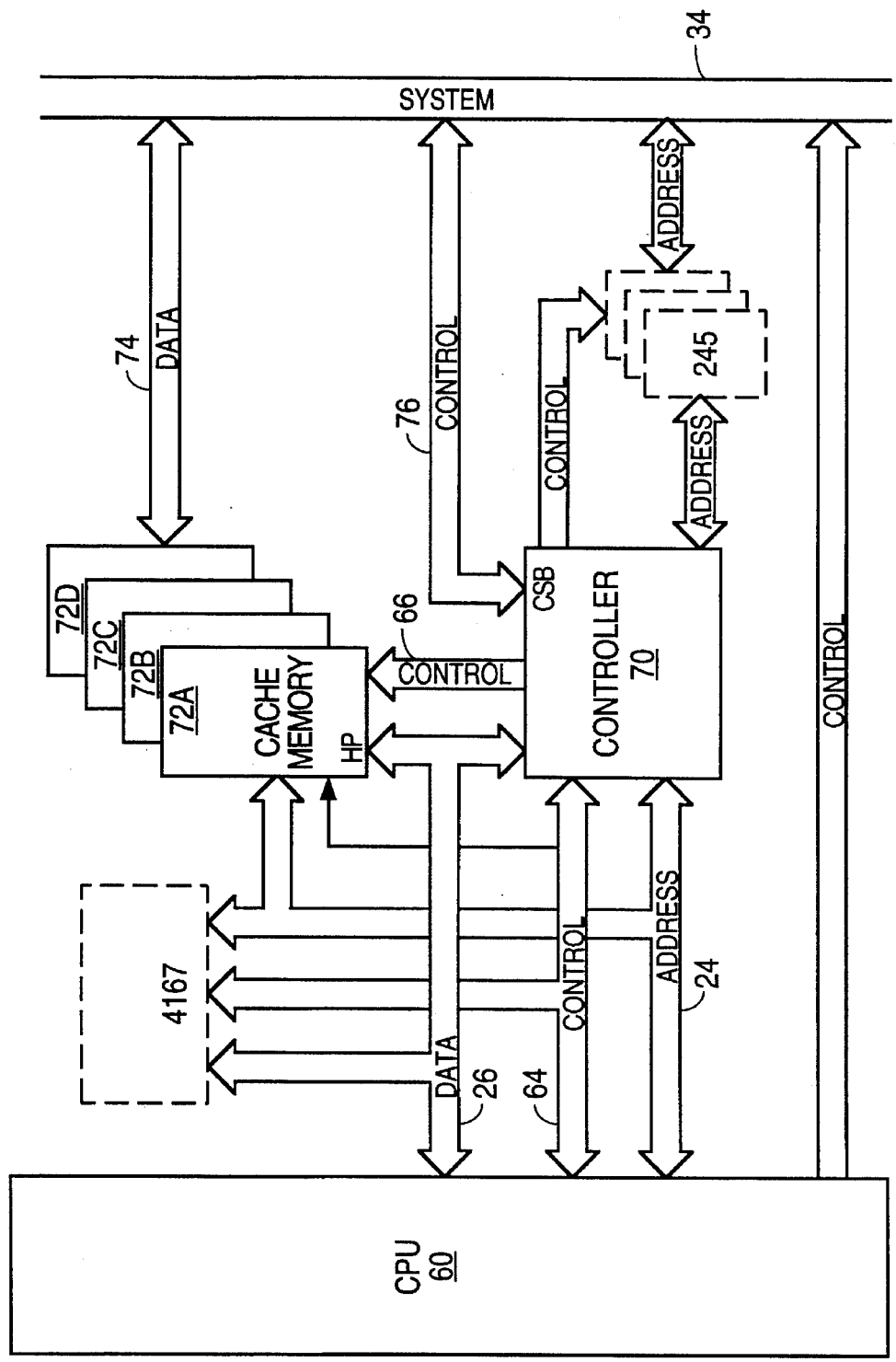
FIG. 7 is a block diagram of a computer system using a cache memory in accordance with the present invention based on the model 80486 microprocessor.

A block diagram of a computer system based on the model 80486 microprocessor 62 is shown in FIG. 7. The system illustrated in FIG. 7 is similar to that of FIG. 6 with the exception of the address bus connected to microprocessor 62 which is, in FIG. 7, bidirectional. During normal operation, address bus 27 is driven by microprocessor 62. The address bus 27 is driven through the system bus, during a cache invalidation cycle.

Figure 8A:
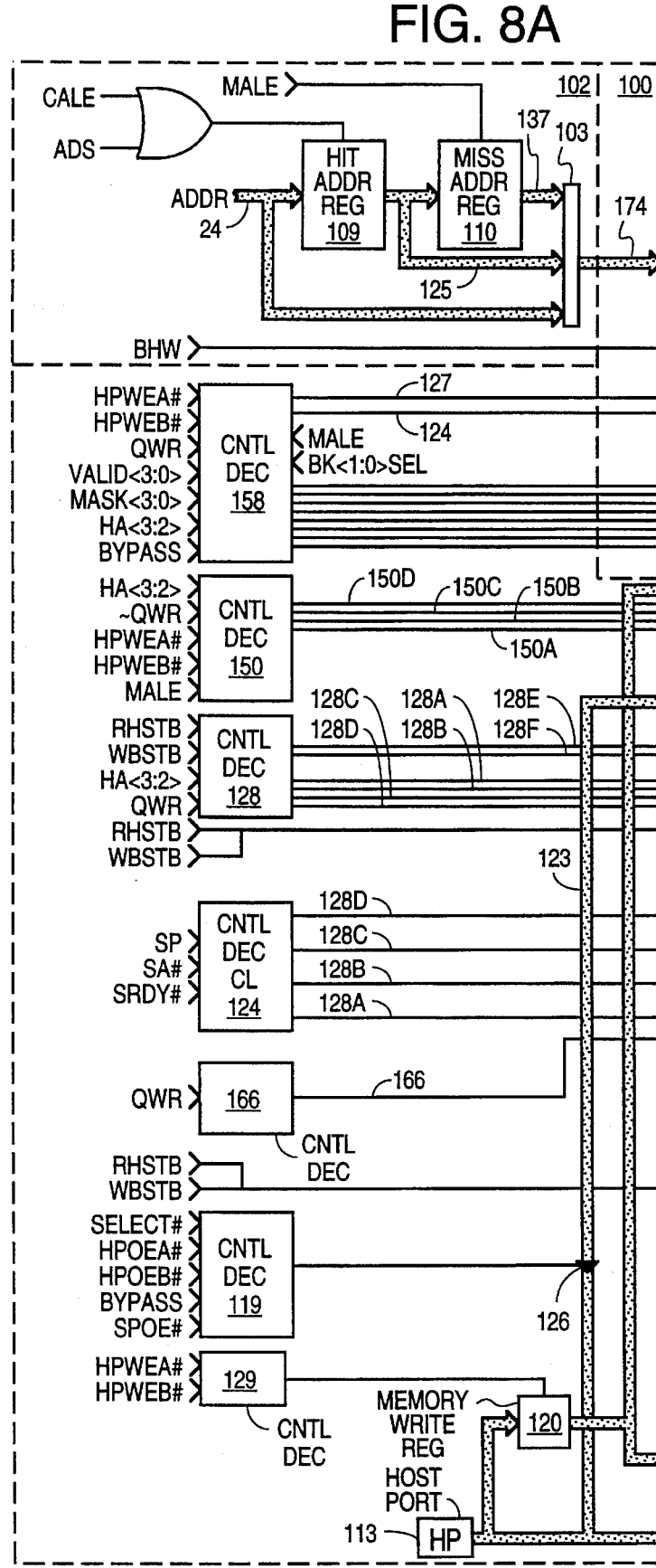
FIGS. 8A, 8B and 8C, which are generally referred to as FIG. 8 throughout the specification, are a block diagram of the data path of a burst RAM cache memory in accordance with the present invention.
Figure 8B:
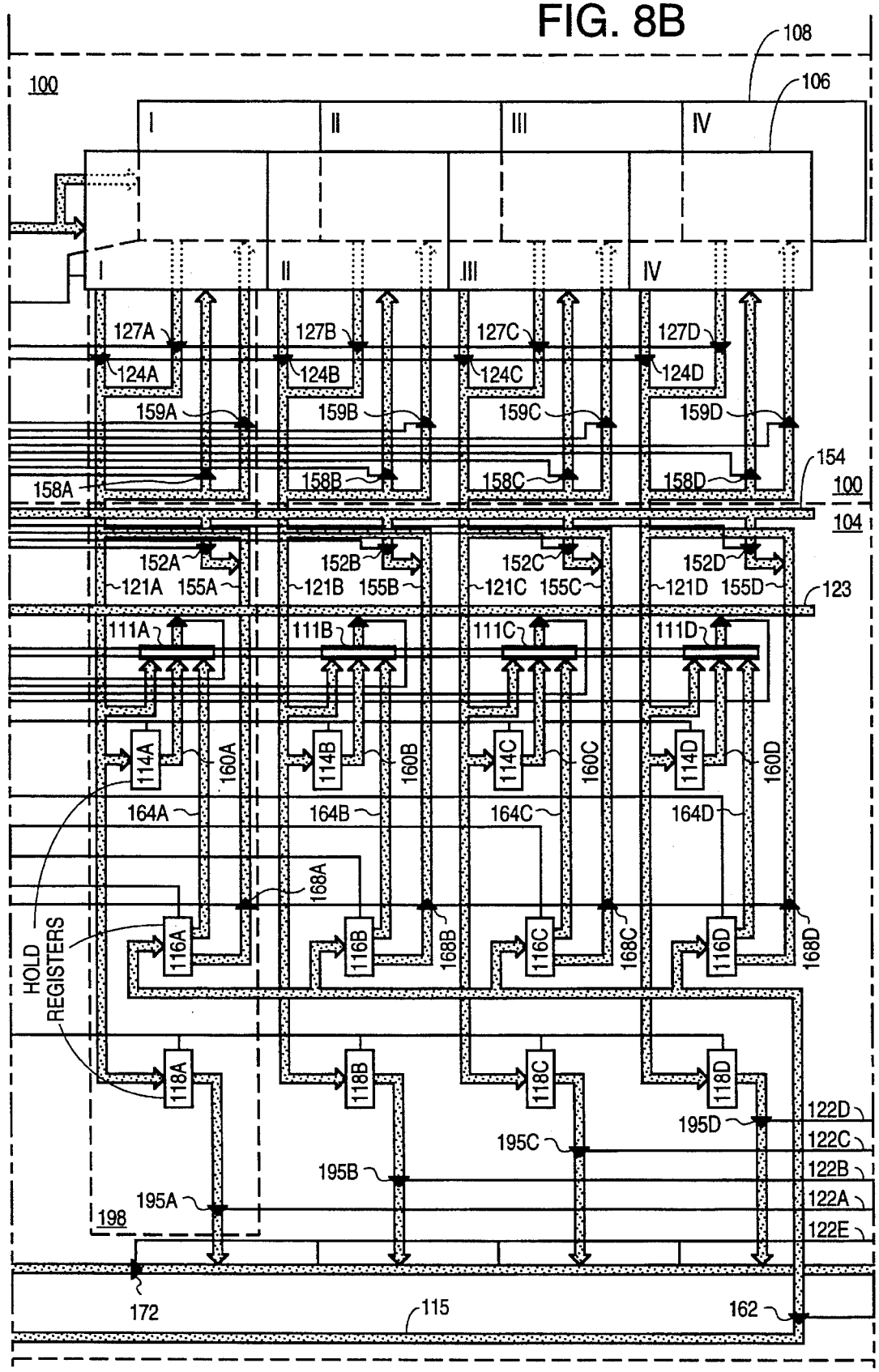
Figure 8C:
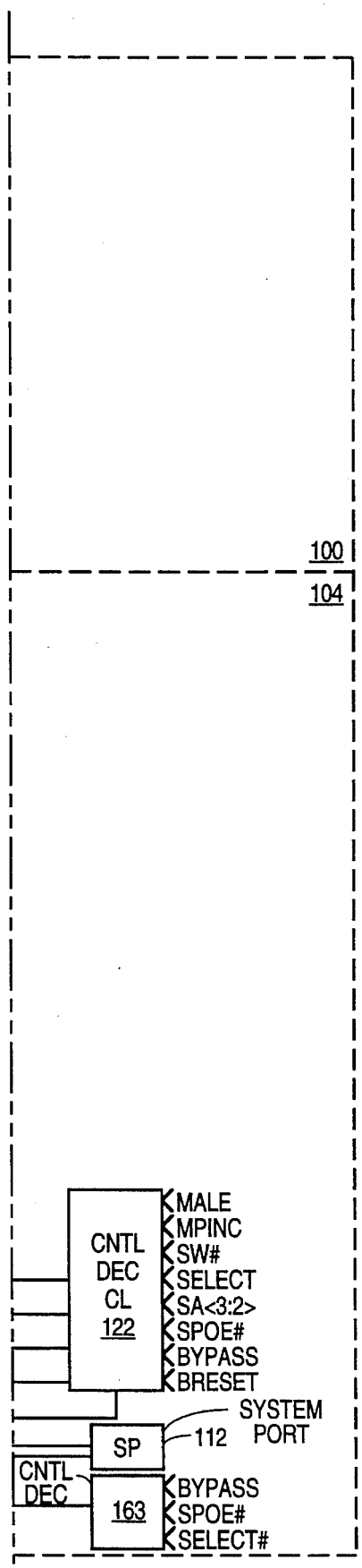
Figure 8:
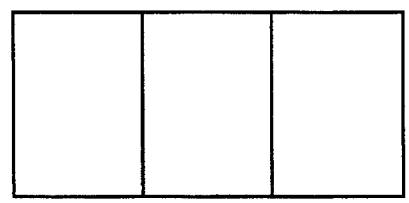

Referring next to FIGS. 8A–8C (comprising FIGS. 8A, 8B, and 8C), a diagram of the burst RAM cache memory chip in accordance with the invention is shown. The burst RAM memory chip is illustrative of each of the burst RAM memory chips 72A–72D of FIGS. 6 and 7. The three major sections of the burst RAM memory chip as shown in FIG. 8 are the RAM array section 100, the address latches and multiplexer section 102, and the control logic and transceivers section 104. The burst RAM memory chip is also shown with control signal lines within each section which illustrate some of the control signals for control of the data paths. The details of how the control signals affect data flow are discussed below.

The organization of RAM array section 100 is first considered. The RAM array section 100 is organized as a two-way set associative cache without data buffers, and includes two banks 106 and 108 of 2k×36 bit static random access memory ("SRAM") (plus parity bits). The two bank division readily accommodates for either a two-way set associative cache or a 64K byte direct-mapped cache. In addition, more burst RAM memory chips can be added for larger caches.

Each bank 106 and 108 of RAM array section 100 is divided into four subarrays I–IV. Each subarray includes 2k×8 bit memory locations and further includes a parity bit associated with each 8-bit memory location.

An address bus 174 is connected to and provides addressing signals to each of banks 106 and 108. The addressing signals are decoded within each of the banks 106 and 108 to thereby select one of the 2k locations within each subarray I–IV.

As noted, RAM array section 100 is suitable for many memory organizations, including a direct mapped cache organization and a two-way set associative organization. The concepts needed to understand these various memory organizations are illustrated in FIGS. 9, 9A-1, 9A-2, 10, and 10A, respectively. Associativity refers to the number of banks of the cache into which a memory block may be mapped. A bank, also known as a frame, is the basic unit into which a cache memory is divided. A direct-mapped (one-way associative) cache such as that shown at 60 in FIG. 9 has one bank 61. A two-way set associative cache such as that shown at 70 in FIG. 10 has two banks 71A and 71B. A bank is equal to the cache size in a direct-mapped cache and one-half the cache size in a two-way set associative cache.

A "page," which corresponds in size to a cache bank, is the basic unit into which the physical address space is divided. For example, in FIGS. 9 and 10, page 0 is shown at 63A in physical memory 62, at 73A in physical memory 72, and at 83A in physical memory 82 respectively. Both memory banks and "pages" are subdivided into blocks; a block is the basic unit of cache addressing. Blocks are shown at 64A and 64B, and at 74A and 74B in FIGS. 9 and 10 respectively.

Cache address information is stored in a directory. For the direct-mapped cache of FIG. 9, the single directory 65 includes 2048 cache address entries, each with three bit fields. The first bit field is a 12-bit directory tag for selecting one of the 2 EXP 12 pages of main memory. The second bit field is an 12-bit set address for selecting one of the 2048 sets in the cache. The third bit field is a 3-bit line address for selecting one of eight lines in a set.

Figure 10:
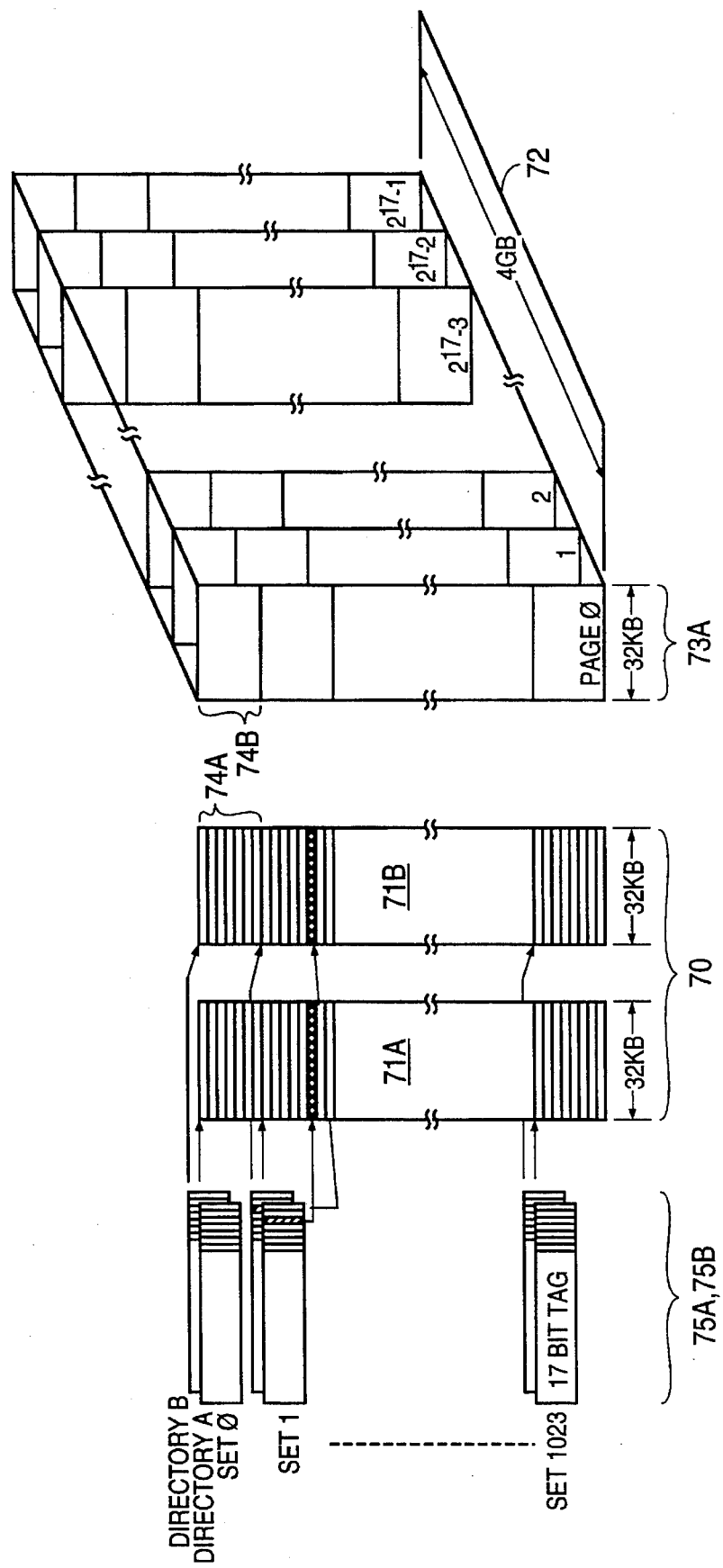

For the two-way associative cache of FIG. 10, each of the two directories 75A and 75B includes 1024 cache address entries, each with three bit fields. The first bit field is a 17-bit directory tag for selecting one of the 2 EXP 17 pages of main memory. The second bit field is a 10-bit set address for selecting one of the 1024 sets in the cache. The third bit field is a 3-bit set address for selecting one of eight lines in a set.

The term "directory tag" used above refers to that part of a directory entry containing the memory page address from which that particular block was copied. Any block with the same offset within a page may be mapped to the same offset location in a bank. The tag identifies the page from which the block came.

The term "set" used above refers to all of the directory entries associated with a particular block offset. The number of sets equals the number of blocks. In a two-way set associative organization, a set has two entries, each pointing to a different bank.

The term "line" used above refers to the basic unit of data transferred between the cache and main memory. A block consists of contiguous lines. Each line in a block has a corresponding "line valid" bit in the block directory entry. Line valid bits are set when the line is written and are cleared when the block tag changes. The number of lines in a block and the line size is determined by the number of valid bits in each directory entry or by cache controller convention. For example, although each directory entry for the cache memory chip of FIGS. 8A–8C could have enough valid bits to give each 32-bit doubleword in the block a valid bit, the associated cache controller instead operates on four doublewords as a line. A "hit" or "miss" decision is based on the presence or absence of a line within the cache. It is noted that the cache controller 70 associated with the cache memory chip of FIGS. 8A–8C designates two lines for each tag, and hence, there are eight thirty-two bit doublewords per tag.

Figure 1:
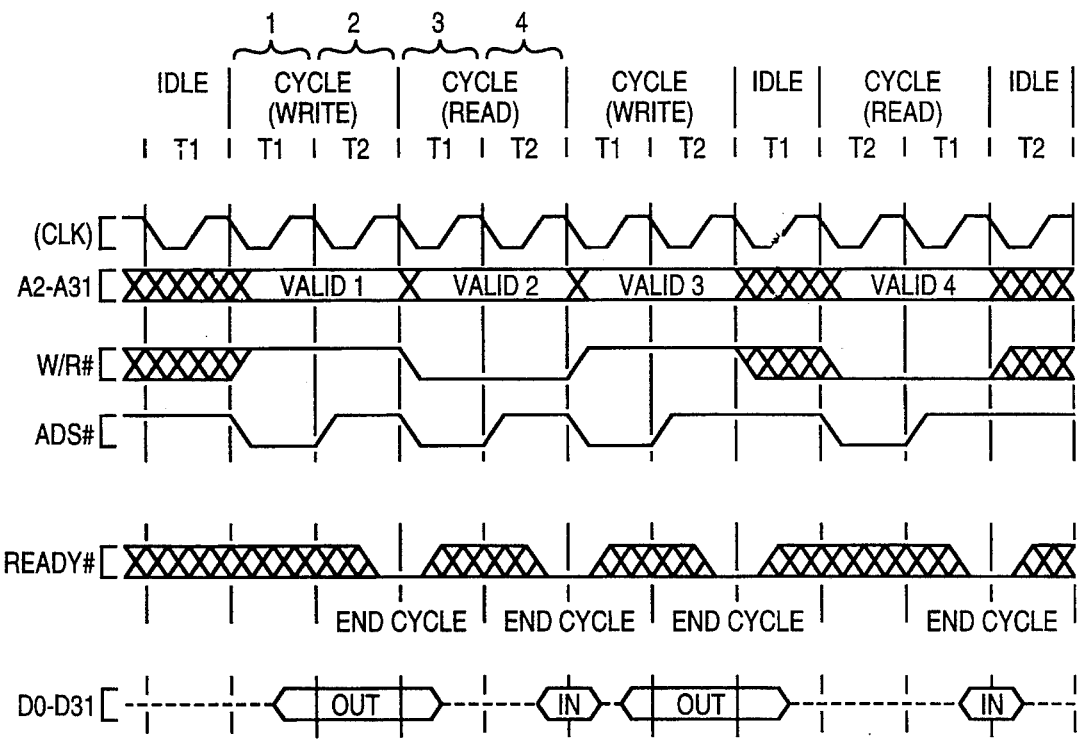
FIG. 1 (Prior Art) is a set of waveforms illustrating two clock, no wait state, single read and write cycle bus transfer features of the 80386 and 80486 microprocessors.
Figure 2:
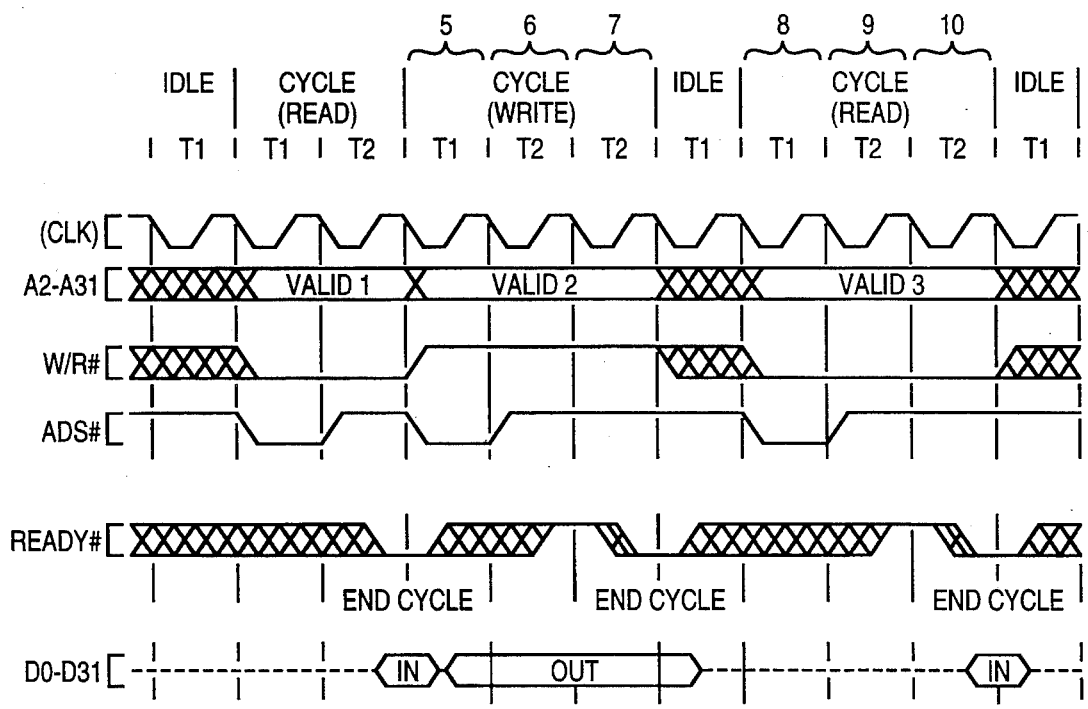
FIG. 2 (Prior Art) is a set of waveforms illustrating the use of wait states in basic bus transfer features of the 80386 and 80486 microprocessors.
Figure 3:
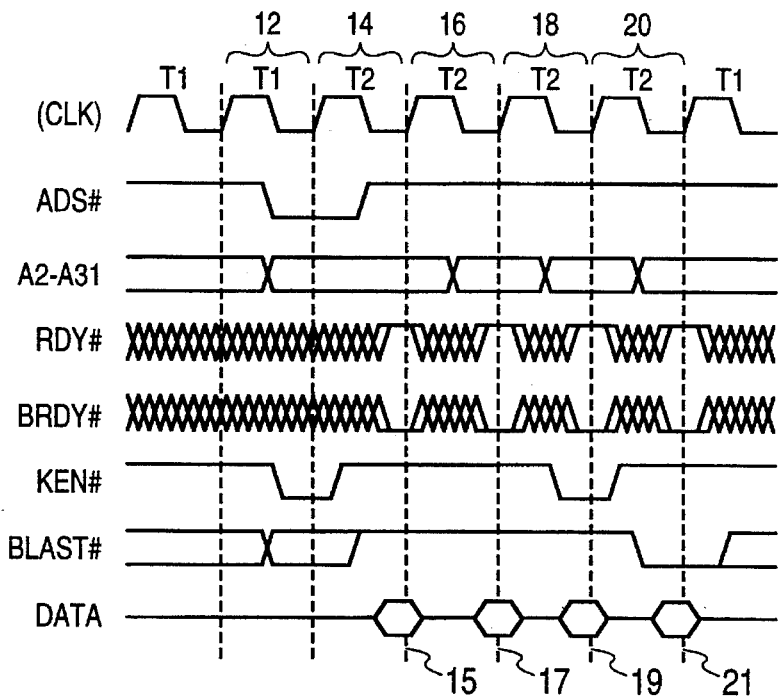
FIG. 3 (Prior Art) is a set of waveforms illustrating a burst read operation of the 80486 microprocessor.
Figure 5:
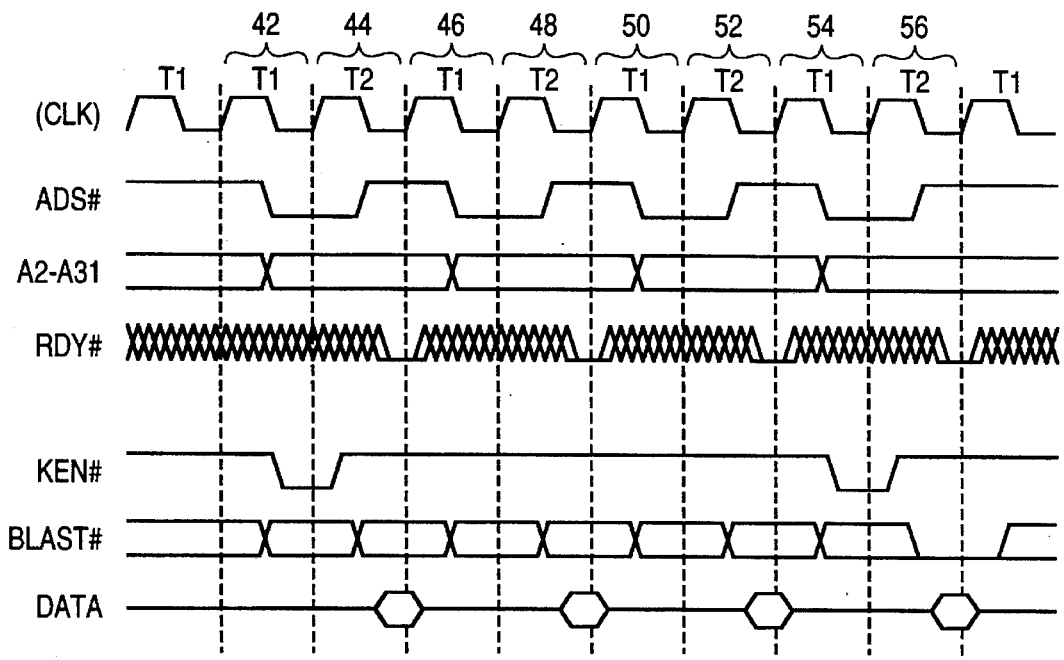
FIG. 5 (Prior Art) is a set of waveforms typically used in connection with the internal cache of the 80486 microprocessor.
Figure 4:
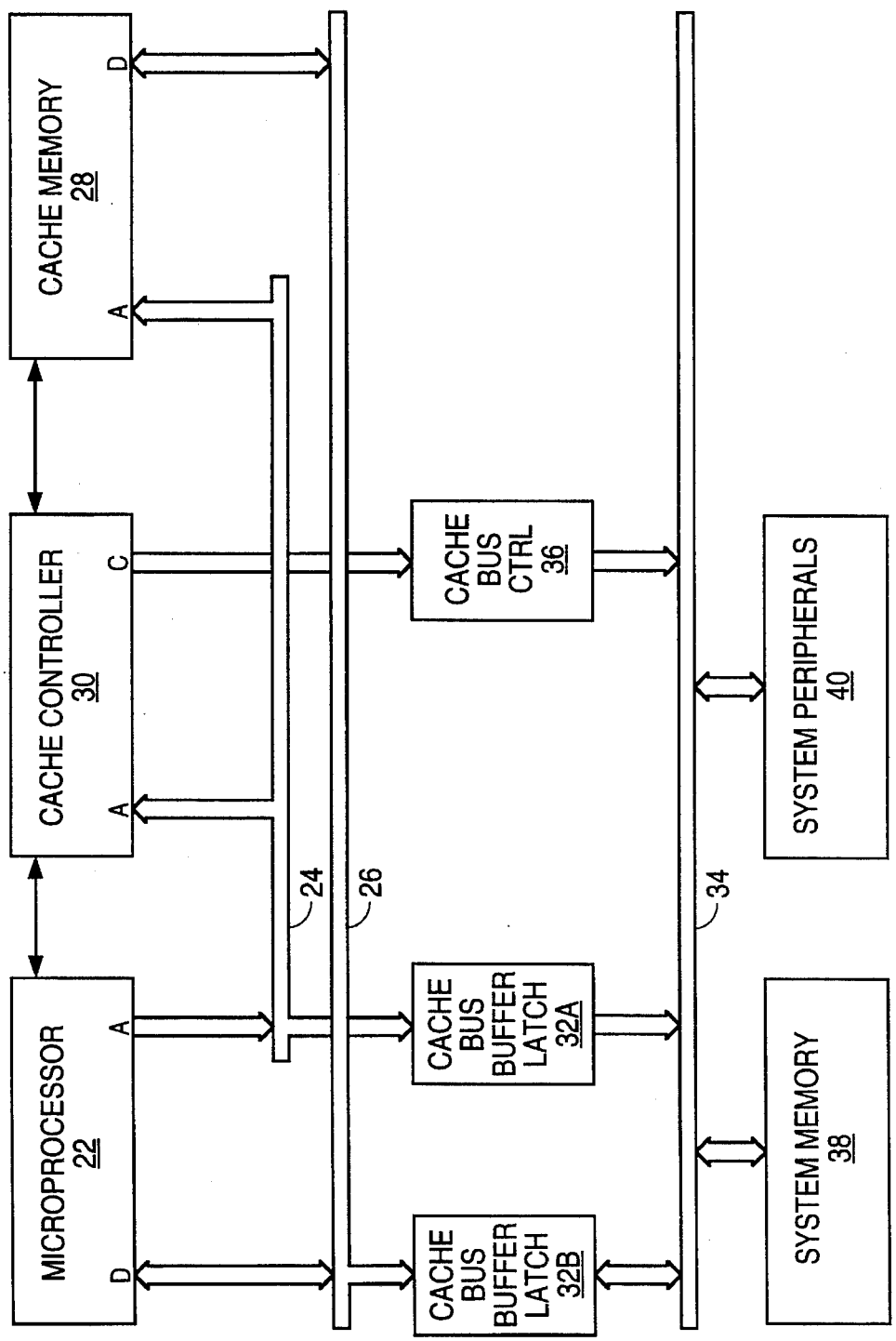
FIG. 4 (Prior Art) is a block diagram illustration of an external cache memory for a typical computer system.
Figure 9:
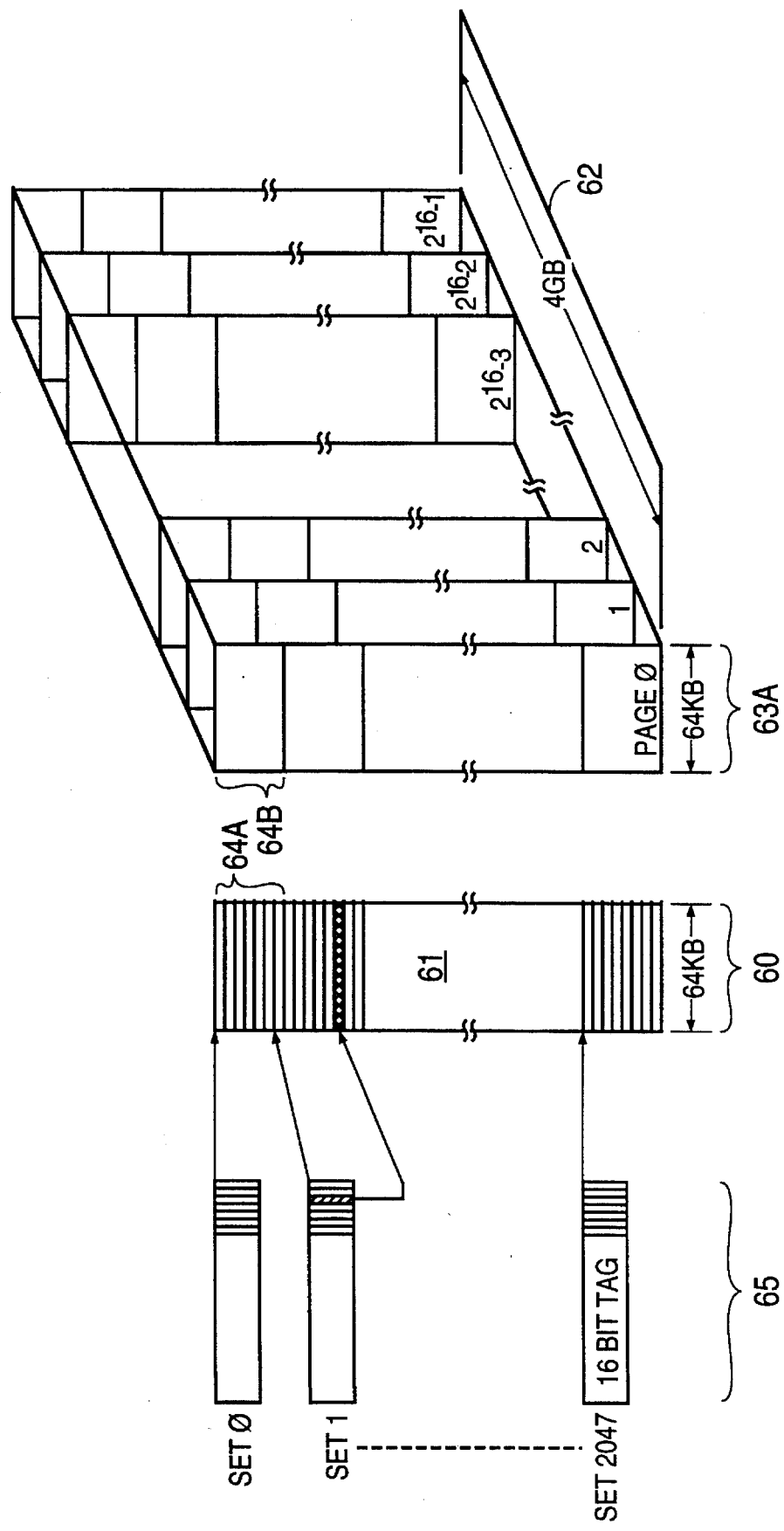
Figures 1, 9A:
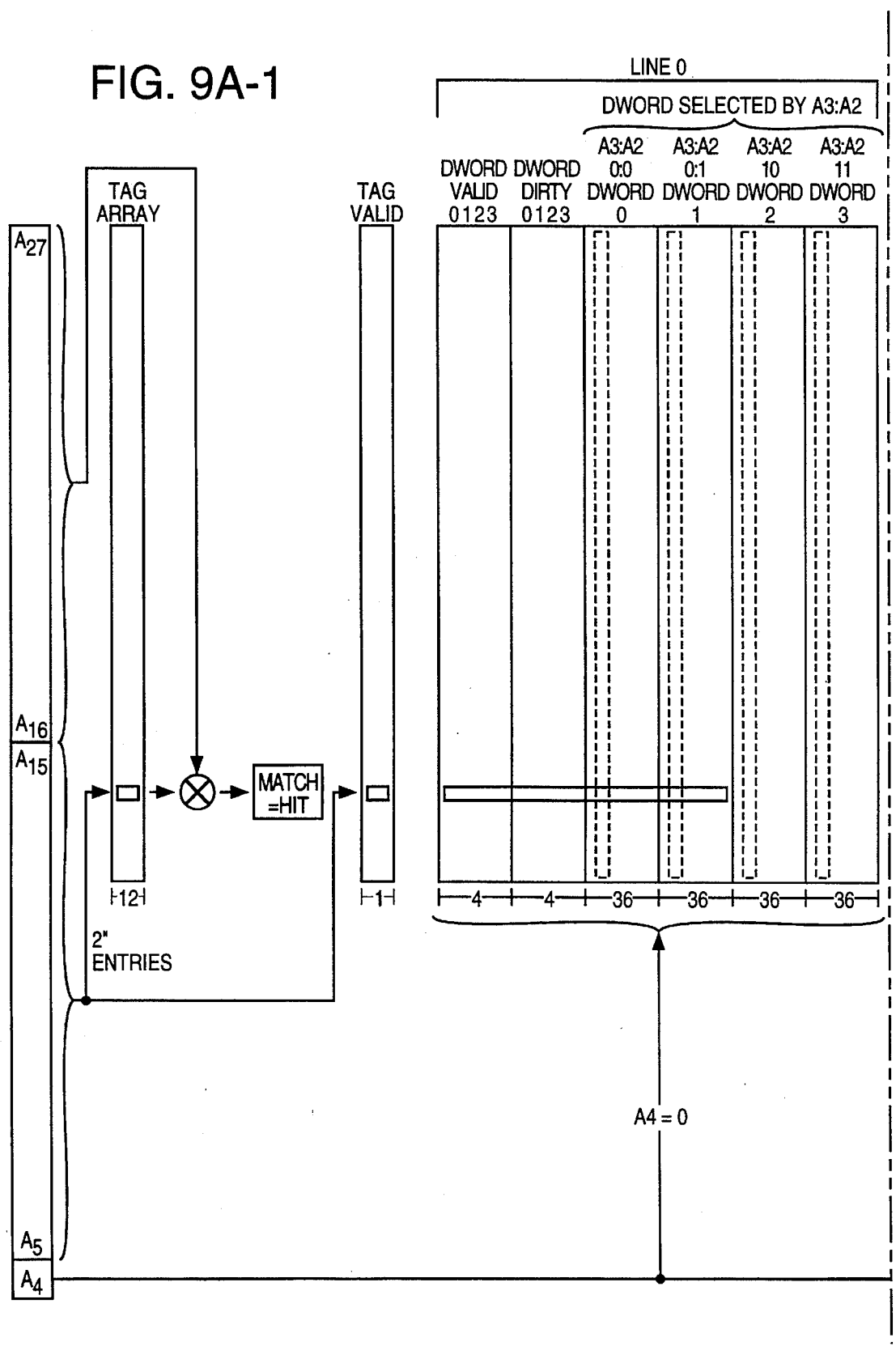
Figures 2, 9A:
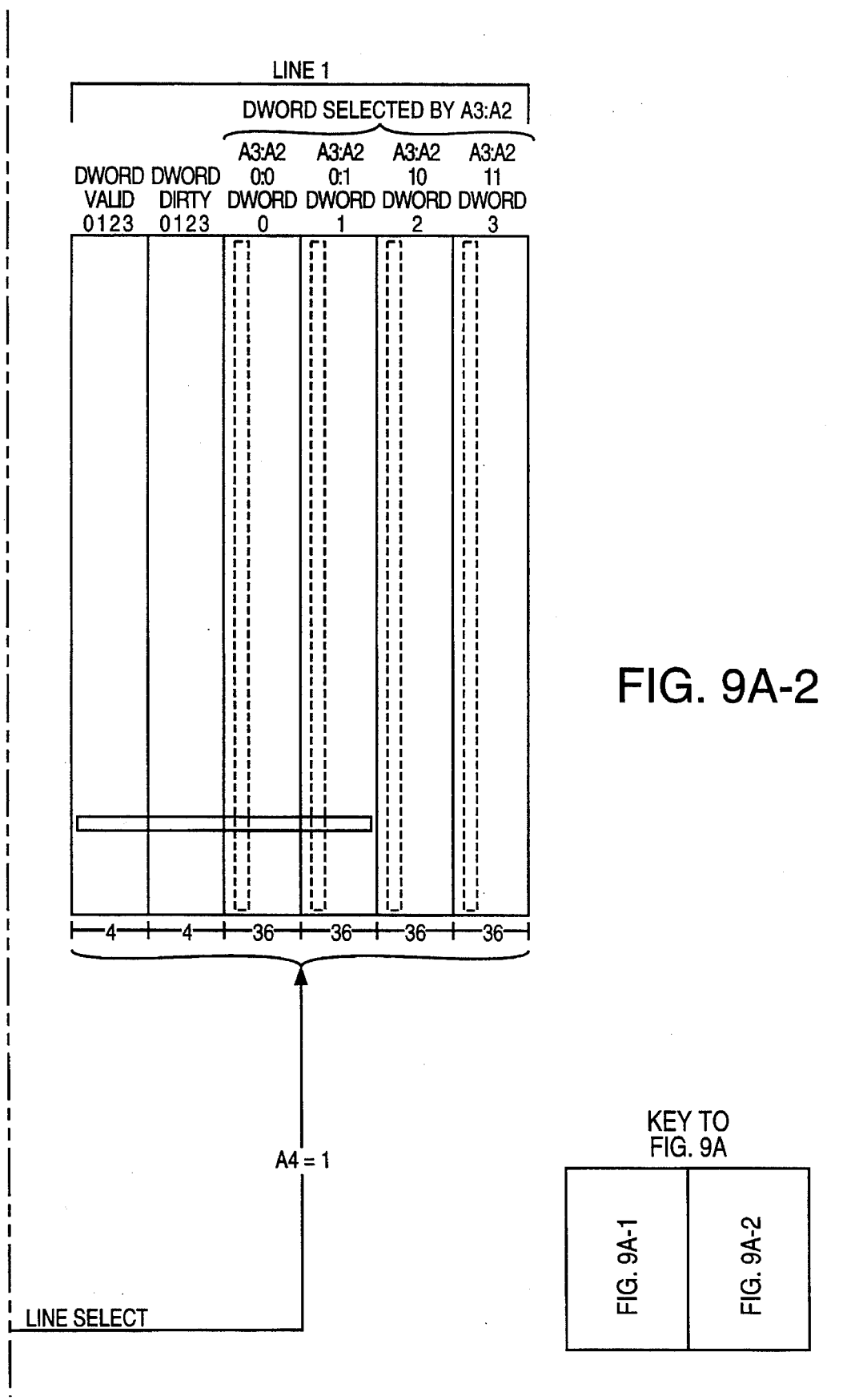

Organization of the cache in direct-mapped mode is shown in FIGS. 9A-1 and 9A-2. Each physical address that the CPU 60 asserts can map into only one location in the cache. The address of each cycle driven by the CPU 60 is broken down into several components: the set index, tag, line select, and doubleword select. CPU address lines A15:5 (11 bits) compose the set index, and determine which cache location the address can map into. Address lines A27:16 (12 bits) are the tag. Assertion of a bus cycle by the CPU 60 generates a tag comparison, with A27:16 being compared against the tag for the given set index. A match of all 12 bits indicates a cache hit. Address line A4 selects between the two lines of a block. Address lines A3 and A2 select individual doublewords within a line, and are not included in cache hit/miss determinations.

Note that FIGS. 9A-1 and 9A-2 are drawn abstractly for understanding of the cache organization. The tag array bits, tag valid, doubleword valid, and the doubleword dirty bits are contained in the cache controller 70, while the actual data for doublewords 0-3 are contained in the cache memory 72.

Figures 1, 10A:
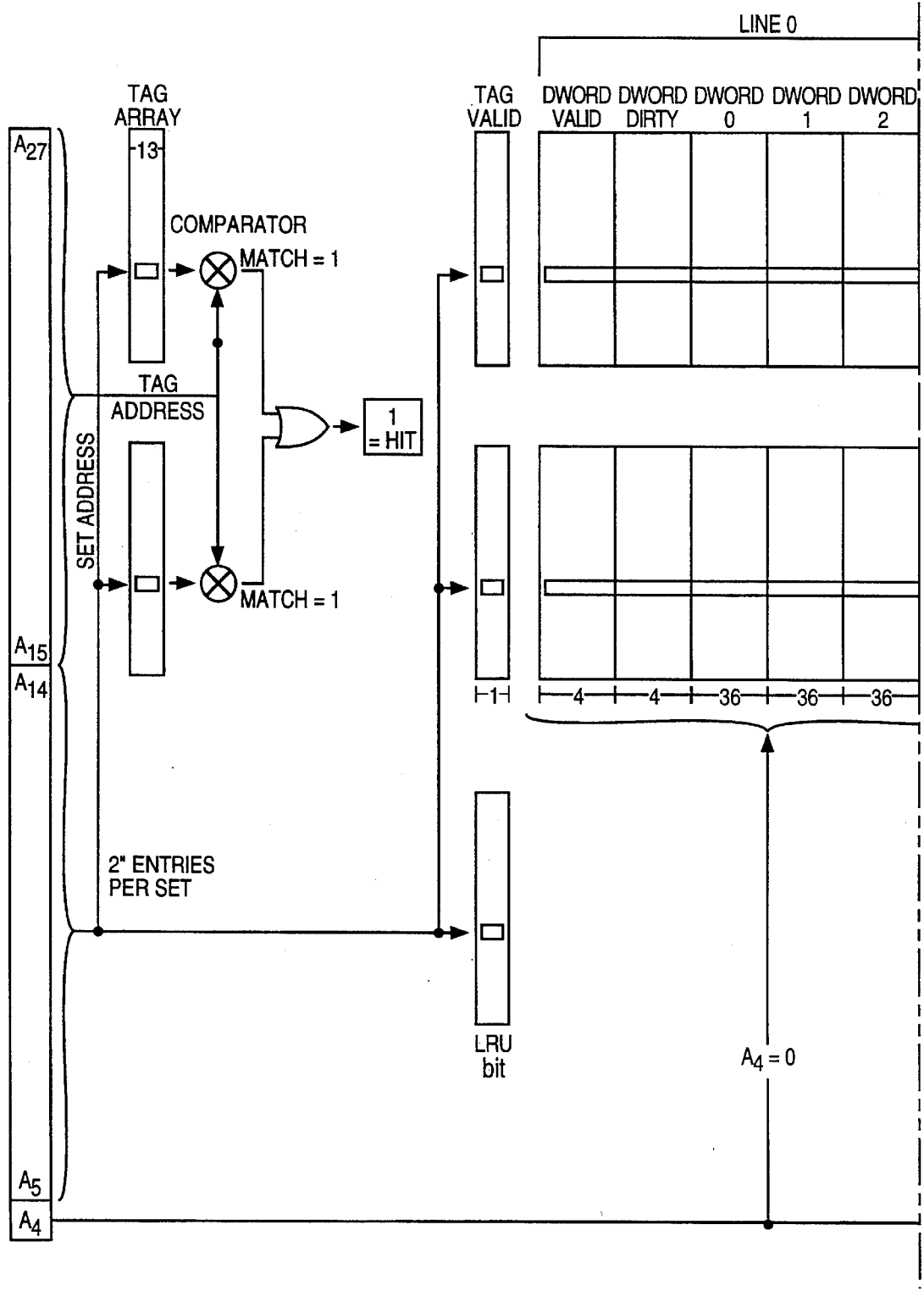
Figures 2, 10A:
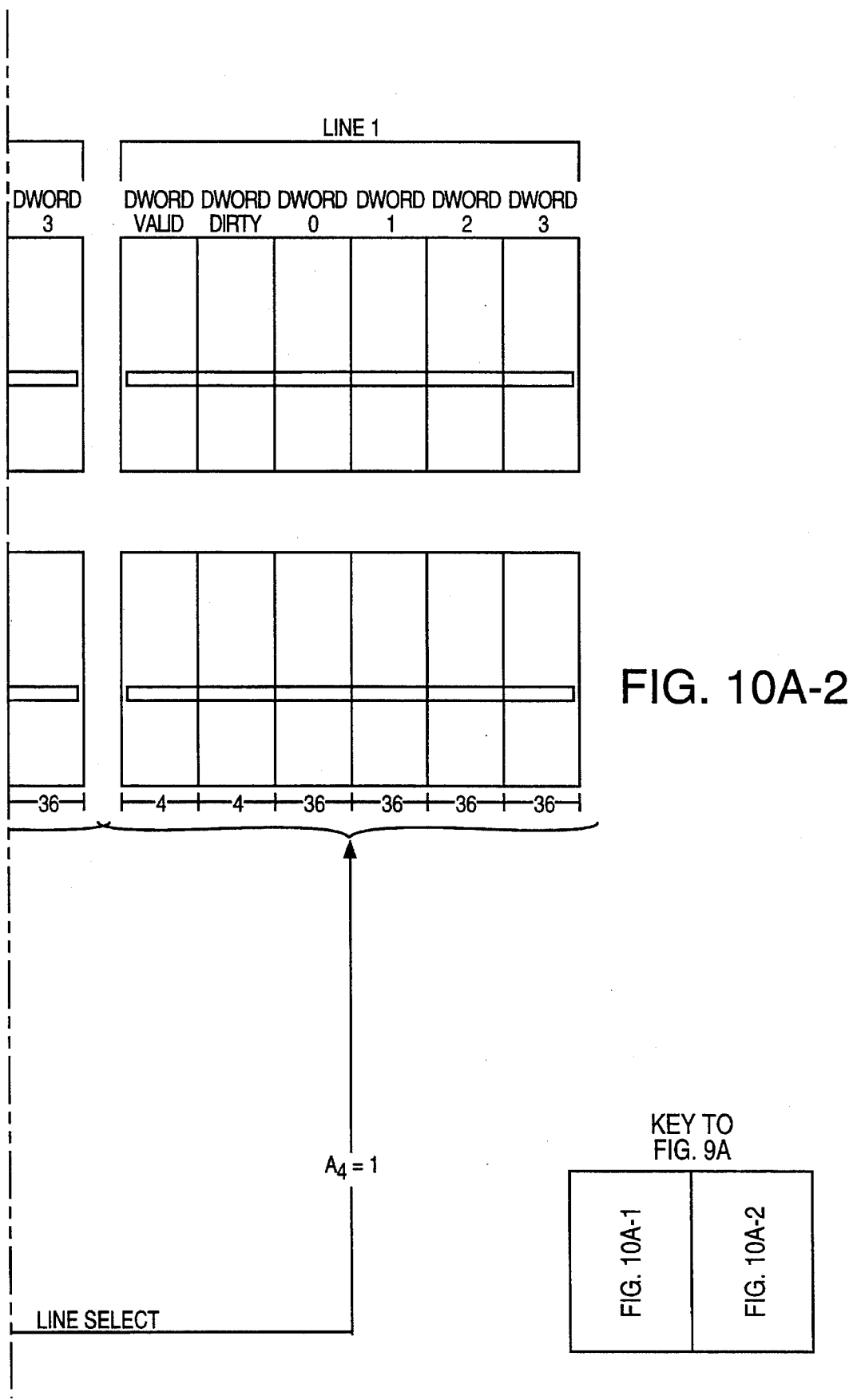

Organization of the cache in 2-way set associative mode is shown in FIG. 10A. As opposed to the direct-mapped strategy described above, each physical address can map into two locations in the cache. As a result, the 2048 entries are mapped into two parallel sets of 1024 entries each.

Correspondingly, the cache set index is now 10 bits instead of 11, and the tags are 13 bits instead of 12. A bus cycle now triggers two comparison operations, one for each set, at the given set index, with a hit (match) possibly occurring in either set. The results of the comparison are OR'd together, with a high value from the OR output indicating a tag hit.

It will be appreciated that the size of each cache bank, the number of banks, the number of blocks, and the number of lines per tag may be varied without departing from the spirit and scope of the invention.

Referring back to FIGS. 8A–8C, consider next the address latches and multiplexer section 102. Address signal ADDR carried on the host address bus 24 is an 11-bit (<14:4>) signal that addresses the RAM array 100.

An address multiplexer 103 and two address registers, hit address register 109 and miss address register 110, are included in section 102. Under certain circumstances, bits <14:4> of the address signal ADDR are latched into the hit address register 109 and furnished therefrom through the address multiplexer 103 to RAM array 100. The address signal ADDR from the CPU 60 is latched into hit address register 109 through activation of the ADS# signal asserted by the CPU 60. The address information latched in hit address register 109 is provided to the address decoder of the RAM array 100.

Under other circumstances, the 11-bit output of the hit address register 109 is latched into the miss address register 110 and furnished therefrom through the address multiplexer 103 to RAM array 100. Under still other circumstances, the 11-bit address signal ADDR is furnished directly through the address multiplexer 103 to RAM array 100. These circumstances are described below.

Hit address register 109 includes a control line for receiving a signal CALE or the ADS# signal, and miss address register 110 includes a control line for receiving a signal MALE. A high assertion of the MALE signal causes latching of the address signal into miss address register 110.

Miss address register 110 is used during miss cycles to latch the initial miss address. This address is later used during miss processing, as explained below, so that ndata retrieved from the system can be correctly updated into the RAM array section 100. It is noted that the address in the hit address register 109 is latched into the miss address register 110 through the activation of signal MALE.

Figure 11:
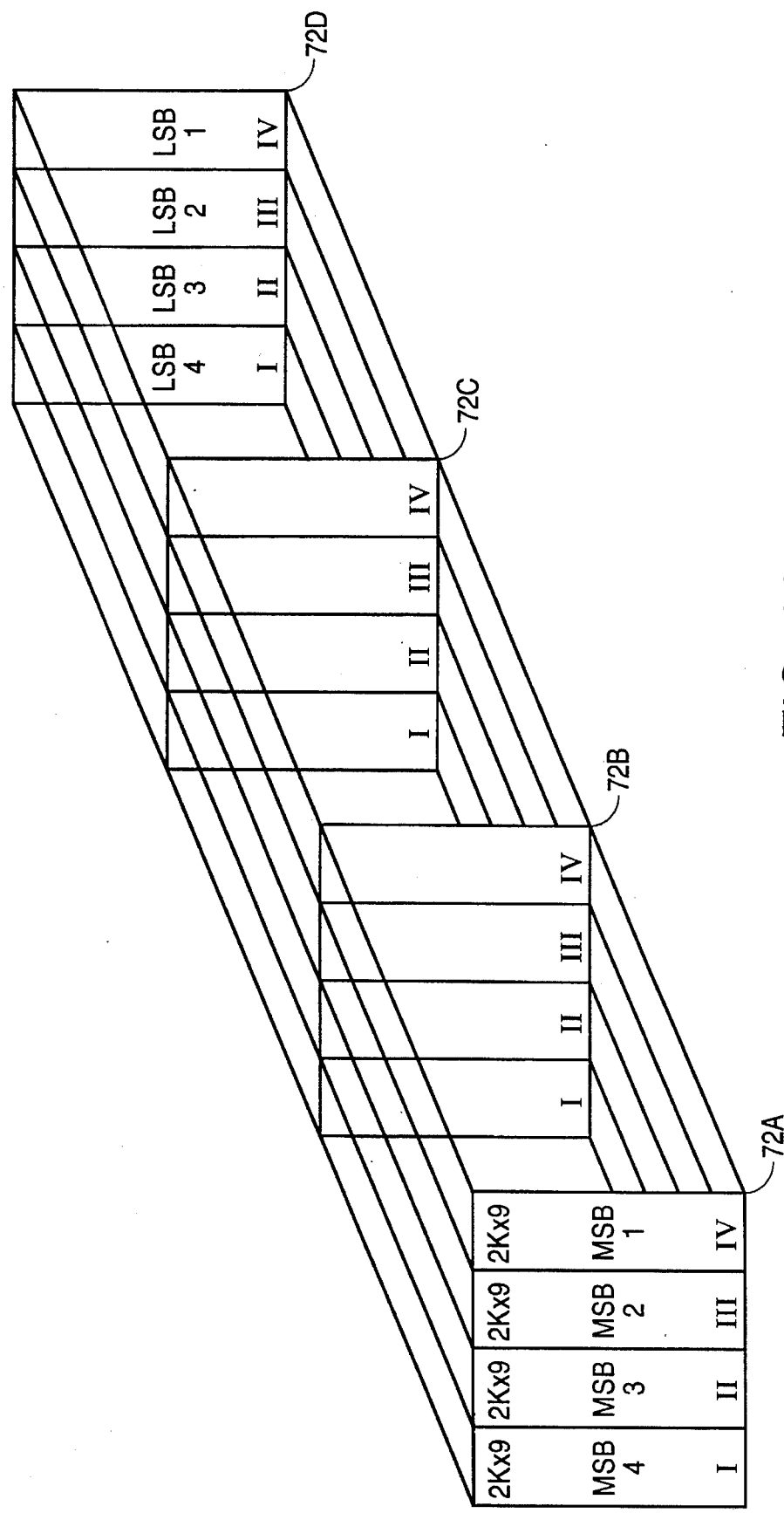
FIG. 11 is a diagram illustrating four burst RAM cache memory chips arranged in a 32-bit configuration.

Consider next the control logic and transceivers section 104. The burst RAM cache memory chip is provided with a 9-bit (including parity) host port HP 113 which is connected to the local (host) data bus (bus 26 of FIGS. 6 and 7) through a 9-bit line. Each burst RAM chip is also provided with a 9-bit (including parity) system port SP 112 which transfers an appropriate byte of information between the system data bus (bus 34 of FIGS. 6 and 7) through its 9-signal line. It should be noted that the local and system data buses are four bytes or 32-bits wide, so thus four burst RAM chips are required to support the 32-bit systems as shown in FIGS. 6 and 7. For one implementation, as illustrated in FIG. 11, burst RAM cache memory chip 72A supports the most significant byte of the local and system buses, burst RAM cache memory chip 72B the next most significant byte, burst RAM cache memory chip 72C the next most significant byte, and burst RAM cache memory chip 72D the least significant byte. A single doubleword (where each word comprises sixteen data bits) is stored in four bytes. Each cache memory chip 72A–72D stores one of the four bytes of a doubleword. Each doubleword is stored within a single set of the subarrays labelled either I, II, III, or IV. A "line" refers to the four adjacent doublewords stored within each set of the subarrays I–IV. The set of four subarrays labeled I of burst RAM chips 72A–72D contain the 32-bit doubleword located at the line's highest address. Subarray sets II, III, and IV contain the third, second, and first addressed doublewords in the line, respectively.

Referring back to FIGS. 8A–8C, the burst RAM chip data path further includes three sets of holding registers 114A–114D, 116A–116D and 118A–118D, and a memory write register 120. A memory read hold register set ("MRHREG") includes four 8-bit registers 114A–114D and is provided to support data bus burst read operations on the host data port 113. Each of the four registers 114A–114D includes an additional bit for parity. A memory write back register set ("MWBREG") includes four 8-bit (plus parity) registers 118A–118D and is provided to accommodate burst write operations on the system data port 112. A memory update register set ("memory update register set 116") includes four 8-bit (plus parity) registers 116A–116D and is provided to accommodate quad fetch miss data operations from system memory 38. Finally, memory write register 120 is an 8-bit register (plus parity) provided to accommodate scalar write operations on the host data port 113.

Figure 12A:
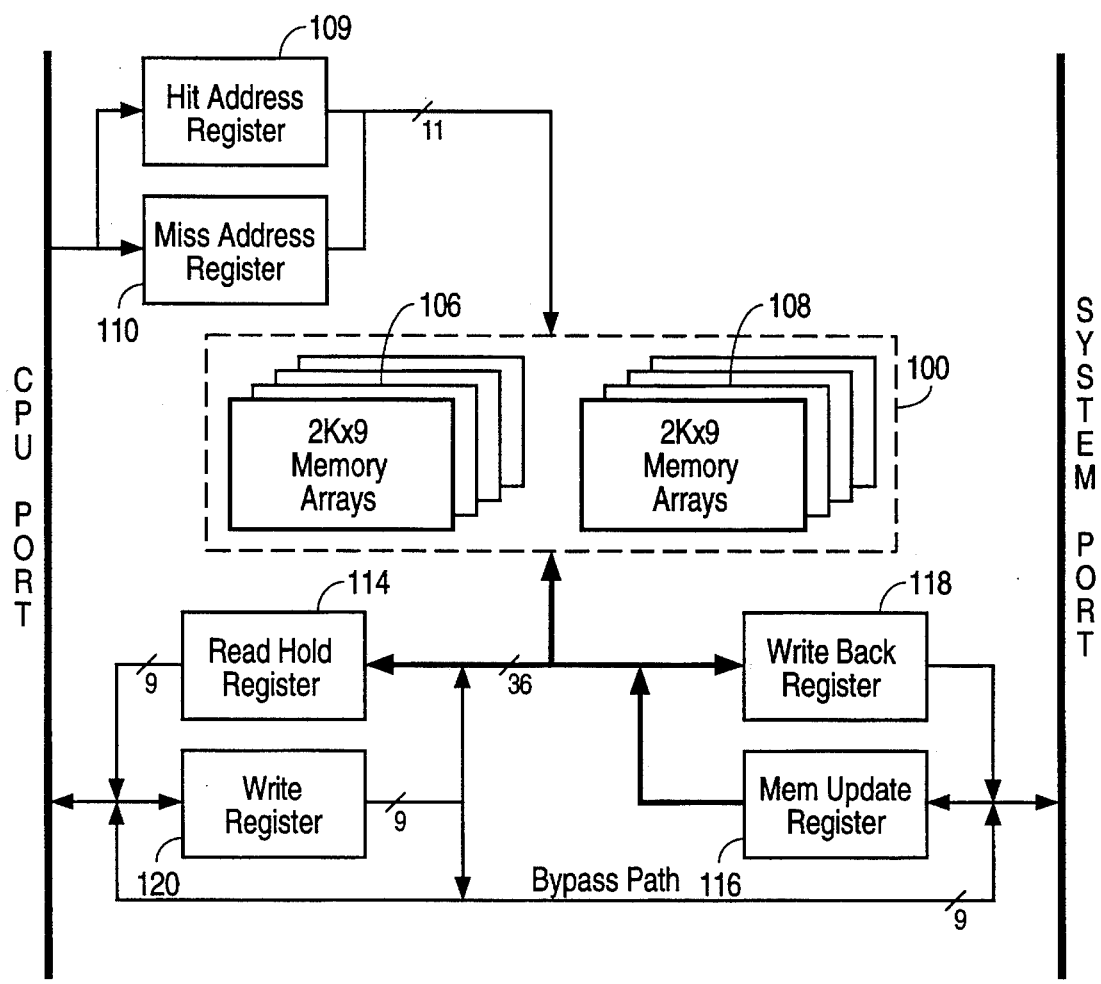
FIGS. 12A and 12B are diagrams illustrating generalized data paths and registers within cache memory 72.
Figure 12B:
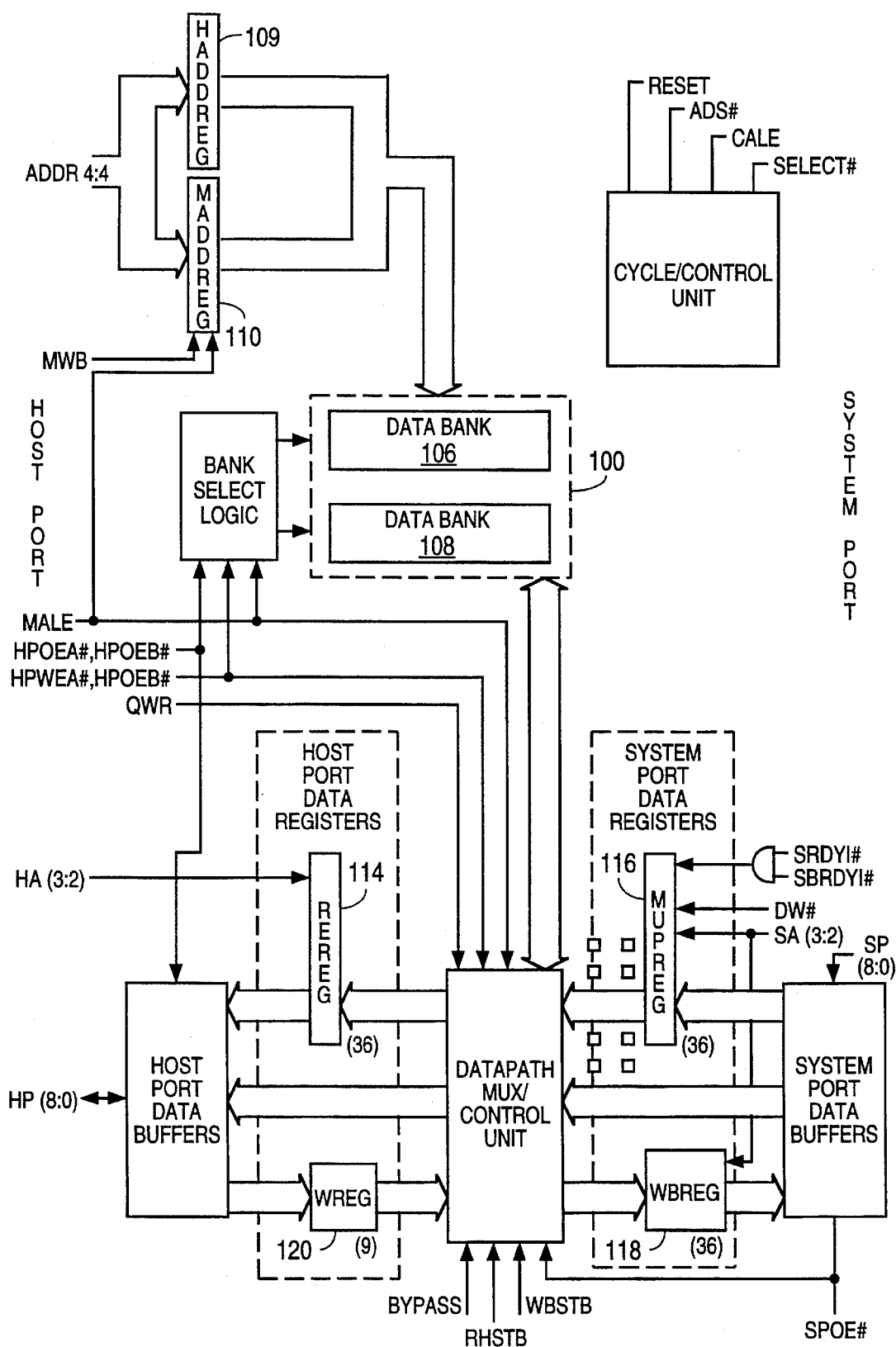

FIGS. 12A and 12B are shown to simplify the conceptual architecture of the burst RAM cache memory 72 in accordance with the invention. The architecture shown in FIGS. 12A and 12B corresponds to that of FIGS. 8A–8C, and includes hit address register 109, miss address register 110, RAM array section 100, read hold register set 114, memory update register set 116, write back register set 118, and write register 120. The generalized diagrams of FIGS. 12A and 12B may be referred to for simplifying the descriptions of the cache memory 72 contained herein.

Figure 13:
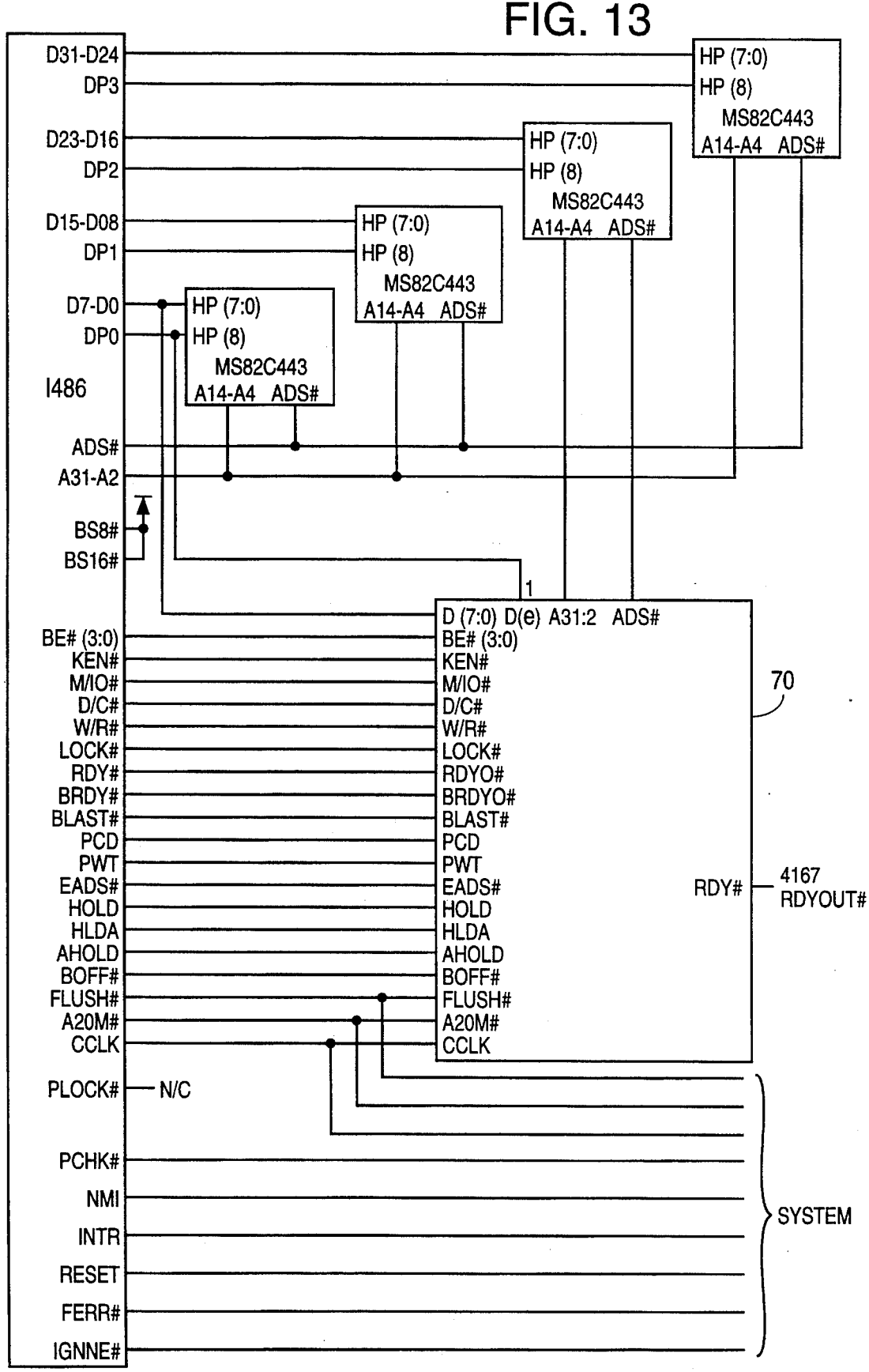
FIG. 13 is a diagram illustrating the host interface between the 486 microprocessor and cache controller 70 and cache memory 72.
Figure 14:
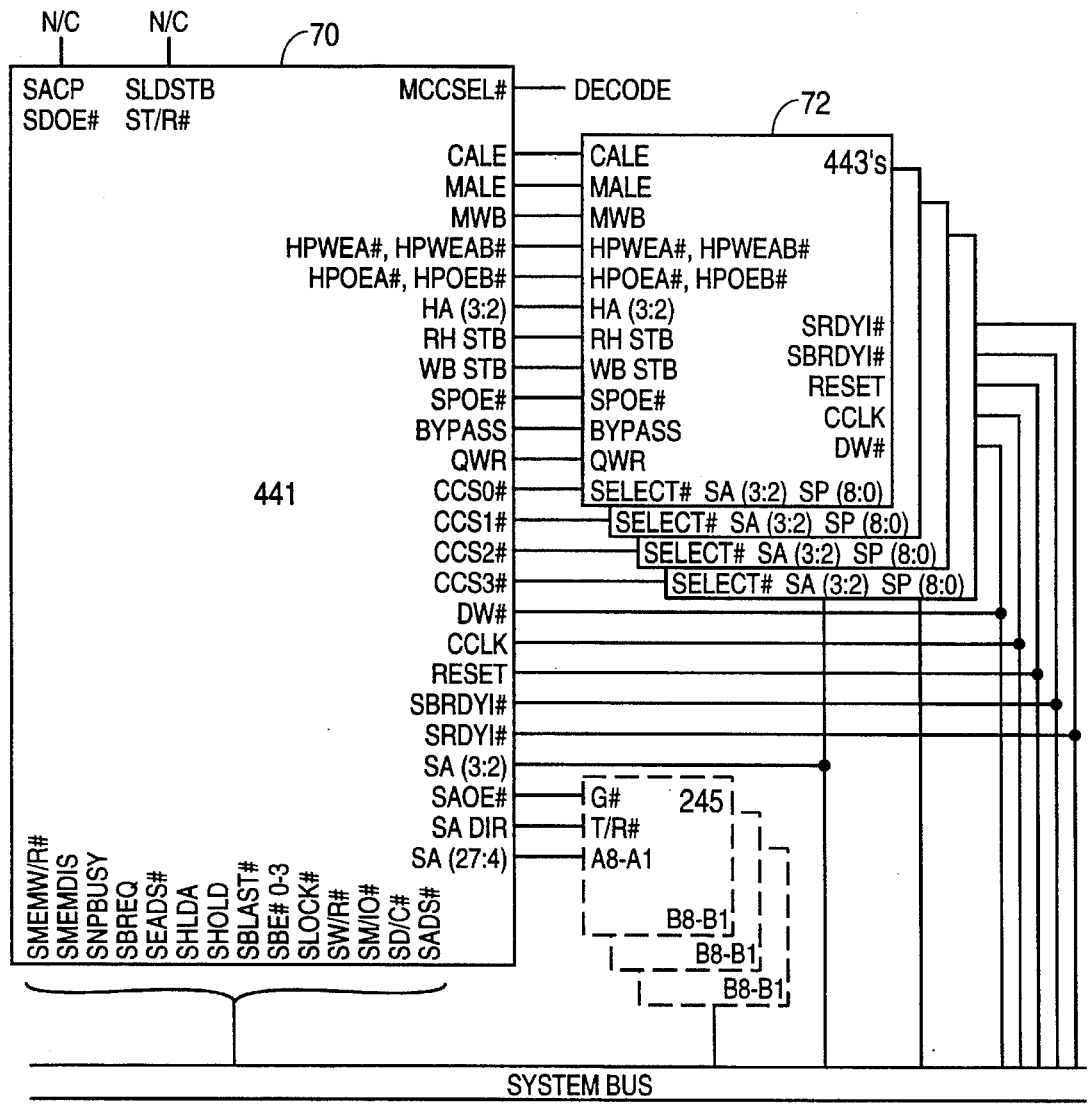
FIG. 14 is a diagram illustrating the system interface between a system bus and cache memory 72 and controller 70.

The burst RAM cache memory 72 and controller 70, in accordance with the invention, control the paths of data in response to various control signals. These signals, along with the terminal pins of cache memory 72 and controller 70 from which and to which they are provided, are listed below in Tables I and II with a brief description of their purposes. In addition, FIGS. 13 and 14 illustrate the system and host interface connection pins for an 80486 computer system incorporating a cache memory 72 and controller 70 in accordance with the invention.

TABLE I

| CONTROLLER 70 SIGNALS | | |
|---|---|---|
| Signal | Type | Description |
| LOCAL PROCESSOR INTERFACE | | |
| CCLK | Input | External Clock Input. This pin is directly connected to the i486 CPU CLK |

TABLE I-continued

CONTROLLER 70 SIGNALS

| Signal | Type | Description |
| --- | --- | --- |
| | | pin. CCLK provides the fundamental timing and internal operating frequency for the controller 70. CCLK only needs TTL levels for proper operation. All external timing parameters are referenced to the rising edge of CCLK. |
| A<31:2> | Input/ Output | Processor Local Physical Address. As inputs, these lines provide the physical memory and I/O addresses of the local bus for the controller 70. As outputs, addresses are driven back to the 486 processor during cache invalidation cycles. These signals directly connect to 486 local processor address bus. |
| BE<3:0># | Inputs | Byte Enables. These four lines determine which bytes must be driven valid for read and write cycles to external memory. BE3# is associated with D<31:24> BE2# is associated with D<23:16> BE1# is associated with D<15:8> BE0# is associated with D<7:0> These four signals directly connect to 486 BE<3:0># |
| Reset | Input | RESET Input. The RESET input is asynchronous. The activation of the RESET pin clears all tag valid bits in the controller 70 tag directory array together with all the other internal states. |
| A20M# | Input | Address 20 Mask. Asserting the A20M# input causes the controller 70 to mask physical address bit A<20> before performing a tag directory comparison and before driving a memory cycle to the outside world. When A20M# is asserted active, the controller 70 emulates the 1 Mbyte address space of the 8086. The signal is only asserted when the host CPU is in real mode. This signal is connected to the A20GATE signal of most IBM PC/AT compatible chipsets. |

PROCESSOR CYCLE DEFINITIONS

| Signal | Type | Description |
| --- | --- | --- |
| M/IO# | Input | Processor Memory/IO Access. Distinguishes between memory or I/O cycles. This signal directly connects to the 486 M/IO# pin. |
| D/C# | Input | Processor Data/Code Access. Distinguishes between data or code cycles. This signal is directly connected to the 486 D/C# pin. |
| W/R# | Input | Process Read/Write Access. Distinguishes between read or write cycles. This signal is directly connected to the 486 W/R# pin. |
| LOCK# | Input | Bus Lock. Assertion of this signal indicates the 486 needs to have exclusive right to the local bus for a read-modify-write operation. This signal directly connects to the LOCK# pin of 486. |

READY INDICATION AND LOCAL BUS STATES

| Signal | Type | Description |
| --- | --- | --- |
| ADS# | Input | Address Status Output. This signal indicates that the address and bus cycle definition signals are valid. ADS# is active on the first clock of a bus cycle and goes inactive in the second and subsequent clocks of the bus cycle. This input has a weak pull-up |

TABLE I-continued

CONTROLLER 70 SIGNALS

| Signal | Type | Description |
|---|---|---|
| | | resistor.<br>The controller 70 uses ADS# together with other ready indication signals to monitor 486 local bus activity. |
| RDY# | Input | Local Bus Cycle Ready Input. In 486 systems, assertion of RDY# indicates the completion of any local (Weitek) bus cycles. This signal is ignored on the end of the first clock of a bus cycle. This input has a weak pull-up resistor.<br>A low assertion of RDY# will cause the RDYO# output from the controller 70 to go low.<br>A programmable option through the controller 70 allows asynchronous RDY# input. This asynchronous option allows a coprocessor with slow output delay to interface with the controller 70. In asynchronous mode, the controller 70 will forward RDY/ to the RDYO# output in the next clock. In synchronous mode, RDY# will be forwarded to RDYOJ in the same clock provided that setup time is met. After reset, RDY# is assumed to be synchronous.<br>This signal is directly connected to the 486 RDY# pin. |
| RDYO# | Output | System Non-Burstable Cycle Ready output. The controller 70 completes cycles such as cache read hits, write cycles (hit/miss) and cycles specifically directed at the controller 70 (control register update cycles). For cycles not directly completed by the controller 70, such as read misses and system cycles, the controller 70 will forward either the SBRDY1# or SRDY1# signals from the system memory bus as RDYO# to the CPU.<br>For cycles to NCA (Non-Cacheable Address) regions, I/O, Halt/Shutdown, INTA cycles, and cycles when the controller 70 is disabled, either SRDY1# or SBRDY1# can be returned by the system. However, either of these signals will be passed to the CPU as RDYO#.<br>This signal is directly connected to the RDY# input pin of the 486. In case a numerics coprocessor (NPX) is present in the system READYOJ of the NPX will be connected to RDY# of the controller 70. The controller 70 will then forward READYO# from the NPX to the CPU. |
| BRDYO# | Output | 486 Burst Cycle Ready Output. In 486 systems, the controller 70 drives this output on to the processor local bus indicating the completion of a controller 70 burst read hit data cycle. In cache subsystems using cache memory 72 Burst-RAMs, the controller 70 will forward the SRBRY1# signal from the system memory bus for cache read miss cycles.<br>This signal is directly connected to the 486 BRDY# pin. |
| BLAST# | Input | Burst Last. This signal indicates that the next BRDY# or RDY# returned will terminate the 486 host cycle. The controller 70 only samples BLAST# in the second or subsequent clocks of any bus cycle.<br>This signal is directly connected to |

TABLE I-continued

CONTROLLER 70 SIGNALS

| Signal | Type | Description |
|---|---|---|
| | | the 486 BLAST# pin. |
| BOFF# | Output | Host CPU Back-Off. This signal is used by the controller 70 to obtain the 486 local bus. During snoop read hits, the controller 70 asserts BOFF# to the 486 one clock after AHOLD is asserted in order to access the cache data array. See section entitled "Snoop Operations" for a complete discussion. |
| HOLD | Output | Host CPU Bus Hold Request. This signal is used for flush operations in order to obtain the local CPU bus. During either hardware or software flushes, the controller 70 will assert HOLD to the CPU. HOLD is released upon completion of the flush operation. |
| HLDA | Input | Host CPU Bus Hold Acknowledge. The assertion of HLDA indicates that the controller 70 has been granted the local bus to begin flush operations. Upon recognition of HLDA, the controller 70 will begin generating write-back cycles to the system to clear lines which contain dirty data. |
| LBA# | Input | Local Bus Access. This pin indicates to the controller 70 that the current bus cycle should occur only on the host (local CPU) bus. Assertion of this signal will prevent any system read or write operations from occurring as a result of the current cycle. However, this signal must be asserted to the controller 70 in the T1 state for proper operation. |
| CACHE CONTROL | | |
| FLUSH# | Input | FLUSH#. The FLUSH# input is asynchronous and need only be active for one clock. This input has a weak pull-up resistor. This input clears all valid, dirty and LRU bits in the controller 70. The controller 70 will copy all dirty valid data back to system memory before executing the flush operation. This pin should be directly connected to the FLUSH# pin of the 486. |
| PCD | Input | Page Cache Disable. This pin provides a cacheable/non-cacheable indication on a page-to-page basis from the 486. The 486 will not perform a cache fill for any data cycle when this signal is asserted. PCD reads are cached by the controller 70. PCD read cycles which are cache hits are treated as normal cacheable cycles, with data being returned to the CPU in zero wait states. However, this data will not be cached inside the CPU. PCD write cycles generate buffered write-through cycles to the system. This signal is connected directly to the 486 PCD pin. |
| PWT | Input | Page Write Through. Assertion of this signal during a write cycle will cause the controller 70 to treat the current write cycle as a write-through cycle. A hit on a PWT write cycle will cause an update both in the data cache and main memory. A miss on a PWT write cycle will update only main memory, and will not generate a system quad fetch. This signal is directly connected to the 486 PWT pin. |
| KEN# | Output | Cache Enable. KEN# is used to indicate |

TABLE I-continued

CONTROLLER 70 SIGNALS

| Signal | Type | Description |
|---|---|---|
| | | to the 486 if the data returned by the current cycle is cacheable. A cycle to a protected address region will cause the controller 70 to deassert KEN# in T1 to prevent the i486 CPU from performing any cache line fills. KEN# will continue to be deasserted until RDYOI or BRDYOJ is returned, whether the cycle is a cache hit or miss. For all Weitek 4167 cycles, KEN# will be deasserted. Data passing between the 486 and the Weitek coprocessor is not cached. Also, in order to support long instruction execution of the Weitek 4167, the controller 70 will continue to deassert KEN# upon detection of a Weitek cycle till RDY# assertion is received. This signal is directly connected to the 486 KEN# input. |

CACHE INVALIDATION CONTROL

| Signal | Type | Description |
|---|---|---|
| EADS# | Output | External Address Valid. EADS# indicates that a valid external address has been driven onto the 486 address pins A<27:4>. These address bits are then checked with the cache tag directory inside the 486. If a match is detected, the directory entry associated with A<27:4> will immediately be invalidated. A<31:28> will always be driven to zero along with A<27:4>. The controller 70 will assert EADS# for main memory write cycles as indicated by MEMWR# signal being high from system memory bus interface. This signal is connected directly with the 486 EADS# pin. |
| AHOLD | Output | Address Hold Request. Asserting this signal will force the 486 to float the address bus in the next clock. While AHOLD is active, only the address bus will be floated, the data portion of the bus may still be active. The controller 70 uses AHOLD to attain address bus mastership for performing an internal cache invalidation to the 486 when system writes occur. This signal is directly connected to the AHOLD pin of the 486. |

CACHE MEMORY CONTROL INTERFACE

| Signal | Type | Description |
|---|---|---|
| HPOEA#, HPOEB# (GO#,G1#) | Outputs | Host Port Output Enables. These signals are connected to the host port data output enable inputs of Cache RAMs to individually enable the selected cache bank to drive the data bus. If cache memory 72 is used, these signals will be connected to the G0# and G1# inputs. |
| HPWEA#, HPWEB# (HWO,HW1) | Output | Host Port Write Enables. These signals are connected to the write enable inputs of the Cache RAMs in order to individually enable the selected cache bank to receive data. If cache memory 72 is used, these signals are connected to the HW0# and HW1# inputs. |
| CCS<3:0># | Outputs | Cache Chip Select. These signals are connected to the chip select inputs of the Cache RAms associated with each byte of the data word. If cache memory 72 is used, these signals are connected to the SELECT# inputs. |

TABLE I-continued

CONTROLLER 70 SIGNALS

| Signal | Type | Description |
| --- | --- | --- |
| | | During all processor write cycles, these outputs emulate BE<3:0># to select those bytes that are updated in main memory during a partial write. In read hits and read miss cache update cycles, all four signals are active. |
| MALE | Output | Miss Address Latch Enable. This signal activates after ADS# activation if either a read/write miss has been detected. Assertion of MALE and HPWEA# or HPWEB# in the same clock will inhibit writing to data RAM array section inside Burst-RAM cache memory 72.. Activation of MALE will reset all valid bits associated with each data byte in memory update register set 116. |
| WBSTB (BMUXC<0>) | Output | Write-Back Strobe. The rising edge of WBSTB results in the Burst-RAM data entry associated with miss address register 110 to be latched into write back register set 118 (write-back register). This data will be written to main memory later if it is dirty. For multiple replacement cycles, the controller 70 will assert WBSTB on the clock after MWB is asserted to allow Burst-RAM data entry associated with miss address register 110 to be latched into write back register set 118. |
| RHSTB (BMUXC<1>) | Output | Read Hit Strobe. The rising edge of RHSTB results in the Burst-RAM data entry associated with hit address register 109 to be latched into read hold register set 114 (read hold register). This data will be burst to the 486. |
| QWR | Output | Quad Write. Activation of this signal results in the data in memory update register set 116 (update register) being written into cache memory 72 data array entry pointed to by the address in miss address register 110 and the cache memory 72 internal select logic. This signal is connected to QWR input of cache memory 72. |
| DW# (QWRWQ) | Output | Dirty Word. During a system quad fetch, the controller 70 uses this signal to indicate dirty/nondirty status for each fetched doubleword to the cache memory 72's. Active (low) assertion of this signal, qualified with SRDYI# or SBRDYI#, indicates that dirty data is currently present in the cache data array, and should not be overwritten by the fetched data. This signal is directly connected to DW# inputs of the cache memory 72's. DW# is also used as a signal to the system memory controller during quad write cycles, to indicate dirty/non-dirty status of the corresponding doubleword. In the non-dirty case, the system can ignore the driven data and immediately return SRDYI# or SBRDYI#. |
| BYPASS | Output | Host/System Bypass. This signal connects host port data to system port data of the cache memory 72. Cache miss reads and non-cacheable read/writes will activate the BYPASS signal. This signal is connected directly to the BYPASS input of the cache memory 72. |
| SP OE# | Output | System Port Output Enable. A low |

TABLE I-continued

CONTROLLER 70 SIGNALS

| Signal | Type | Description |
|---|---|---|
| (SW#) | | assertion of this signal enables the Burst-RAM system port outputs. For cache memory 72 writes, SP OE# will be asserted for all four data transactions.<br>During write cycles, this signal is asserted one clock after SADS# to be compatible with 486 write cycles.<br>This signal is directly connected to the SP OE# pin of the cache memory 72. |
| MWB | Output | Multiple Write-Back. MWB is used during write-back cycles, in the case when both lines associated with a replaced tag are dirty. MWB is asserted by the controller 70 at the end of the first write-back cycle, in order to toggle miss address register 110 to point at the second line corresponding to the replaced tag entry.<br>This signal is connected directly to the MWB input of the cache memory 72. |
| HA<3:2> | output | Host Port Address <3:2>. These two bits indicate the word address within a quad word. These bits are part of the address bit associated with data at the host port.<br>These two signals connect directly to HA<3:2> inputs of the cache memory 72. |
| CALE (HALE) | Output | Controller ALE. CALE is generated by the controller 70 during the first bus state of controller-initiated cycles. The controller 70 will generate CALE during flush operations and snoop read hits. Upon assertion of CALE, the cache memory 72 will latch the controller 70-generated address.<br>This pin is connected directly to the cache memory 72 CALE pins. |
| SYSTEM BUS INTERFACE | | |
| SADS# | Output | System Bus Address Status. SADS# is the system equivalent of 486 ADS#. This indicates that valid address SA<27:2>, SBE<3:0># and cycle definition signals (SM/IO#, SW/R#, SD/C#) are available to the system. SADS# is asserted in the first clock of a system bus cycle. This pin is tri-stated when the controller 70 does not have system bus ownership. |
| SM/IO# | Output | System Bus Memory/IO. Distinguishes system bus memory or I/O cycle accesses. This pin is tristated when the controller 70 does not have system bus ownership. |
| SD/C# | Output | System Bus Data/Code Access. Distinguishes system bus data or code accesses. This pin is tristated when the controller 70 does not have system bus ownership. |
| SW/R# | Output | System Bus Write/Read Access. Distinguishes system bus write or read accesses. This pin is tristated when the controller 70 does not have system bus ownership. |
| SA<27:4> | I/O | System Address Bus. The controller 70 uses these inputs as snoop system bus address when some other system bus master controls the bus.<br>The controller 70 will drive these address lines to system memory during miss processing, system and write-through cycles.<br>The controller 70 will float SA<27:4> |

TABLE I-continued

CONTROLLER 70 SIGNALS

| Signal | Type | Description |
| --- | --- | --- |
| | | during system idle states or at the end of system bus cycles. SA<27:21> have weak pull-down resistors. |
| SA<3:2> | I/O | System Bus Address. These signals indicate the address of each 32-bit doubleword within a quad line. They play a similar role as SA<27:4> except during burst cycles, SA<3:2> are wrapped around a line (16 byte) boundary. The controller 70 can control SA<3:2> sequentially or use the 486 burst-order. This is controlled by a bit in the control register. Cache memory 72 Burst-RAMs will connect these two signals to SA<3:2>. To facilitate easy interface to system memory, SA<3:2> timing is earlier than SA<27:4>. |
| SBE<3:0># | I/O | System Bus Byte Enables. As inputs, these pins are used during snoop write operations to select the proper bytes to be written into the cache data array. As outputs, these pins indicate to the system which bytes are active for system read/write operations. |
| SRDYI# | Input | System Bus Non-Burst Cycle Ready Input. Assertion of SRDYI# indicates the completion of any non-burst system bus cycles. Simultaneously asserting both SRDYI# and SRBRDYI# signals will pass SRDYI# to the CPU. The controller 70 will forward only SRDYI# input to RDYO# for non-cacheable cycles. This input has a weak pull-up resistor. |
| SBRDYI# | Input | System Bus Burst Cycle Ready Input. Assertion of this signal indicates that the current system bus burst cycle is completed. The controller 70 will ignore SBRDYI# assertion at the end of the first clock of a system bus cycle. This input has a weak pull-up resistor. The controller 70 will pass SBRDYI# back to the host CPU as BRDYO#, except for system read cycles. For these cycles, assertion of either SRDYI# or SBRDYI# will be passed to the CPU as RDYO#. SBRDYI# for Halt/Shutdown, I/O, and INTA cycles will also be passed to the CPU as RDYO#. |
| SBLAST# | Output | System Burst Last. This signal asserted (low) indicates that the next assertion of SBRDYI# or SRDYI# will terminate the system bus cycle. SBLAST# is asserted for all system bus cycles. As an enhancement over the 486, SBLAST# is driven to a valid level in T1, instead of being indeterminate. Hence, SBLAST# will be valid in the same clock as SADS#. SBLAST# will be asserted during the last transfer of any system bus cycle. This pin is tristated during system bus hold. |
| SLOCKJ | Output | System Lock. This signal is passed from the local CPU bus to the system bus. LOCK# is asserted by the CPU for indivisible read-modify-write operations. Assertion of LOCK# will trigger assertion of SLOCK#, indicating to system logic that the 486/controller 70 should retain the bus until LOCK# is deasserted. |

TABLE I-continued
CONTROLLER 70 SIGNALS

| Signal | Type | Description |
| --- | --- | --- |
| SYSTEM DATA BUS TRANSCEIVER CONTROL | | |
| ST/R# | Output | System Data Bus Data Transmit/Receive. This signal defines the direction of the optional system bus data transceivers. This signal is connected to the DIR pin of the 646 data transceivers. |
| SD OE# | Output | System Data Output Enable. This enables the output of the optional data transceivers. The controller 70 will deassert SD OE# if another slave device on the system bus is granted bus ownership. This signal is connected to OE# of external 646 data transceivers. |
| SLDSTB | Output | Local Data Strobe. The rising edge of this signal latches data into the optional external 646 data transceivers. In quad fetch mode, the controller 70 will assert SLDSTB four times. |
| SYSTEM ADDRESS BUS TRANSCEIVER CONTROL | | |
| SA CP | Output | System Address Clock Pulse. The rising edge of this signal latches data into the latch transceiver that drives SA<27:2>, SBE<3:0>#, SM/IO#, SW/RF and SD/C# in the system bus. The rising edge of this signal latches the address and cycle definition signals from the controller 70. SACP will be asserted only at the beginning of a burst cycle. This signal is connected to the external latch transceiver CAB pin. |
| SA OE# | Output | System Address output Enable. This signal enables the external address latch or external address latch transceiver outputs when the controller 70 is the current bus master and disables them otherwise. The controller 70 will deassert SA OE# if SHOLD is acknowledged. This signal is connected to OE# of the external address bus latch or external address bus latch/transceivers. |
| SA DIR | Output | System Address Direction. This signal controls the DIR (direction) input of the optional address transceivers. SA DIR is high when the controller 70 owns the bus and is low when the controller 70 grants ownership of the system bus. SA DIR toggles low or high the clock following change of SHLDA. |
| SYSTEM BUS ARBITRATION SIGNALS | | |
| SHOLD | Input | System Bus Hold Request. This signal is used to request system bus mastership from another slave device. The role of this signal is equivalent to HOLD in the processor local bus. |
| SHLDA | Output | System Bus Hold Acknowledge. This signal is used to indicate that a request for system bus ownership has been granted. During SHLDA assertion, SDOEJ and SAOEJ will be deasserted. |
| SYSTEM BUS CACHE INVALIDATION REQUEST | | |
| SEADS# | Input | System External Address. SEADS# indicates that a valid system bus address has been driven onto the system memory bus SA<27:2>. A match of this address will invalidate the cache |

TABLE I-continued

CONTROLLER 70 SIGNALS

| Signal | Type | Description |
|---|---|---|
| | | directory entry inside the controller 70. This input has a weak pull-up resistor. Unlike the i486 CPU, the controller 70 provides for partially valid lines. To support this, SA<3:2> must be driven by the system to correct levels along with SA<27:4> when SEADS# is asserted. Snoop writes: SEADS# and SMENW/R# high should be asserted by the system during main memory writes. The controller 70 will forward SEADS# and the invalidate address to the CPU. A <31:28> will be driven as zeroes on the processor local bus to properly invalidate the internal CPU cache. The controller 70 will assert EADSI for only one clock for each system bus snoop write. In addition, the SBE<3:0># signals and write data should be driven to correct levels. This data will be updated into the cache data array if a snoop write hit occurs. Snoop reads: Assertion of SEADSI and a low assertion of SMEKW/R# will result in the controller 70 asserting SMEMDIS if an address match has been detected in the controller 70 Cache directory. The controller 70 will write dirty data associated with the driver address onto the system bus for correct operation. No EADS/ assertion will be sent to the local processor bus for a system bus read cycle. The controller 70 will sample SEADS# every clock. |

COHERENCY SUPPORT (see also SHOLD, SEADS#) SA<27:2>

| Signal | Type | Description |
|---|---|---|
| SMEMW/R# | Input | System Bus Memory Write/Read Cycle. This signal indicates whether a snoop read or snoop write is occurring. Snoop reads trigger SNPBUSY and a tag lookup, while snoop writes trigger an invalidate to the 486 CPU. |
| SMEMDIS | Output | System Bus Memory Access Disable. This signal is asserted when the controller 70 detects a snoop hit so that dirty data can be sent from the cache memory 72 Burst-RMS. |
| SNPBUSY | Output | Snoopbusy. This signal goes high in response to a snoop cycle. For snoop writes, the falling edge of SNPBUSY indicates that the memory controller should return SRDYI# or SBRDYI# to complete the snoop write operation. For snoop reads, SNPBUSY remaining high indicates that the necessary tag lookup has not yet completed. On the falling edge of SNPBUSY, the state of SMEMDIS indicates whether the controller 70 or the memory system will supply data to satisfy the snoop read request. |

CONTROL REGISTER INTERFACE

| Signal | Type | Description |
|---|---|---|
| MCCSEL# | Input | Controller 70 Select. Assertion of this signal indicates that the current local bus cycle is addressed to the controller 70. These cycles include controller 70 Control Register Address Index load cycles and Control Register data read and write cycles. MCCSEL# is connected to local bus decode logic output for the controller 70 address cycles. This input has a |

TABLE I-continued

CONTROLLER 70 SIGNALS

| Signal | Type | Description |
|---|---|---|
| | | weak pull-up resistor. |
| D<8:0> | Input/ Output | Cache Control Data Bus. These nine data pins are connected to the least significant byte of local processor data bus. They are used to load the controller 70 Control Register index address and data content from the 486. In diagnostic mode, D<8:0> can be used as an output to read the internal states of the controller 70. |
| MULTIPROCESSOR SUPPORT (see also SEADS#, SHOLD and SHLDA) | | |
| SBREQ | Output | Pending System Bus Request. The controller 70 asserts SBREQ if an internal system request is pending. SBREQ is asserted the same time as SADS#. In case the controller 70 does not currently own the bus, SBREQ will be asserted the same clock that SADS# would have, had the controller 70 owned the bus. SBREQ will never be floated. This signal plays the sarae role as 486 BREQ pin in local processor bus. |

TABLE II

CACHE MEMORY 72 SIGNALS

| Signal | Type | Description |
|---|---|---|
| BURST RAM INPUT LINES | | |
| ADDR<14:4> | Inputs | 486 Local Address Bus. These bits address one of 2048 entries of 32-bit double-words in each burst-RAM data array. |
| ADS# | Input | Address/Data Strobe. This is the latch enable strobe for CPU-generated bus cycles. The falling edge of this signal creates a flow-through mode for the hit address register 109. The rising edge of ADS# latches the address into hit address register 109. |
| CALE (HALE) | Input | Controller Address Latch Enable. This is the latch enable strobe for controller-generated bus cycles. CALE opens the hit address register 109 level latch to ADDR. |
| MALE | Input | Miss Address Latch Enable. This signal should be asserted after ADS# or CALE activation if a miss for either read or write cycles has been detected. MALE performs several functions. First, it latches the address in hit address register 109 into miss address register 110. It also inhibits any host port writes from being performed on clock edges that it is sampled high. In addition, MALE latches bank select information in order to direct a subsequent update into the cache array. Activation of MALE with either HPOEA# or HPWEA# indicates that the next quad write (QWR) operation will update bank A, while MALE and either HPOEB# or HPWEB# selects bank B. Bank selection, as described above, must be qualified with assertion of the SELECT# input. |

TABLE II-continued

CACHE MEMORY 72 SIGNALS

| Signal | Type | Description |
|---|---|---|
| | | MALE has a higher priority than does the MWB input. Assertion of both MALE and MWB on the same clock edge will result in recognition of MALE, but not MWB. |
| RESET | Input | Cache memory 72 Reset. Reset should be active for at least four CLK clocks for cache memory 72 to complete reset. Reset will clear all mask and valid bits. |
| WBSTB (BMUXC<0>) | Input | Write Back Strobe. The rising edge of WBSTB results in the cache memory 72 data entry associated with miss address register 110 being latched into write back register set 118. This data should be written to main memory if any is dirty. |
| RHSTB (BMUXC<1>) | Input | Read Hit Strobe. The rising edge of RHSTB results in cache memory 72 data entry associated with hit address register 109 to be latched into read hold register set 114. This data will subsequently be burst to the 486 CPU. |
| HP<8:0> | Inputs/ Outputs | Byte-wide (with parity) data input/output to and from the host CPU. |
| DW# (QWRWQ) | Input | Dirty Word. Active assertion of this signal qualifies the miss fetch word associated with either SRDYI# or SBRDYI# to be written into the data array of the cache memory 72. |
| HA<3:2> | Inputs | These two bits select a doubleword within a given line. These bits are part of the address associated with the data at the host port of the cache memory 72's. |
| HPWEA#, HPWEB#, (HW0,HW1) | Inputs | Host Port Write Enables. HPWEA# is the host port write enable for bank A and HPWEB# is the host port write enable for bank B. A low |

TABLE II-continued

CACHE MEMORY 72 SIGNALS

| Signal | Type | Description |
|---|---|---|
| | | assertion of either HPWEA# or HPWEB# indicates the corresponding bus cycle generated by the host is a write cycle. Either of these two signals being sampled low on a clock edge will trigger the latching of HP data into write register 120. These two signals cannot be both active simultaneously. |
| HPOEA#, HPOEB#, (G0#,G1#) | Inputs | Host Port Buffer Output Enables. HPOEA# will enable data from bank A for the corresponding cycle, while HPOEB# will enable data from bank B. Both signals cannot be active simultaneously. Along with HPOEA# and HPOEB#, SELECT# must be asserted in order to enable the host port outputs. |
| SP<8:0> | Inputs/ Outputs | Byte-wide (with parity) data input/ output to and from main memory. |
| SA<3:2> | Inputs | These two bits select a doubleword within a given line. These address bits are part of the address associated with the data at the system port of the cache memory 72. |
| SRDYI# | Input | A low activation of this signal indicates that the data read from main memory is ready. The low level of this signal, qualified with a clock edge, triggers the data at the system port data pins to be latched into memory update register set 116 in the burst-RAM at the doubleword location by SA<3:2>. |
| SBRDYI# | Input | Assertion (low) of this signal indicates that data is available on the system port. The low level of this signal, qualified with the clock, latches the system port data pins into memory update register set 116 at the doubleword location selected by SA<3:2>. |
| SPOE# (SW#) | Input | System Port Output Enable. A low assertion of SPOE# indicates that the system port will be performing a write operation to main memory. For burst writes, SPOE# should be asserted for all four write data transactions. Along with SPOE#, SELECT# must be asserted to enable the system port outputs. For Bypass operations, SPOE# acts as a direction control signal. BYPASS asserted high with SPOE# low creates a host-to-system port bypass, with the contents of write register 120 being driven onto the system port. BYPASS asserted while SPOE# is high will generate a system-to-host bypass, with system port data being passed directly to the host port. |
| QWR | Input | Quad Write. Activation of Quad Write results in the data residing in memory update register set 116 being written into the cache memory 72 data array entry, at the address pointed to by miss address register 110 and the cache memory 72 internal bank select logic. QWR overrides the mux control logic. In addition, QWR resets both the bank select information previously latched through assertion of MALE, and all mask and valid bits associated with memory update register set 116. |
| BYPASS | Input | This signal connects the host port data HP<8:0> to system port data pins. Specifically, assertion of BYPASS and SPOE# high connect the system port data pins to the host port. To achieve a host-to-system bypass, BYPASS asserted high and SPOE# asserted low connect the output of write register 120 to the system port data pins. |
| SELECT# | Input | Cache memory 72 Chip Select. This signal asserted (low) indicates that the corresponding cache memory 72 is selected. A high assertion of this signal will result in all data output pins being tristated. For any data outputs to be enabled, SELECT# should be asserted. For complex operations which utilize both the host and system ports, SELECT# should be asserted for the entire operation. |
| MWB | Input | Multiple Write-Back. MWB should be used for write-back cache architectures where each tag entry corresponds to two lines. MWB is asserted during write-back cycles, in the case where the other line associated with the replaced tag is dirty and needs to be written back to memory. The assertion (high) of MWB toggles the A4 bit of the address stored in miss address register 110. Subsequent assertion of WBSTB then loads write back register set 118 with the second line of data to be written back to the system. |

Referring back to FIGS. 8A–8C and 12A, all writes to the RAM array section 100 from the host port 113 propagate through the memory write register 120. In addition, the memory write register 120 can be used as a buffer on write cycles, for either buffered write-through cycles or buffered non-cacheable writes. For example, write operations to addresses defined as non-cacheable addresses are buffered in memory write register 120 and consequently can be completed in zero wait states on the local data bus 26. These writes continue on the system data bus 34 until the system accepts the written data. At the same time, local bus operations may continue. This operation is explained in further detail below.

The read hold registers 114A–114D are used to allow one clock-burst read operation from the cache memory 72. During the first transfer of a burst read, 32 bits of data are read into read hold registers 114A–114D. To complete the second, third and fourth transfers, the contents of the read hold registers 114A–114D are driven on the local CPU data bus 26, one doubleword at a time. A burst read hit causes all four 32-bit doublewords within the same line to be read into the read hold registers 114A–114D.

"Wrapped-around" burst order is further supported. The first demand doubleword is fetched and sent to the host port 113 directly from the RAM array section 100. The subsequent three remaining words are next fetched through the read hold registers 114A–114D. This architecture allows very high speed (50 MHz and beyond) burst mode operation without using ultra-fast (sub 10 ns) data RAMs. Burst-order is controlled by signal HA<3:2> and is totally transparent to the cache memory 72.

The write-back registers 118A–118D are used to hide the write-back cycles that occur when system data from read misses replace dirty data. The older line, containing the dirty data, is latched into the write-back registers 118A–118D, allowing the system read to occur without delay. At the completion of the system fetch, the contents of the write-back registers 118A–118D are written back to the system bus 134. For best performance, the cache memory 72 and controller 70 in accordance with the invention allow these quad writes to be burst to the system, if the system memory can accept such bursts.

For miss operations in write-back mode, the write-back registers 118A–118D hold the data from the selected data line in the RAM array section 100 to be replaced. This data is written back to main memory if the replaced line contains valid and dirty data. This allows burst writes on the system memory port 112 without requiring access to the RAM array section 110 for write-back replacement cycles. Therefore, the RAM array section 100 is available to serve the host port 113 for local bus read and write hits.

Memory update registers 116A–116D are used as a holding register for incoming data from system quad fetches due to read and write miss cycles. As each doubleword is returned by the system, it is passed on to the CPU 60 and latched inside one of the memory update registers 116A–116D. At the completion of the system fetch, all four doublewords are written into the RAM array section 100 by assertion of the quad write (QWR) signal.

Inclusion of the memory update registers 116A–116D in the burst RAM architecture allows systems to gain a performance benefit. Since incoming system port 112 data is latched into the memory update registers 116A–116D instead of the RAM array section 100, the array is free to service local bus hit operations as the read miss processing occurs on the system port 112.

As explained above, the memory update registers 116A–116D contain quad fetch miss data from main memory. The order of loading the memory update registers 116A–116D is controlled through signal SA<3:2>, making burst-order to main memory purely transparent to the burst RAM. Once the line is loaded into the memory update registers 116A–116D, the entire line is loaded into the cache RAM array section 100 in one clock by activating the QWR signal.

Associated with each byte of the memory update registers 116A–116D is both a valid and a mask bit. The functionality of the mask and valid bits is shown below. When signal QWR is asserted (high) on a clock edge, the contents of the memory update registers 116A–116D are updated into the RAM array section 100, as pointed to by the address data stored in miss address register 110 and the previously latched bank select information (explained below). Each byte of memory update registers 116A–116D is written to the RAM array section 100 if its valid bit is set (indicating valid data from the system port 112), and its MASK bit is cleared (indicating no advance write occurred for that byte).

| Condition | On QWR and CLK: |
| --- | --- |
| MASK# & VALID# | NO WRITE |
| MASK# & VALID | WRITE OCCURS |
| MASK & VALID# | NO WRITE |
| MASK & VALID | NO WRITE |

Figure 15:
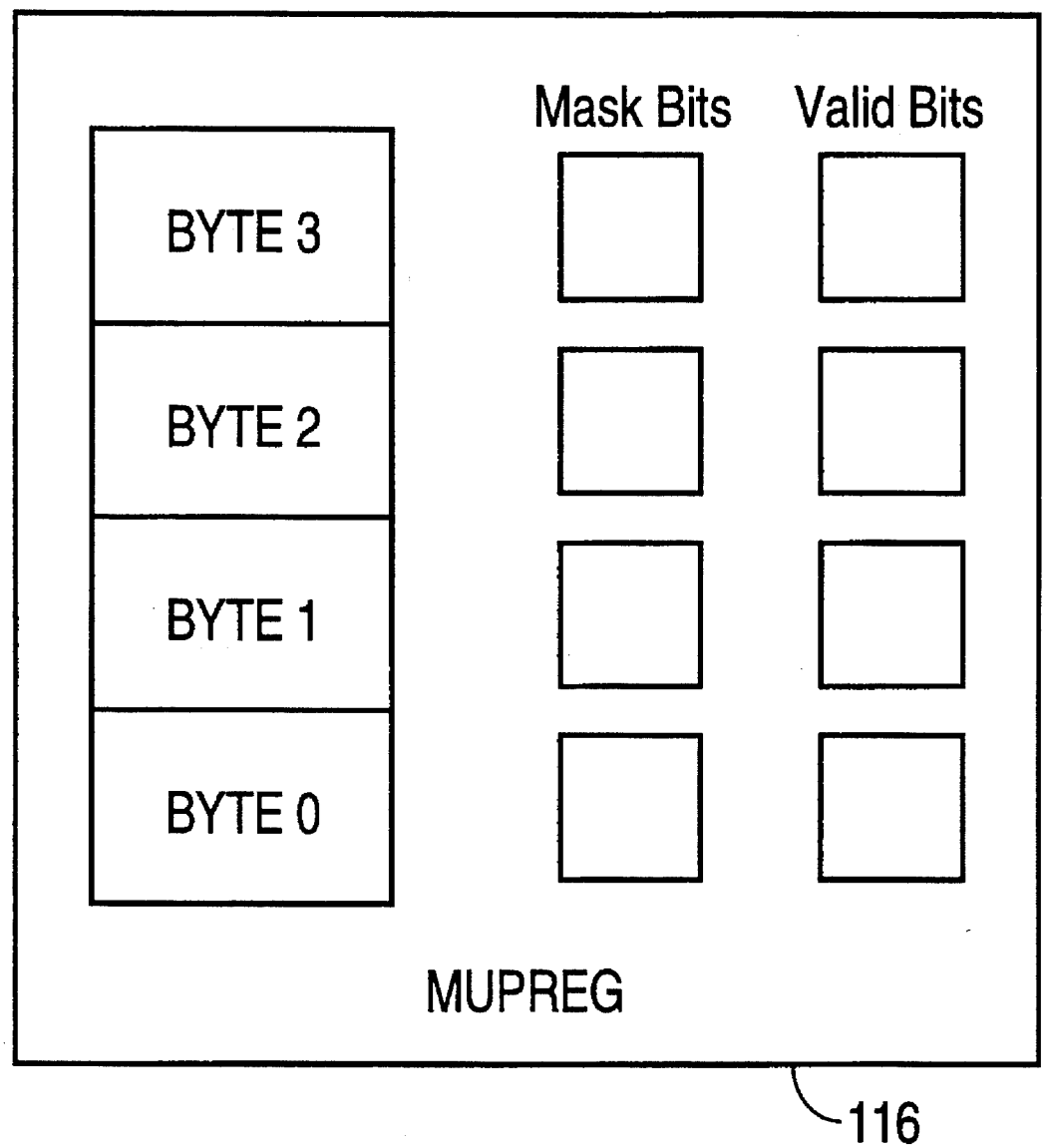
FIG. 15 is a diagram showing the internal organization of the memory update registers set 116.

FIG. 15 shows the internal organization of the memory update registers 116A–116D.

Mask bits are set during advance writes by assertion of MALE#, SELECT#, and either HPWEA# or HPWEB#. The mask bit set within memory update registers 116A–116D is selected by SA<3:2>. Setting of the mask bits will be further described below. The valid bits are set by assertion of SELECT# and either SRDYI# or SBRDYI#. As with the mask bits, the valid bit set within memory update registers 116A–116D is selected by SA<3:2>. A further discussion of the valid bits is also given below.

Assertion of QWR (quad writes) clears all valid and mask bits associated with memory update registers 116A–116D. This allows subsequent advance write or system fetch to begin.

The bank section of RAM array section 100 is next considered. Host port 113 reads from and writes to bank 106 are selected by HPOEA# and HPWEA#, respectively, and host port 113 reads from and writes to bank 108 are selected by HPOEB# and HPWEB#, respectively. A low assertion of signal HPWEA# signifies a write cycle from the host port 113 to bank 106 through write register 120, and a low assertion of HPWEB# signifies a write cycle from the host port 113 to bank 108 through write register 120. HPOEA# and HPOEB# are active low output enables. A low assertion of HPOEA# will gate the read data from bank 106 to host port 113 and the low assertion of HPOEB# will gate the read data from bank 108 to the host port 113. HPWEA#, HPWEB#, HPOEA# and HPOEB# cannot be active simultaneously. For system port 112 reads and writes, the burst RAM cache memory 72 uses previously-latched inputs for bank selection.

Detection of a CPU miss, indicated by assertion of signal MALE (Miss Address Latch Enable), causes latching of bank select information. After signal MALE is asserted, the bank select information is latched within the burst RAM. Subsequent system port read (RAM array section 100 to write back) and write (memory update register set 116A–116D to RAM array section 100) operations are directed to the bank previously selected when MALE was asserted. QWR (quad write) activation or assertion of signal RESET clears the latched bank select information. Similarly, the SELECT# signal is latched through MALE for the system port miss processing operations between the burst RAM and main memory.

Referring again to FIGS. 8A–8C, the control logic and transceivers section 104 further comprises four multiplexers 111A–111D for routing data, a plurality of control signal decoders 119, 122, 124, 128, 129, 150, 158 and 166, and a plurality of data path drivers designated with solid triangular symbols. Each of the data path drivers is singly identified and further described below.

The operation of the burst RAM chip is next explained for several general and specific operating modes and cycles as explained in the sections below. FIGS. 6, 7, and 8A–8C will be referenced in the following description of each mode. Furthermore, within the following description, signal timing diagrams are referenced to illustrate control of the various data paths. Several of the signals shown control decoders 119, 122, 124, 128, 129, 150, and 166. Table III below lists each of these decoders and the functions implemented at their respective output lines.

TABLE III

| DECODER OUTPUT | | FUNCTION IMPLEMENTED |
|---|---|---|
| 119 | = | $\overline{\text{SELECT\#}}$ • BG • $\overline{(\text{BYPASS•SPOE\#})}$ |
| BG | = | $\overline{\text{HPOEA\#}}$ + $\overline{\text{HPOEB\#}}$ |
| 122A | = | SA3 • SA2 • $\overline{\text{BYPASS}}$ • $\overline{\text{SPOE\#}}$ • SPSEL |
| 122B | = | SA3 • $\overline{\text{SA2}}$ • $\overline{\text{BYPASS}}$ • $\overline{\text{SPOE\#}}$ • SPSEL |
| 122C | = | $\overline{\text{SA3}}$ • SA2 • $\overline{\text{BYPASS}}$ • $\overline{\text{SPOE\#}}$ • SPSEL |
| 122D | = | $\overline{\text{SA3}}$ • $\overline{\text{SA2}}$ • $\overline{\text{BYPASS}}$ • $\overline{\text{SPOE\#}}$ • SPSEL |
| 122E | = | BYPASS • $\overline{\text{SPOE\#}}$ • SPSEL |
| SPSEL | = | SPSELPM + ($\overline{\text{SELECT\#}}$ • BYPASS ) + $\overline{\text{SPOE\#}}$ |
| SPELPM | = | (SPSELPMST • $\overline{\text{SPSELPMRST}}$) |
| SPELPMST | = | $\overline{\text{SELECT\#}}$ • MALE + MPINC • $\overline{\text{MALE}}$ |
| SPELPRST | = | (BYPASS • $\overline{\text{SW\#}}$ • $\overline{\text{SELECT\#}}$) + BRESET + SELECT# |
| 128A | = | HA <3> • HA <2> |
| 128B | = | $\overline{\text{HA}}$ <3> • HA <2> |
| 128C | = | HA <3> • $\overline{\text{HA}}$ <2> |
| 128D | = | $\overline{\text{HA}}$ <3> • $\overline{\text{HA}}$ <2> |
| 128E | = | RHSTB • $\overline{\text{QWR}}$ |
| 128F | = | WBSTB + QWR |
| 150A | = | HA3 • HA2 • $\overline{\text{QWR}}$ • BHW • $\overline{(\text{BHW•MALE})}$ |
| 150B | = | HA3 • $\overline{\text{HA2}}$ • $\overline{\text{QWR}}$ • BHW • $\overline{(\text{BHW•MALE})}$ |
| 105C | = | $\overline{\text{HA3}}$ • HA2 • $\overline{\text{QWR}}$ • BHW • $\overline{(\text{BHW•MALE})}$ |
| 105D | = | $\overline{\text{HA3}}$ • $\overline{\text{HA2}}$ • $\overline{\text{QWR}}$ • BHW • $\overline{(\text{BHW•MALE})}$ |
| BHW | = | $\overline{\text{HPWEA\#}}$ + $\overline{\text{HPWEB\#}}$ |
| 163 | = | BYPASS • SPOE# • $\overline{\text{SELECT\#}}$ |
| 166 | = | QWR |
| 158D | = | BHW • BWED • BKOSEL |
| 159D | = | BHW • BWED • BK1SEL |
| BWED | = | BWEBQWR + BWEDHWR |
| BWEDQWR | = | QWR • VALID0 • $\overline{\text{MASK0}}$ |
| BWEDHWR | = | HA3 • $\overline{\text{HA2}}$ • BHW • $\overline{\text{QWR}}$ • $\overline{\text{BYPASS}}$ • $\overline{\text{MALE}}$ |
| BHW | = | $\overline{\text{HW0\#}}$ + $\overline{\text{HW1\#}}$ |
| BK1SEL | = | SELECT BANK 1 (108) |
| BKOSEL | = | SELECT BANK0 (106) |
| 158C | = | BHW • BWEC • BKOSEL |
| 159C | = | BHW • BWEC • BK1SEL |
| BWEC | = | BWECQWR + BWECHWR |
| BWECQWR | = | QWR • BALDI1 • $\overline{\text{MASK1}}$ |
| BWECHWR | = | $\overline{\text{HA3}}$ • HAW•BHW • $\overline{\text{QWR}}$ • $\overline{\text{BYPASS}}$ • $\overline{\text{MALE}}$ |
| 158B | = | BHW • BWEB • BKOSEL |
| 159B | = | BHW • BWEB • BK1SEL |
| BWEB | = | BWEBQWR + BWEBHWR |
| BWEBQWR | = | QWR • VALID2 • $\overline{\text{MASK2}}$ |
| BWEBHWR | = | HA3 • $\overline{\text{HA2}}$ • BHW • $\overline{\text{QWR}}$ • $\overline{\text{BYPASS}}$ • $\overline{\text{MALE}}$ |
| 158A | = | BHW • BWEA • BKOSEL |
| 159A | = | BHW • BWEA • BK1SEL |
| BWEA | = | BWEAQWR + BWEAHWR |
| BWEAQWR | = | QWR • VALID3 • $\overline{\text{MASK3}}$ |
| BWEAHWR | = | HA3 • HA2 • BHW • $\overline{\text{QWR}}$ • $\overline{\text{BYPASS}}$ • $\overline{\text{MALE}}$ |
| 124 | = | [QWR • $\overline{\text{BHW}}$ + BHW • MALE] • BKOSEL |
| 127 | = | [QWR • $\overline{\text{BHW}}$ + BHW • MALE] • BK1SEL |

HOST PORT OPERATIONS

Host Port Single Reads

Figure 16:
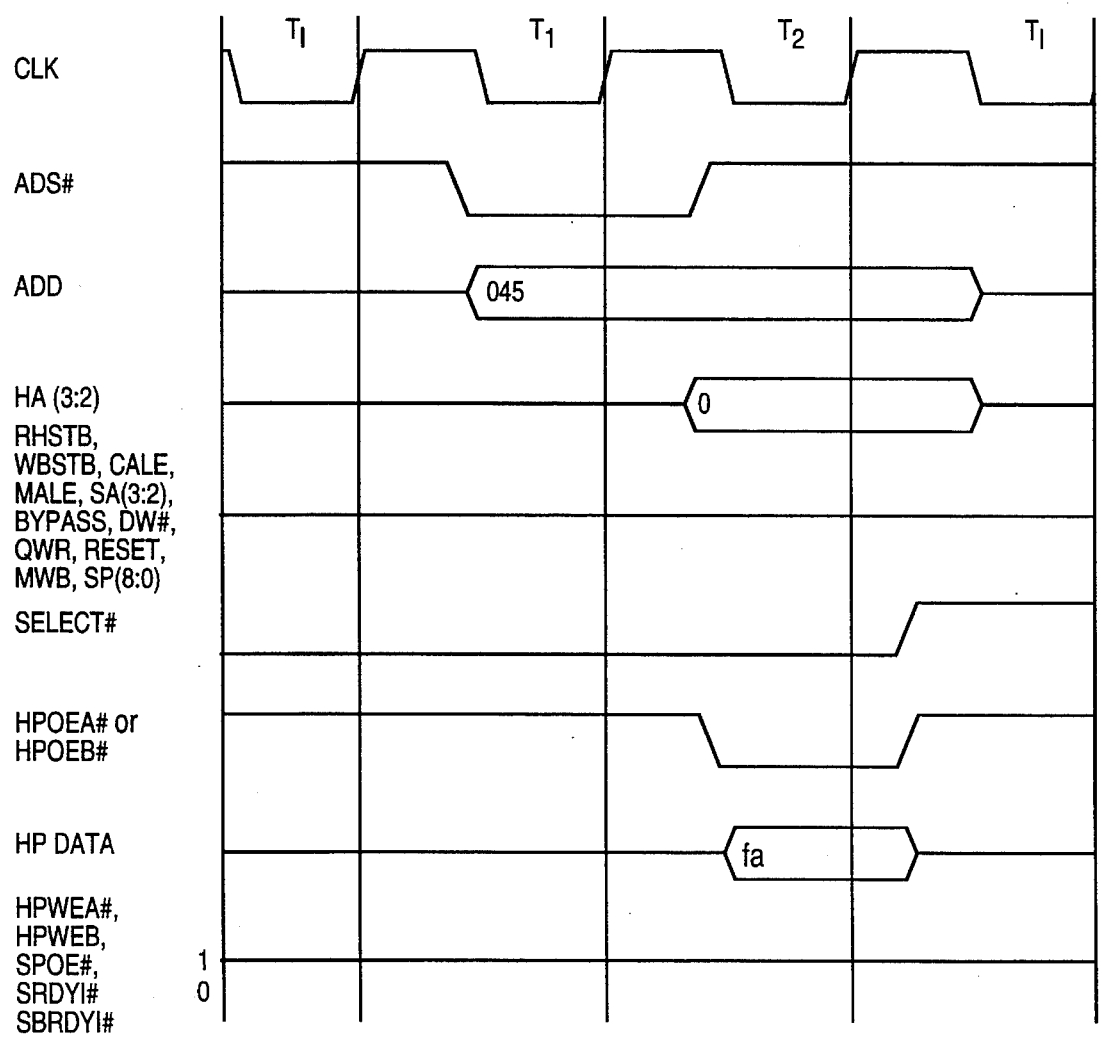
FIG. 16 is a set of waveforms showing control and data signals for a single host port read operation.

Cache memory 72 allows single read operations with the local bus processor through the host port. A single read operation is shown in FIG. 16.

The falling edge of ADS# activates the hit address register 109 into flow-through mode. Activation of SELECT# enables the internal bank select logic of the cache memory 72. The falling edge of HPOEA# or HPOEB# indicates to the cache memory 72 which bank will supply the data. The RAM array section 100 is accessed and read to the local processor through the host port 113. After access times of valid address to valid data delay, data valid delay from HPOEx#, and data valid from HA<3:2> have passed, valid data is available on the host port 113 of the cache memory 72.

Host Port Burst Reads

Figure 17:
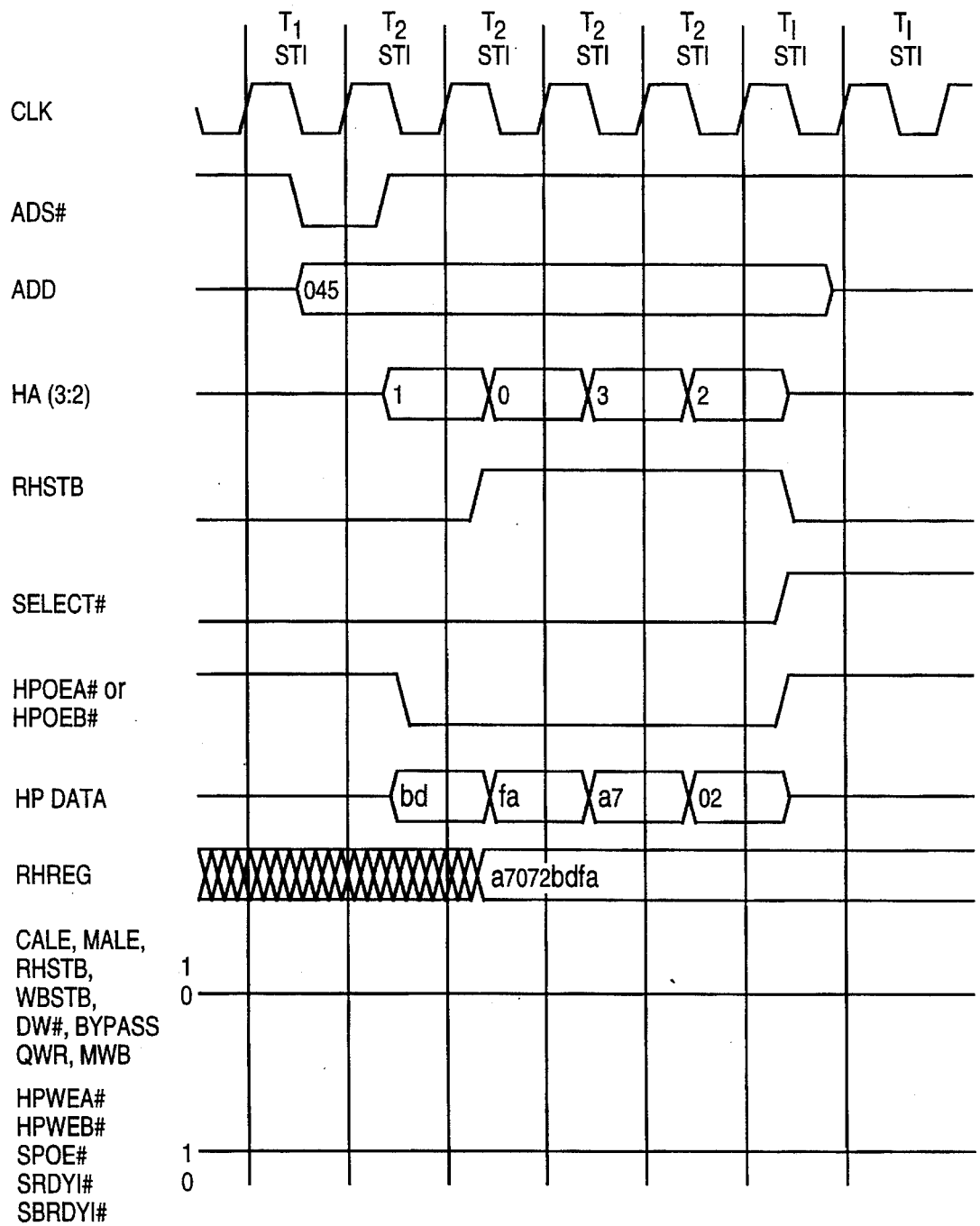
FIG. 17 is a set of waveforms showing control and data signals for a host port burst read operation.

The architecture of the cache memory 72 supports burst mode read operations. Each cache memory chip 72A–72D contains the internal 32-bit read hold register set 114A–114D to facilitate high-speed burst read hit operations. Up to four-transfer burst are possible with the architecture of the cache memory 72. FIG. 17 shows a four-transfer burst operation.

The first transfer of a burst read is accessed similarly to the scalar read previously described. ADS# assertion will activate hit address register 109 into a 'flow-through' mode. RHSTB should be deasserted (low) to allow data from the cache RAM array section 100 to bypass the read hold register set 114 and be sent to the host port data pins.

After the completion of the first transfer, signal RHSTB can be asserted. This has two effects. First, the entry in the RAM array section 100 pointed to by the hit address register 109 and bank select inputs will be latched into read hold register set 114 as the rising edge of RHSTB occurs. Second, RHSTB being held high (while BYPASS and WBSTB are low) will connect the output of the read hold register set 114 to the host port 113 data pins.

During the access that the read hold register set 114 is loaded, two timing parameters must be met in order to supply valid data on the host port. Both tx (RHSTB to valid HP data) and ty (HA<3:2> to valid host port data) must be met. After both of these parameters have been satisfied, the read hold register set 114 drive valid data onto the host port 113.

Once the read hold register set 114 has been loaded, the remaining transfers of the burst read come from the read hold register set 114, making very fast burst accesses possible. Burst order are controlled by the HA<3:2> inputs, with the burst order transparent to the MS443's. As HA<3:2> toggles the next burst-order address, valid data from the read hold register set 114 will be available after ty has passed. RHSTB should be held high and WBSTB low to keep the read hold register set 114 connected to the host port.

Note that once read hold register set 114 has been loaded, the RAM array section 100 is available for system port operations. In addition, the host port is available for use while miss processing is occurring on the system side.

Host Port Single Writes

The cache memory 72 supports single host port write operations. The falling edge of ADS# sets hit address register 109 into "flow-through" mode. Similarly, assertion of either the two write enables (HPWEA# or HPWEB#) will cause host port data to begin flowing through the write register 120, as well as select which of the two banks of the RAM array section 100 is to be updated. HPWEA# and HPWEB# can trigger the write operation. Sampling either of these inputs asserted (low) on a rising clock edge, with MALE deasserted, will result in the data in write register 120 to be written into the RAM array section 100. HA<3:2> controls which byte within a doubleword in the RAM array section 100 is to be updated.

Figure 18:
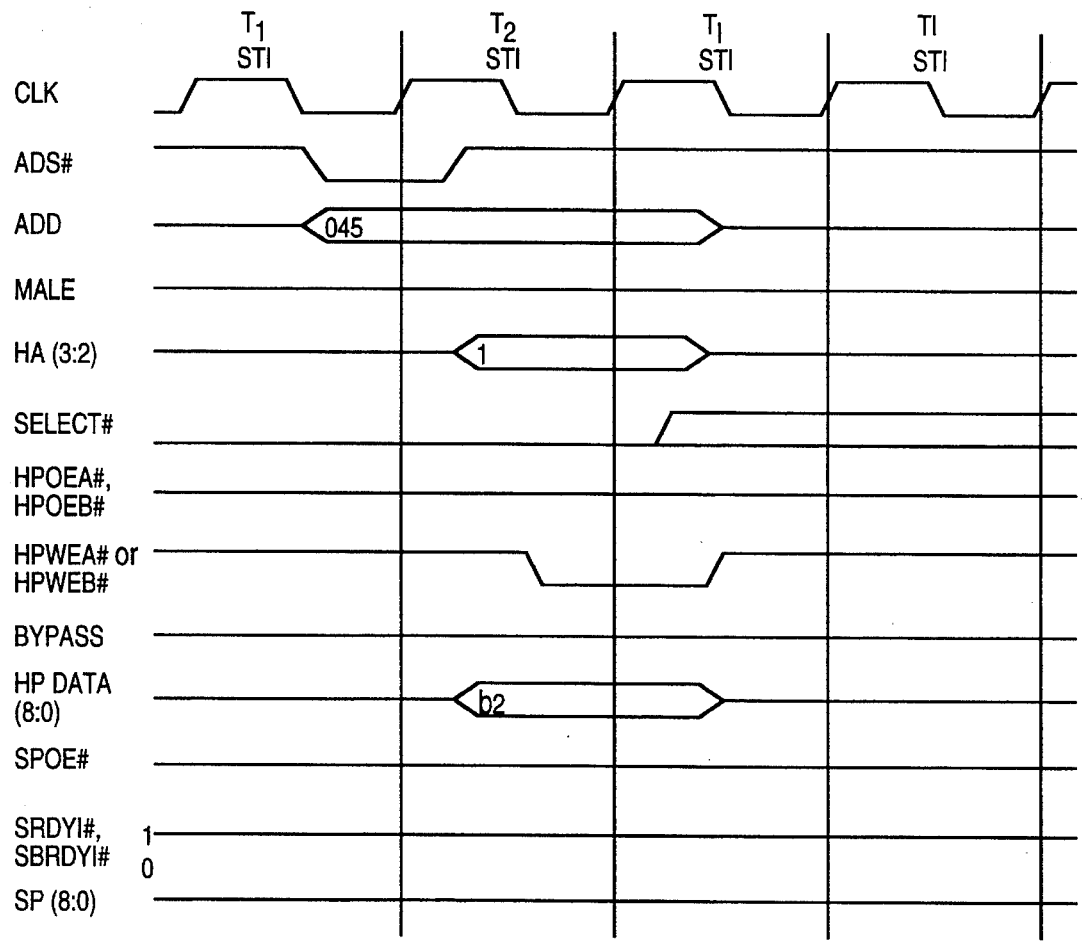
FIG. 18 is a set of diagrams showing control and data signals for a host port single write operation.

FIG. 18 shows a host port write operation to the cache memory 72.

Activation of signal MALE will inhibit write register 120 data from being written into the data array. The write enable signals are sampled on every clock edge. Hence, a write into the RAM array section 100 will occur only on the rising edge of a clock, if MALE is inactive and either HPWEA# or HPWEB# asserted. As will be shown later, buffered writes can be performed by asserting HPWEA# or HPWEB# to latch data into write register 120, and then inhibiting the array write by asserting signal MALE.

Finally, as the write to the RAM array section 100 occurs, the corresponding bit in the memory update register set 116 will be set. This allows 'advance' writes to occur. Advance write operation is explained in more detail below.

SYSTEM PORT OPERATIONS

System Port Single Reads

Figure 19:
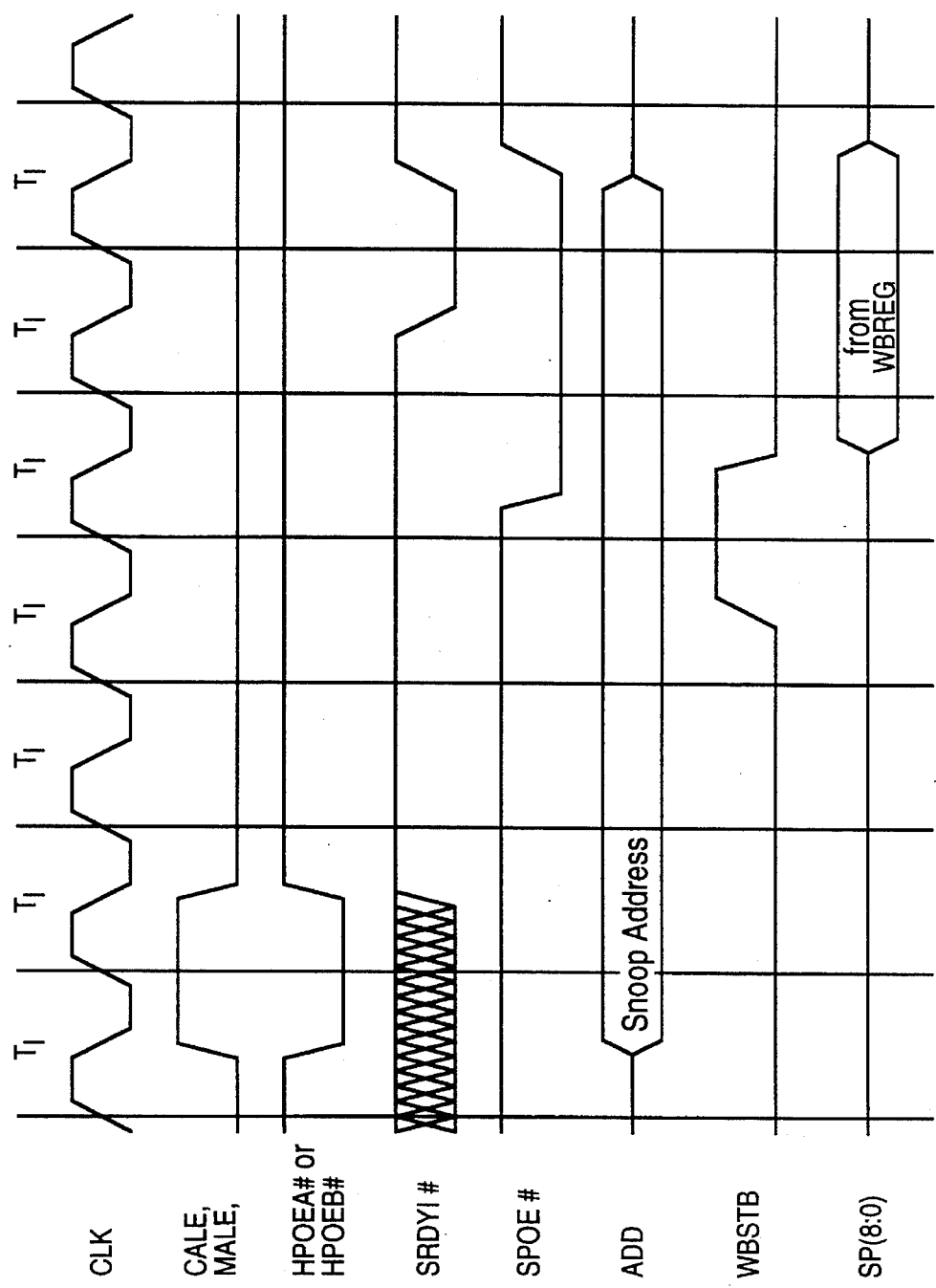
FIG. 19 is a set of waveforms showing control and data signals for a system port single read operation.

There is no direct path between the RAM array section 100 and the system port 112. Cycles which require the burst-RAMs 72A–72D to supply data on the system port 112 (such as snoop reads) may be accomplished as follows. First, the assertion of either ADS# or CALE allows the address to flow through hit address register 109. MALE should be asserted to latch the request into miss address register 110. The assertion of WBSTB and HPOEA# or HPOEB# latch data into write back register set 118. Finally, with SPOE# asserted, while BYPASS is deasserted, will enable the contents of write back register set 118 onto the system port 112. SA<3:2> will select among the four bytes of write back register set 118. For read cycles, the states of SRDYI# and SBRDYI# are not used. FIG. 19 details a single read operation on the system port 112.

System Port Burst Reads

Burst reads from the RAM array section 100 to the system port 112 may be accomplished. One case where burst reads from the RAM array section 100 to the system port 112 are necessary are for flushing the cache. These reads would begin as detailed above in the single read case. Once write back register set 118 has been loaded with four bytes of data, these bytes may be burst onto the system bus byte-by-byte, with SA<3:2> toggling to select among the four bytes. SPOE# should remain asserted, and BYPASS deasserted, in order to enable the contents of write back register set 118 onto the system port 112.

System Port Single Writes

As before in the system port read case, there is no path to allow direct writing from the system port 112 to the RAM array section 100. Writes from the system port 112 must first propagate through the memory update register set 116 before they can be stored in the RAM array section 100. Snoop writes are an example of system port writes cycles.

Before memory update register set 116 can be written into the RAM array section 100, the bank 106 or 108 of the cache memory 72 which is to be written to must be selected. This is done as described above, by assertion (low) of SELECT# and either the HPOEA# or HPOEB# inputs. The assertion of signal MALE latches both the bank select information and the address into miss address register 110.

Memory update register set 116 is loaded by the assertion of either SRDYI# or SBRDYI# on a rising clock edge. The byte of data appearing on the system port 112 is latched into memory update register set 116, as selected by the SA<3:2> inputs.

As the 9 bits of data from the system port 112 are updated into memory update register set 116, the corresponding valid bit will be set if signal DW# is inactive (high). This valid bit being set will allow the corresponding byte of memory update register set 116 to be written into the cache memory RAM array section 100, when signal QWR is later asserted. The presence of valid bits allow abortion of quad fetch on read miss for a subsequent pending write request in write-through mode to access the main memory interface. Valid bits make partial write of a fetched line possible.

Activation of the DW# signal indicates that the cache memory RAM array section 100 contains dirty data at the same address. Correspondingly, activation (low) of signal DW# inhibits dirty and valid miss data from being overwritten by quad fetch miss data by clearing the corresponding valid bit.

Once miss address register 110 is loaded and the bank selected, the data within memory update register set 116 may be written into the RAM array section 100. This write is accomplished by assertion of the QWR signal on a clock edge. The bytes of memory update register set 116 which did not receive any writes from the system port 112 will not be updated into the RAM array section 100, as the valid bit for these bytes is cleared. The quad write operation clears all valid and mask bits associated with memory update register set 116.

Figure 20:
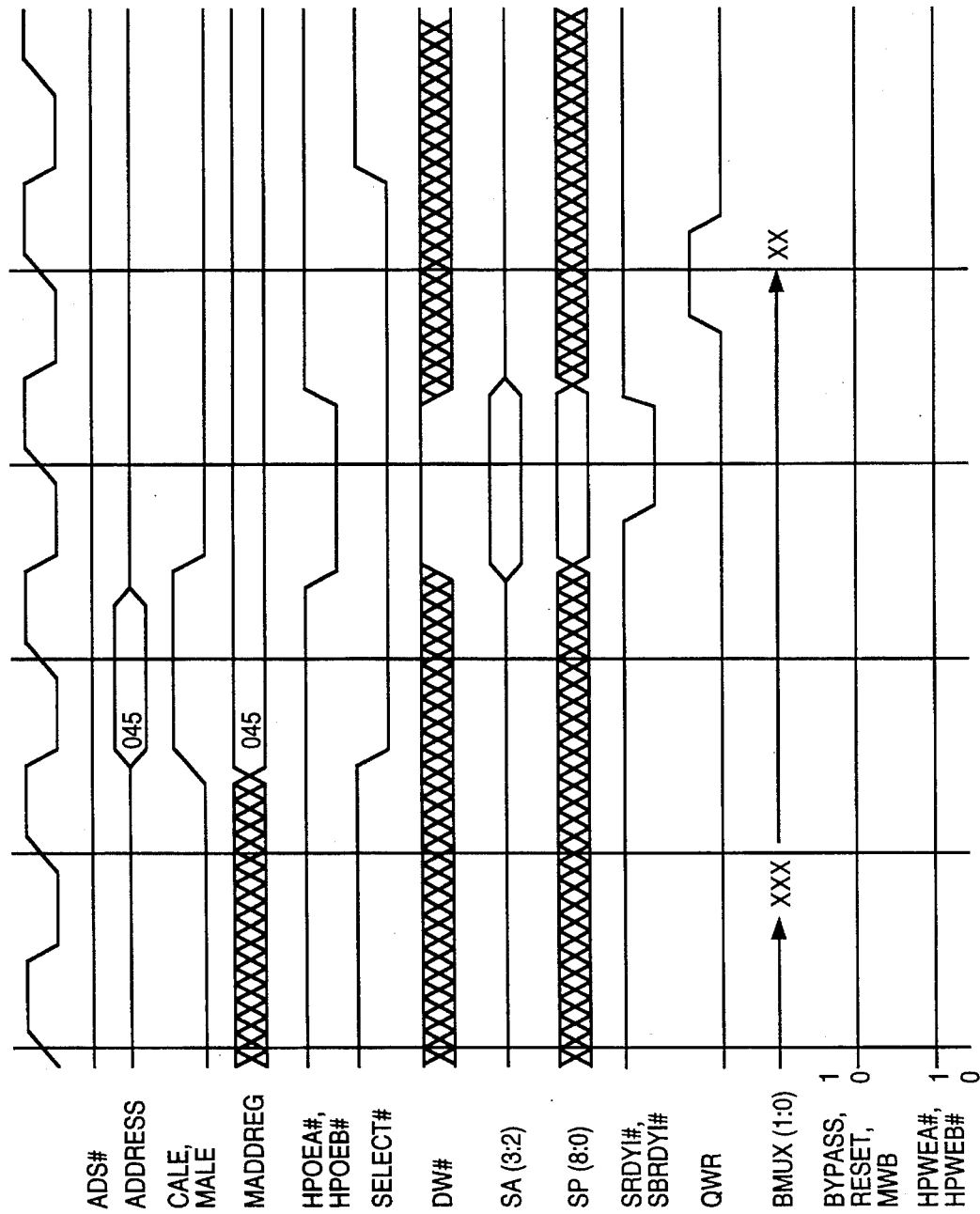
FIG. 20 is a set of waveforms showing control and data signals for a system port single write operation.

FIG. 20 shows a single write operation to the RAM array 100 through the system port 112.

System Port Burst Writes

System port burst write operations execute similar to the above described operation for system port single writes. Since memory update register set 116 is a 32-bit register, up to four bytes may be loaded into memory update register set 116 before its contents are written into the RAM array section 100. Assertion of SRDYI# or SBRDYI# on the clock edge loads the system port 112 data into the memory update register set 116 byte pointed to by SA<3:2>. The four bytes of memory update register set 116 can be loaded in as quickly as four clocks.

DUAL-PORT OPERATIONS

Bypass Operations

For optimum performance, the architecture of the cache memory 72 allows bypass operations. Bypass can occur in either direction as described below.

Host to System Port Bypass

Some host bus cycles may be designated as write-through cycles. The architecture of the cache memory 72 supports these cycles.

Activation of BYPASS together with signal SPOE# (low) will create a host-to-system bypass condition, with data from the write register 120 being passed directly to the system port 112. The assertion of BYPASS and SPOE# will override and reset the selection information previously latched by the rising edge of MALE. The controller 70 controlling the cache memory 72 must ensure that all miss processing operations are completed at the system port 112 before any bypass write cycles begin.

Updates to the cache RAM array section 100 may occur during bypass operations as previously described in the section on Host Port Writes. The combination of either HPWEA# or HPWEB# asserted, SELECT# asserted, and MALE negated on a rising clock edge will generate a write into the cache RAM array section 100 during a host-to-system port bypass.

Buffered Host to System Port Bypass

Write operations to the cache memory 72 may occur as buffered writes. As described above, the falling edge of either HPWEA# or HPWEB# allows host port 113 data to begin flowing through the write register 120. Once write register 120 has been loaded with valid data, the buffered write may then be accomplished by asserting BYPASS high and SPOE# low. The contents of write register 120 will be driven onto the system port data pins while these two inputs remain asserted.

Since buffering occurs in the write register 120, buffered write operations may occur whether or not an update into the cache RAM array 100 occurs.

Figure 21:
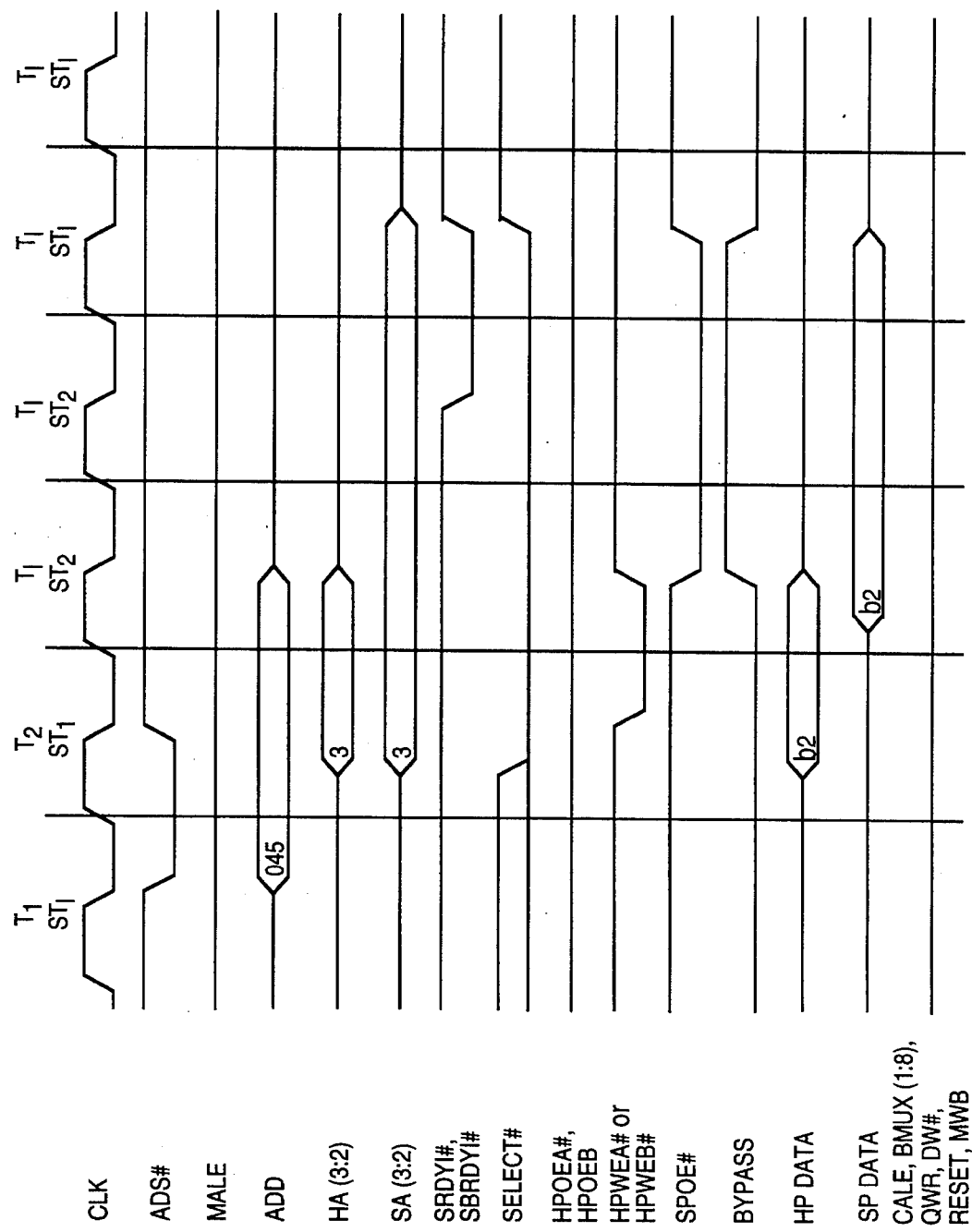
FIG. 21 is a set of waveforms showing control and data signals for a buffered host to system bypass operation with update.

FIG. 21 shows a cache update due to a host port 113 write, with the write being buffered and continuing on the system port 112, until the system accepts the write data. Buffered write misses will be detailed in the write miss section; however, they proceed identically except for the MALE input. Unlike the BYPASS read case, in BYPASS writes, the state of the MALE input is recognized.

Figure 22:
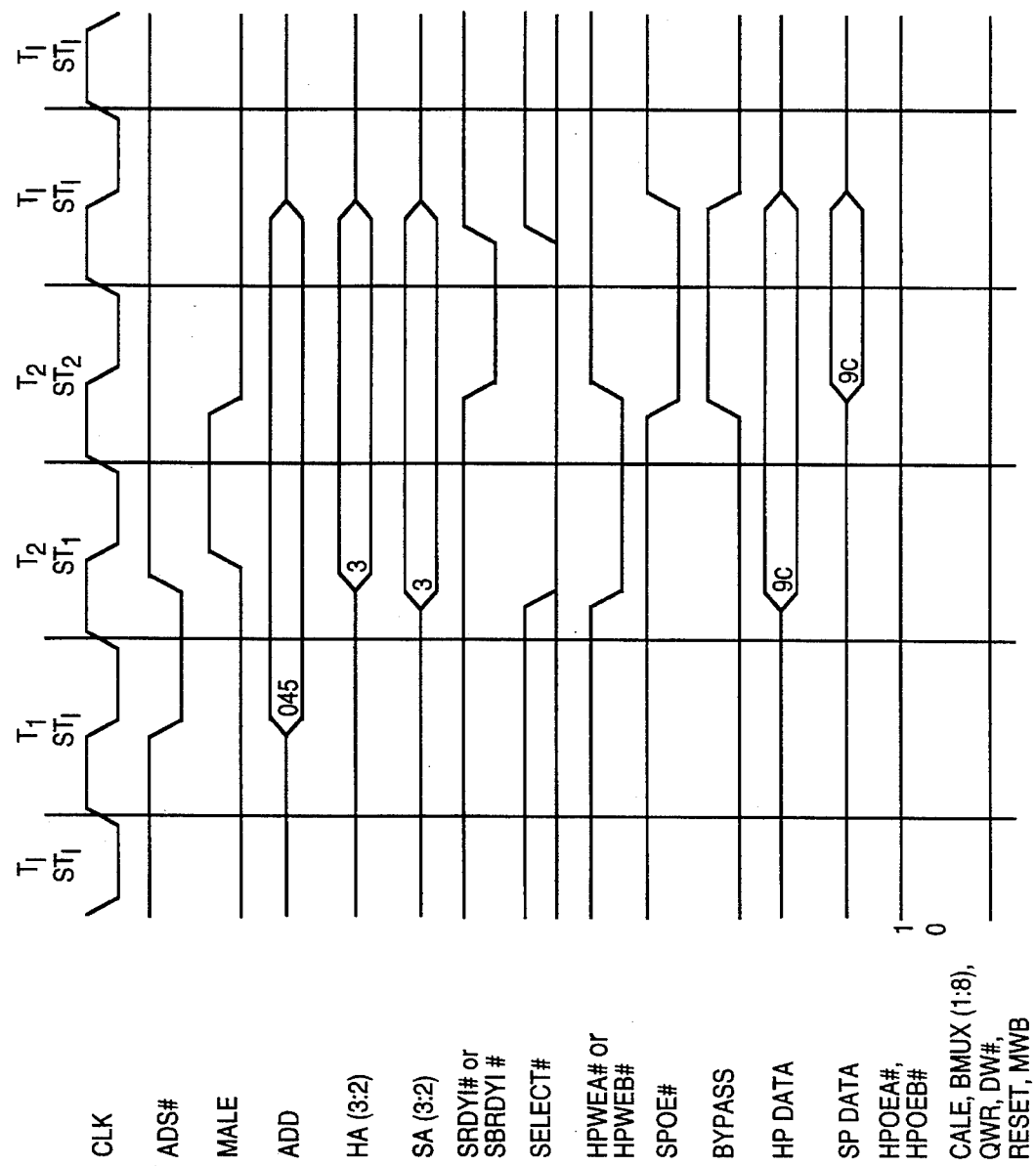
FIG. 22 is a set of waveforms showing control and data signals for a buffered host to system bypass operation without update.

FIG. 22 details a buffered write operation, where no cache update occurs. MALE is asserted to inhibit the write operation.

System to Host Port Bypass

System-to-host port bypasses may also be generated. During cache read miss cycles, the requested data may be bypassed asynchronously from the host port 113 to the system port 112 in order to minimize the miss penalty and optimize performance. Use of the BYPASS path allows read miss processing to occur as quickly as possible, with no clock latencies between arrival of incoming data at the system port 112 and forwarding of the same data on to the host port 113. Designers should allow for the BYPASS propagation delay from the system port 112 to the host port 113, in addition to the normal CPU read data setup time.

As the data arrives at the system port 112, it may be bypassed directly to the host port 113 by assertion of the BYPASS and SPOE# signals high. Note the dual functionality of SPOE#. When BYPASS is deasserted, SPOE# is used to enable system port data from write back register set 118 onto the system port 112. When BYPASS is asserted, however, SPOE# acts as a direction control for BYPASS.

SRDYI# or SBRDYI# sampled asserted (low) on a rising clock edge will latch system port data into memory update register set 116. Since memory update register set 116 is a 36-bit register, SA<3:2> will select one of four bytes in memory update register set 116.

Figure 23:
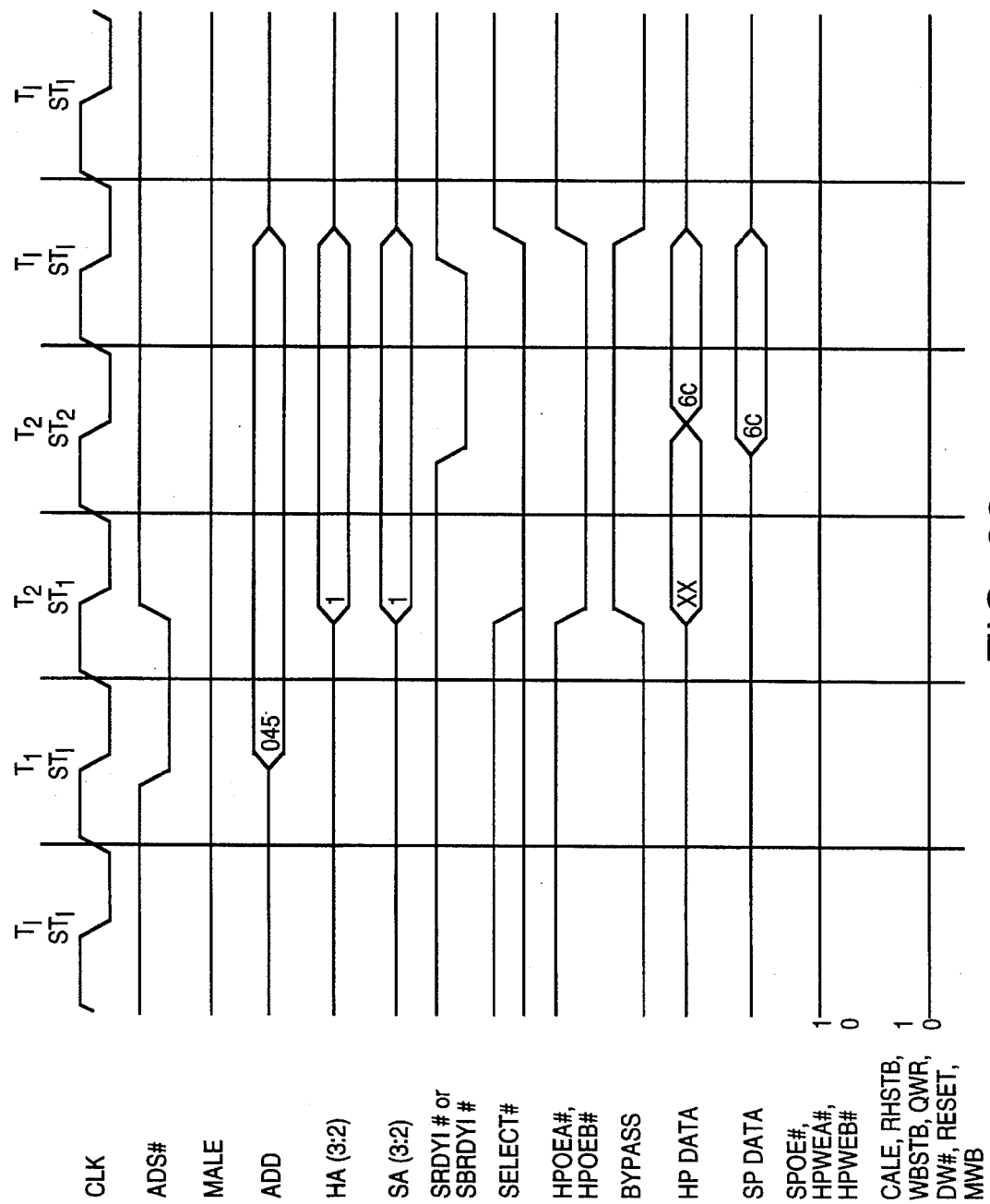
FIG. 23 is a set of waveforms showing control and data signals for a system to host port bypass operation.

In addition, cycles which the cache controller 70 designates as non-cacheable may be easily handled with the BYPASS signal. By asserting BYPASS, the requested data will be supplied by the system port 112 rather than the cache RAM array section 100. FIG. 23 shows a non-cacheable cycle, with the assertion of BYPASS and SPOE# held high generating a system-to-host bypass. Note that when BYPASS is asserted, MALE becomes a "don't care" input.

As the system-to-host bypass cycle occurs, system port data may be latched into memory update register set 116. This can be accomplished on rising clock edges by assertion (low) of either the SRDYI# or SBRDYI# inputs. The cache memory 72 does not differentiate between these inputs, and they are internally ANDed together. Assertion of either of these on a clock edge will latch system port data into one byte of memory update register set 116, as selected by SA<3:2>, provided data has been valid one setup time previous to the rising edge of the clock.

Assertion of the QWR signal (on a clock edge) will then write the contents of memory update register set 116 into the cache RAM array 100. Any mask bits set in memory update register set 116 will inhibit writes to the corresponding byte in the RAM array section 100.

System to Host Port Bypass with Reordering

Memory update register set 116 can act as a buffer register if the burst-order between the 486 host and main memory is different. Memory subsystems using DRAM nibble mode are likely to use sequential burst order, unlike the i486 CPU. As each of the subsequent three doublewords of the burst are read from main memory, they are bypassed to the host port 113 if the burst orders are the same. A differential in burst order will result in data coming from memory update register set 116. Signal QWR can be asserted once all miss data from memory is updated into the memory update register set 116.

Figure 24:
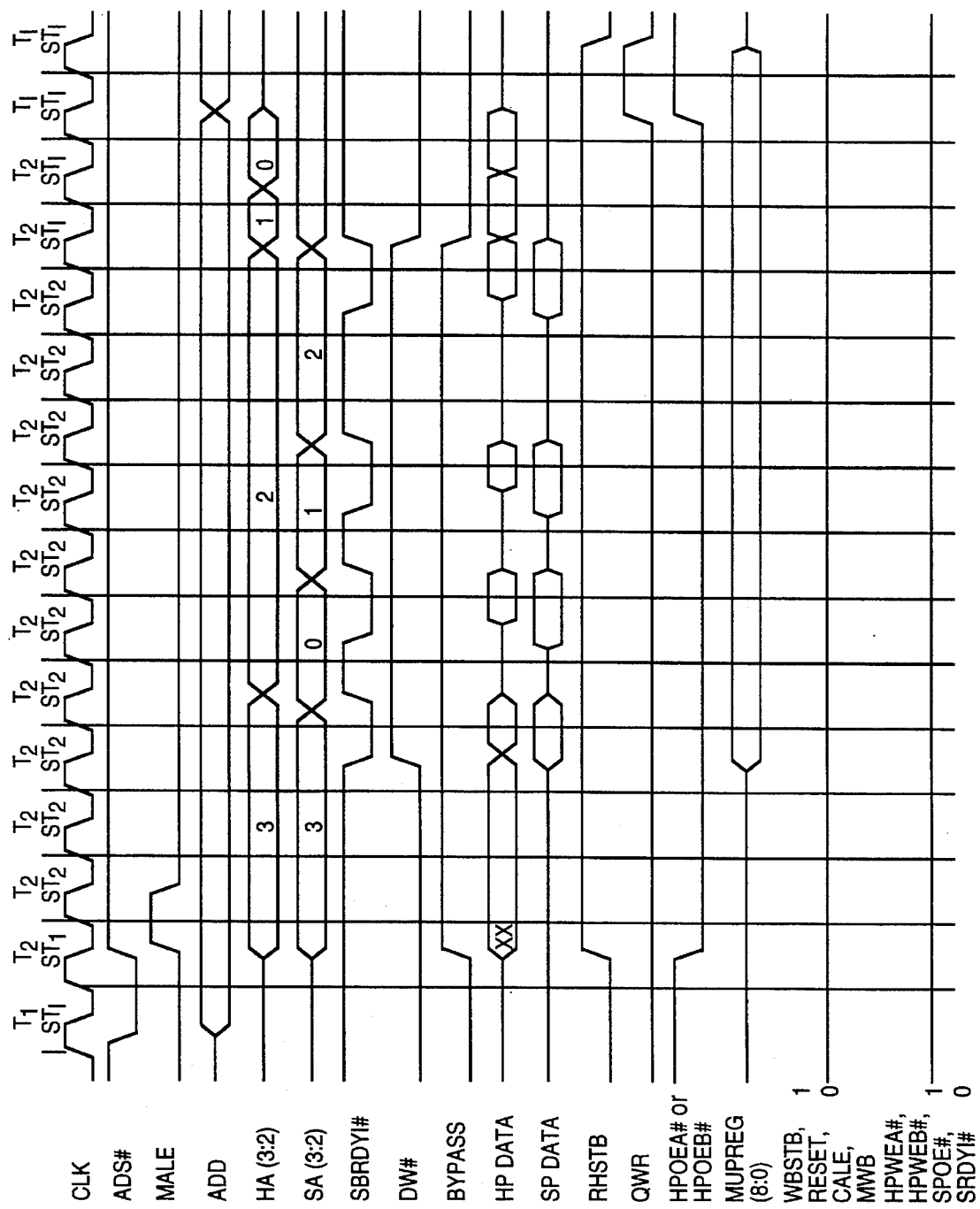
FIG. 24 is a set of waveforms showing control and data signals for a system to host port bypass operation with reordering.

FIG. 24 details a read miss, where reordering occurs between the system and host ports.

System to Host Port Bypass with Partially Dirty Lines

Some cache architectures may contain lines of data which are partially dirty. FIG. 25 shows a line which is partially valid and partially dirty. For i486 CPU reads from such a line, the cache memory 72 must supply the data which is dirty, while the system must supply the portion of the line which is not present in the cache. The architecture of the cache memory 72 supports such situations.

Figure 26:
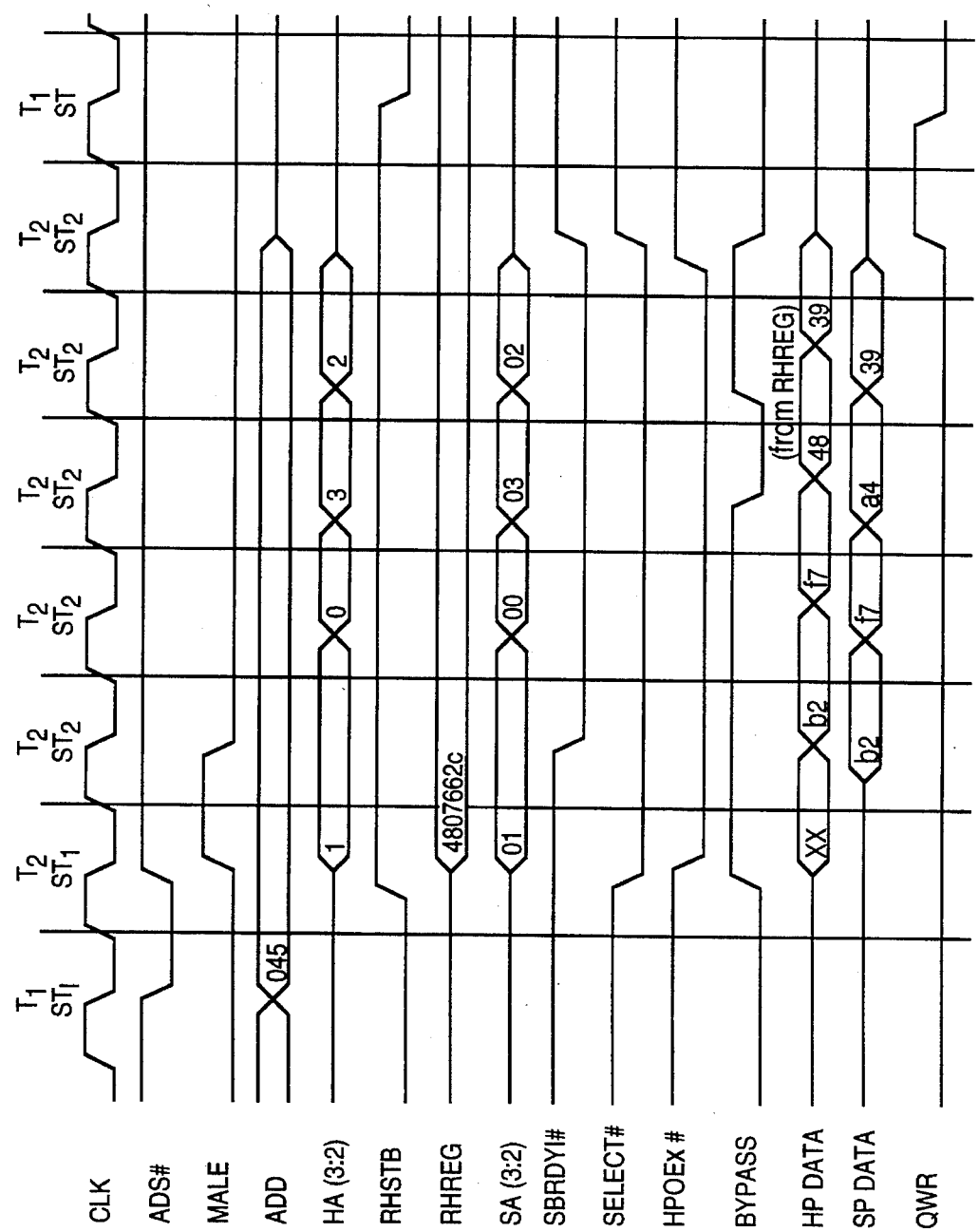
FIG. 26 is a set of waveforms showing control and data signals for a system to host port bypass operation with update and partially dirty line.

System-to-host port bypass cycles may be interrupted by negation of the Bypass signal. When Bypass is negated, the cache memory 72 will supply data as selected by either HPOEA# or HPOEB#, the host port address, and HA<3:2>. FIG. 26 shows a CPU read miss, from the line detailed in FIG. 25. During the third transfer, the negation of Bypass causes the cache memory 72 to supply the dirty data from its RAM array 100.

Advance Writes

The cache memory 72 architecture supports "advance" host port writes in write-back cache architectures. "Advance" write miss processing means that write miss data can be directly updated into the RAM array section 100 in cache memory 72. System fetches at the same address, in order to fill the remainder of the cache line, can occur subsequently and be written into the RAM array section 100 without overwriting the previously stored data.

There is a mask bit for each byte of memory update register set 116. Mask bits can be used to support advance writes. As a write miss (SELECT# and either HPWEA# or HPWEB#) from the host port 113 (through write register 120) occurs, the mask for the corresponding byte (as selected by HA<3:2>) in memory update register set 116 is set. Any subsequent fetches from the system port 112 will not overwrite the data now written into the RAM array section 100.

For example, consider a host port write to the RAM array section 100 of the least significant byte (HA<3:2>=0). On the rising edge of the clock that the write is triggered in the RAM array section 100 (HPWEA# or HPWEB# is asserted), the mask bit of memory update register set 116 also corresponding to the least significant byte (SA<3:2>=0) is set. A system fetch can then occur to retrieve the remainder of the line (improving the cache hit rate), filling memory update register set 116 as the fetch occurs. When the contents of memory update register set 116 are written to the RAM array 100 by assertion of signal QWR, any memory update register set 116 bytes with set masks will be protected from overwrite.

At reset, all four mask bits associated with each byte of the memory update register set 116 are cleared.

Figure 27:
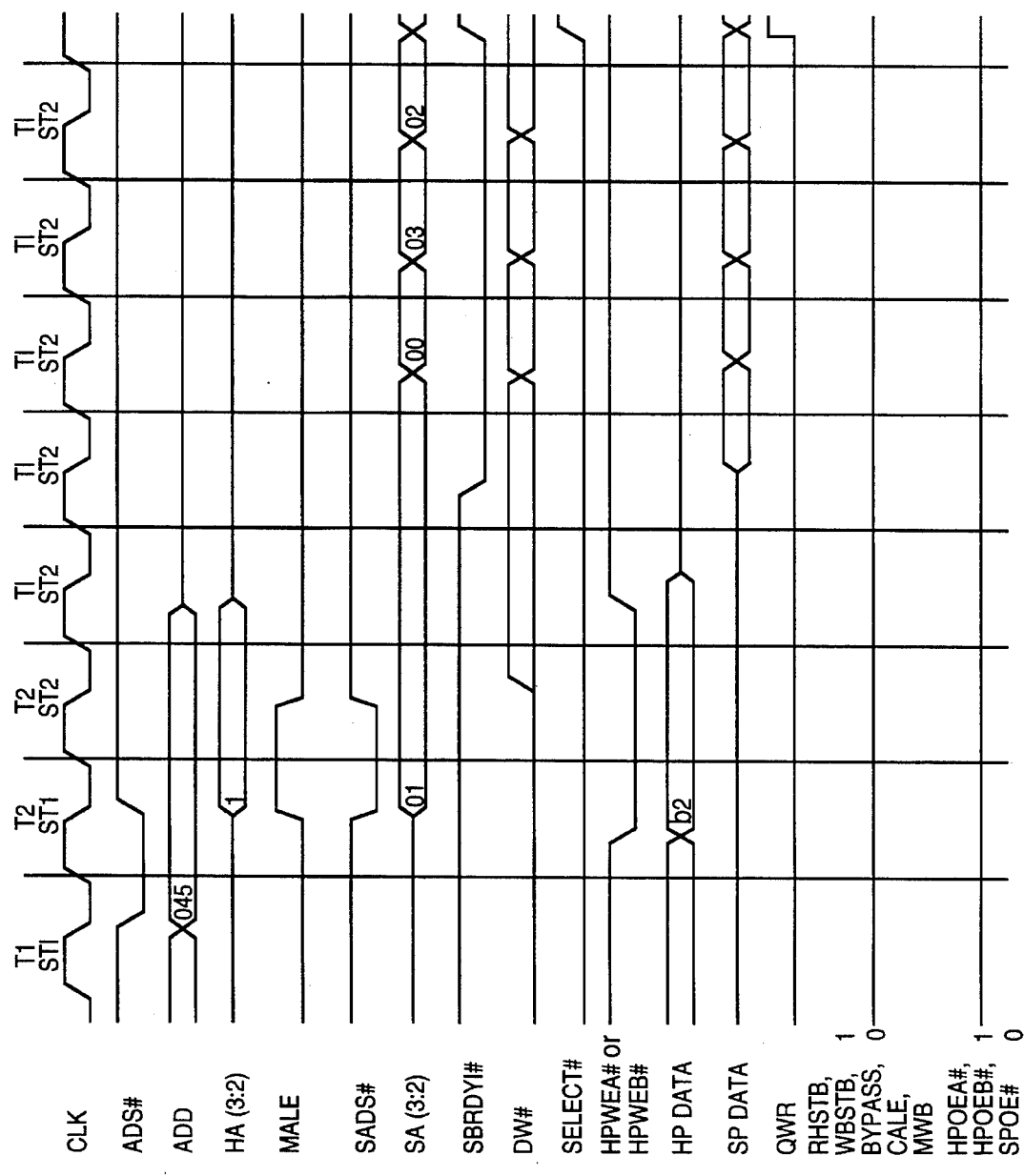
FIG. 27 is a set of waveforms showing control and data signals for an advance write and subsequent quad-fetch operation.

FIG. 27 shows an advance write occurring.

Evacuation

CPU miss cycles which bring new data into the cache from the system port 112 will usually replace valid data in the cache. For write-back cache architectures, the replaced data may be dirty. In these cases, the dirty data must be evacuated from the cache RAM array 100 and written to system memory, so as not to be simply overwritten by the incoming data from the system port 112.

The architecture of the cache memory 72 allows for easy evacuation of dirty data into the write back register set 118. In addition, additional performance is obtainable, since read miss processing can occur at full speed, with write back register set 118 being written to the system after the system fetch completes.

Host Port Read Miss with Evacuation

Figure 28:
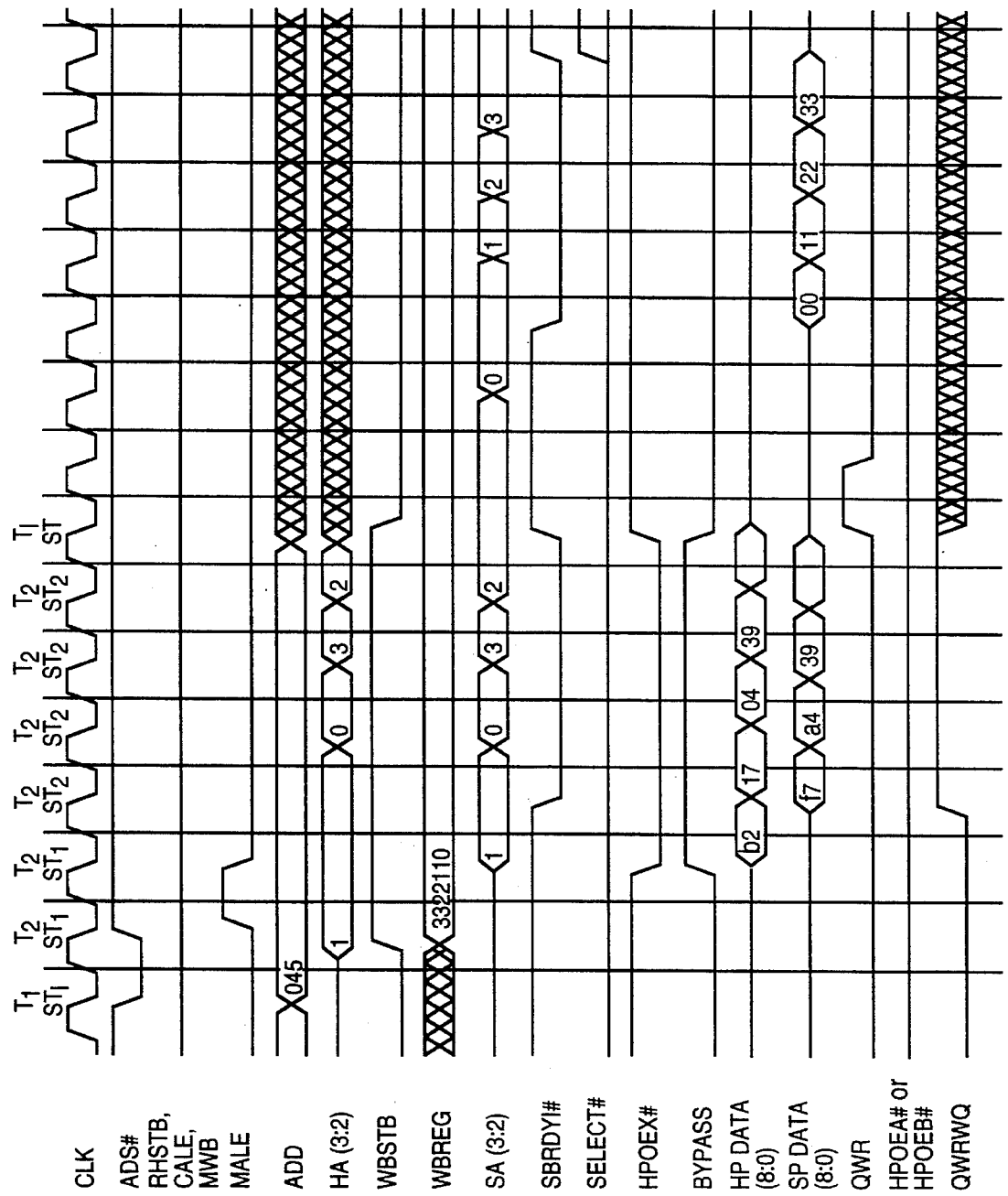
FIG. 28 is a set of waveforms showing control and data signals for a read tag miss operation with one write-back.

FIG. 28 details a CPU read miss cycle, necessitating a system-to-host port bypass operation with evacuation. ADS# signals the beginning of the cycle. Signal MALE latches bank select information and the address into miss address register 110. Later assertion of WBSTB latches the data which is to be replaced into write back register set 118. Incoming data from the system port 112 is forwarded directly on to the host port 113 through assertion by signal Bypass. SPOE# is held high to correctly enable the Bypass direction, and directly connect the system port 112 to the host port 113. At the end of the system port cycle, QWR writes the data in memory update register set 116 into the RAM array section 100. Finally, the contents of write back register set 118 must be written to the system port 112.

Host Port Advance Write with Evacuation

The rising edge of WBSTB will trigger the latching of data (selected by miss address register 110 and previously latched bank select information) into write back register set 118. A write-back burst sequence should occur if the data replaced is dirty.

The falling edge of ADS# signals the beginning of the cycle. HPWEA# and HPWEB# are asserted in order to select the bank to be written. However, before the write can occur, the dirty data must first be evacuated from the RAM array 100. As such, MALE should be asserted along with HPWEA# or HPWEB# to inhibit the write operation from occurring. The rising edge of WBSTB will trigger the latching of the data from the selected replace line into write back register set 118. A write-back cycle should occur if the data replaced is dirty.

As in the read miss case, memory update register set 116 will be used to hold quad fetch data from main memory. Miss data will be fetched in a "wrapped-around" fashion with the demand word fetched first. Each byte of the memory update register set 116 is associated with a valid bit. As each byte is updated into memory update register set 116 through SRDYI# assertion, the corresponding valid bit will be set if signal DW# is active. This valid bit will qualify the corresponding byte of the memory update register set 116 to be written into the cache memory 72 data array as QWR is asserted. After each QWR (quad write) cycle, all valid and mask bits associated with memory update register set 116 will be reset.

Figure 29:
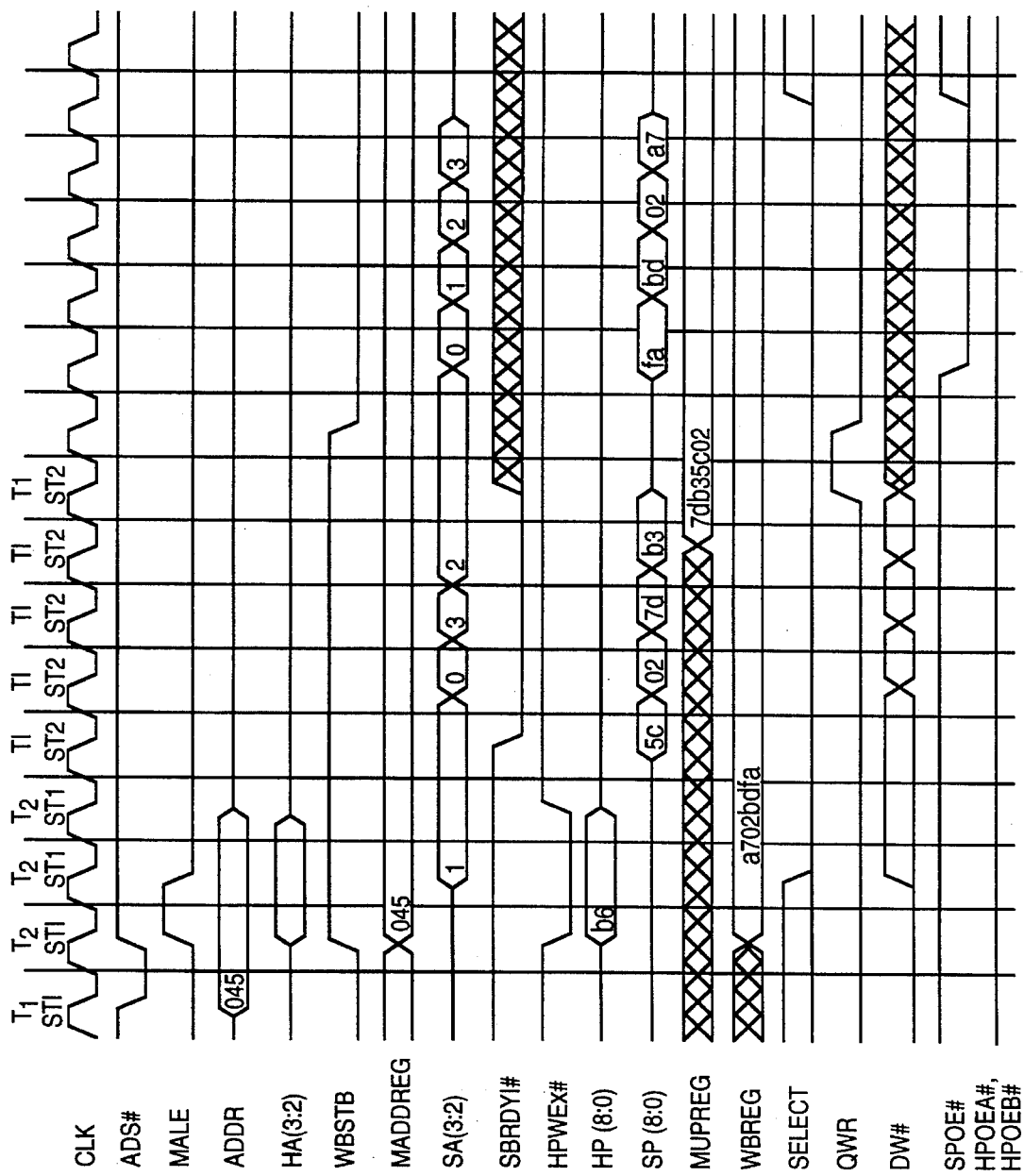
FIG. 29 is a set of waveforms showing an advance write operation with subsequent quad fetch and one write-back.

FIG. 29 details a write miss, with evacuation of dirty replaced data and the ensuing system quad fetch. At the end of the quad fetch, the contents of write back register set 118 are written to memory.

Figure 30A:
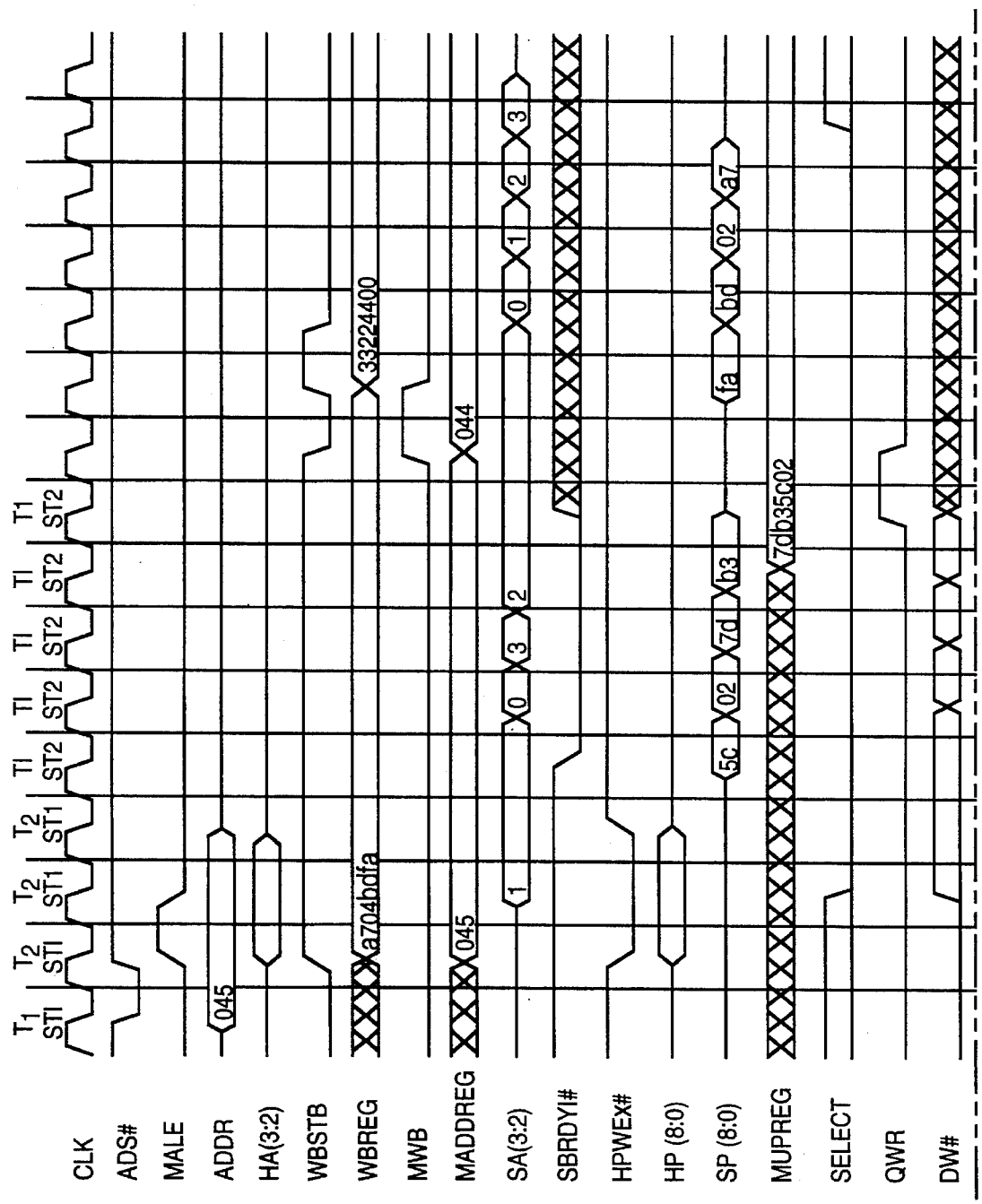
FIGS. 30A and 30B are set of waveforms showing control and data lines for an advance write operation with subsequent quad fetch and one write-back to a neighboring line.
Figure 30B:
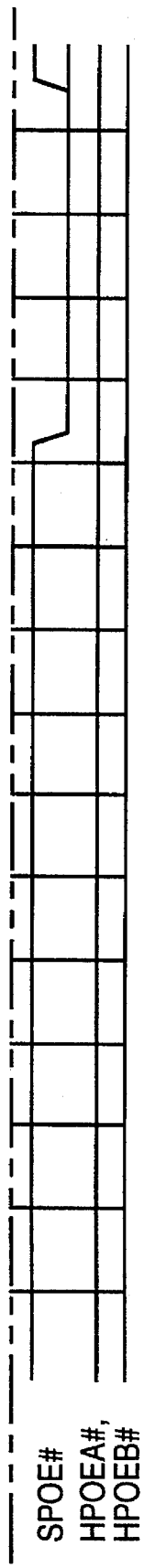
Figure 30:
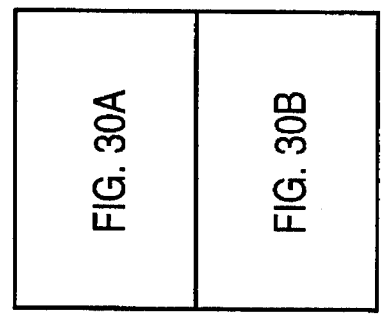
Figure 31:
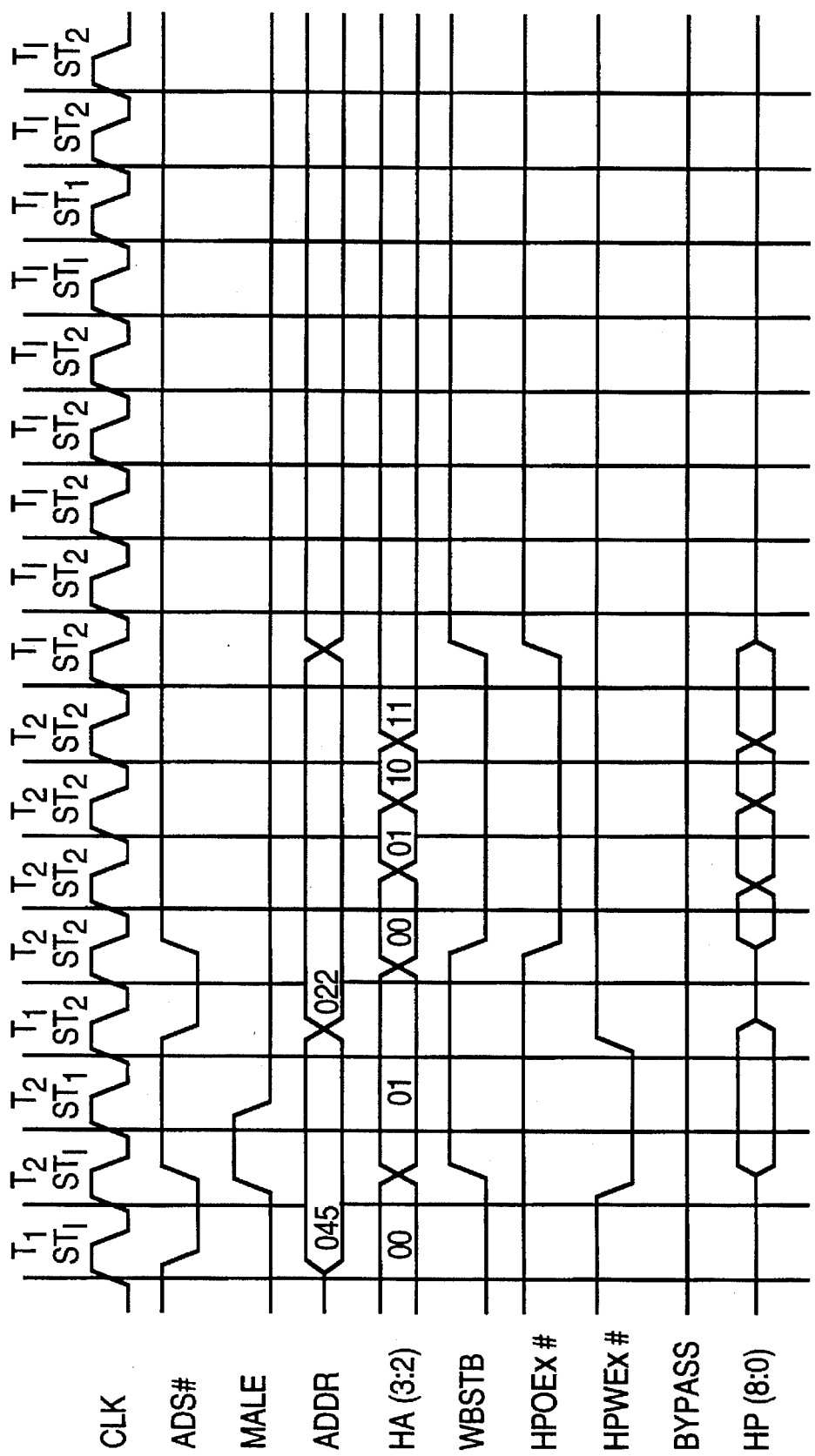
FIG. 31 is a set of waveforms showing control and data signals for several operations occurring within the burst RAM cache memory.

FIGS. 30A and 30B collectively show the same write miss cycle as before; however, at the end of the quad fetch, signal MWB is asserted in order to toggle miss address register 110 to point to the second line belonging to the replaced tag entry. After MWB is asserted, WBSTB loads write back register set 118 with the contents of this line. Finally a write-back cycle to the system of this newly loaded data occurs.

Concurrent Processing

The dual port architecture of the cache memory 72 is one of its most powerful features. The cache memory 72 is capable of processing on the system and host ports concurrently.

There are several instances where concurrent processing is possible. First, buffered write-through cycles can occur through the write register 120. As the write continues on the system bus, the host port 113 can process read and write hits. In addition, system read and write requests can occur in parallel with host port operations. And, as has been previously shown, write-backs of dirty data can occur from write back register set 118 and be hidden from the CPU. While these write-backs occur, local CPU cycles can be satisfied on the host port 113.

FIG. 21 shows many of the features of the cache memory 72 in use simultaneously. A CPU write miss occurs on the host port 113. This miss will be written into the RAM array 100 through an 'advance' write. The dirty data in the RAM array section 100 which is to be evacuated is loaded into write back register set 118. To increase the hit rate of the cache, a system quad fetch occurs to fill the remainder of the line that the CPU write updated. This system fetch is transparent to the CPU, and will be stored in the RAM array section 100 without overwriting the 'advance' write. While this fetch completes, the CPU generates another write cycle and a burst read cycle, which are both satisfied on the host port 113.

SUMMARY OF CACHE MEMORY 72

The architecture and operating modes of cache controller 70 are next considered. The following sections further include the sequencing states of controller 70.

Figure 32:
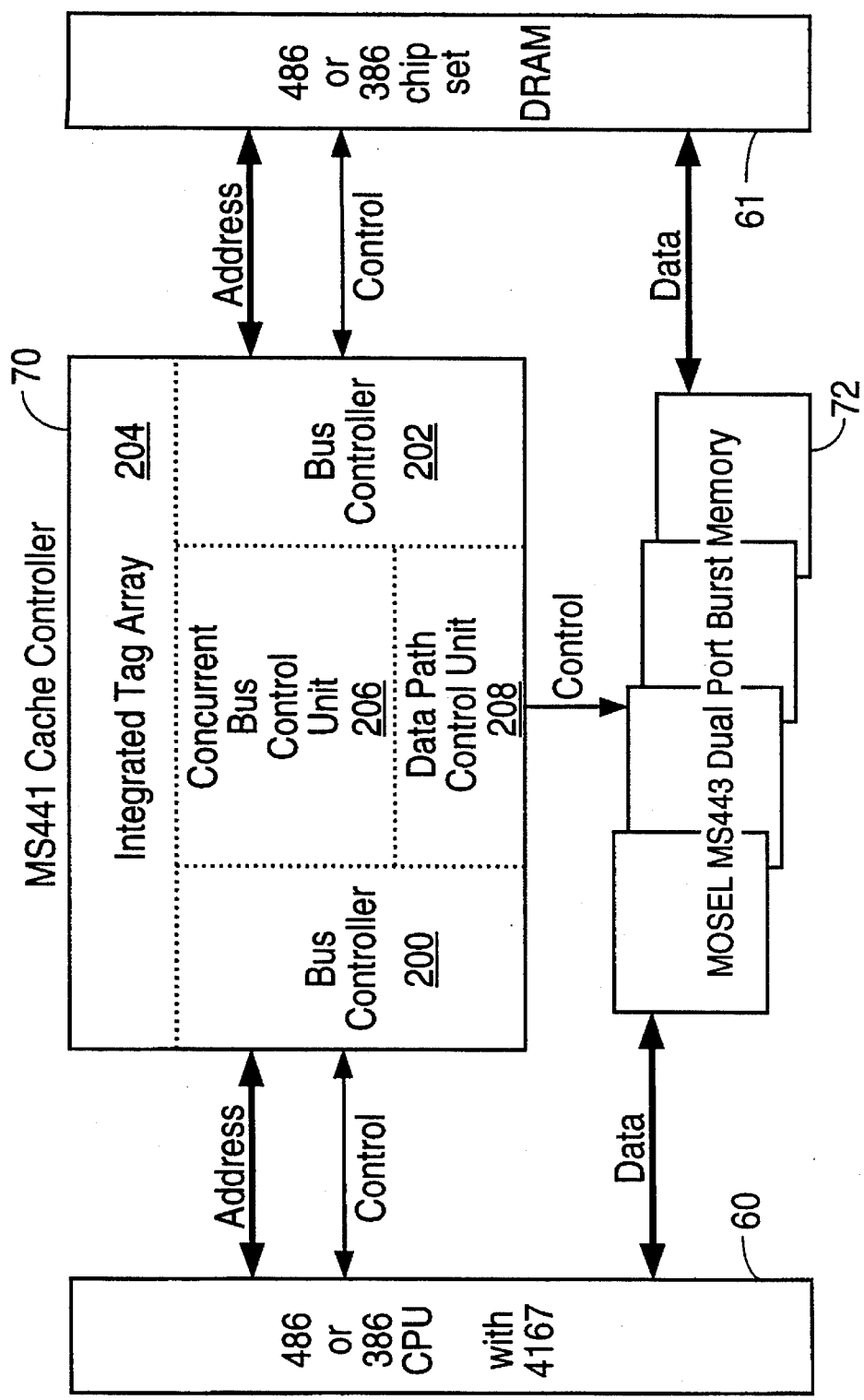
FIG. 32 is a diagram showing internal blocks of cache controller 70.

Referring to FIG. 32, a system diagram is shown of the cache controller 70 and cache memory 72 connected to a CPU 60 and to memory 61. Cache controller 70 is shown with a bus controller 200, a bus controller 202, an integrated tag array 204, a concurrent bus control unit 206 and data path control unit 208. Bus controller 200 interfaces with CPU 60 through corresponding address and control lines, and bus controller 202 interfaces with memory 61 through corresponding address and control lines. Furthermore, data path control unit 208 generates control signals that are received by cache memory 72.

Figure 33:
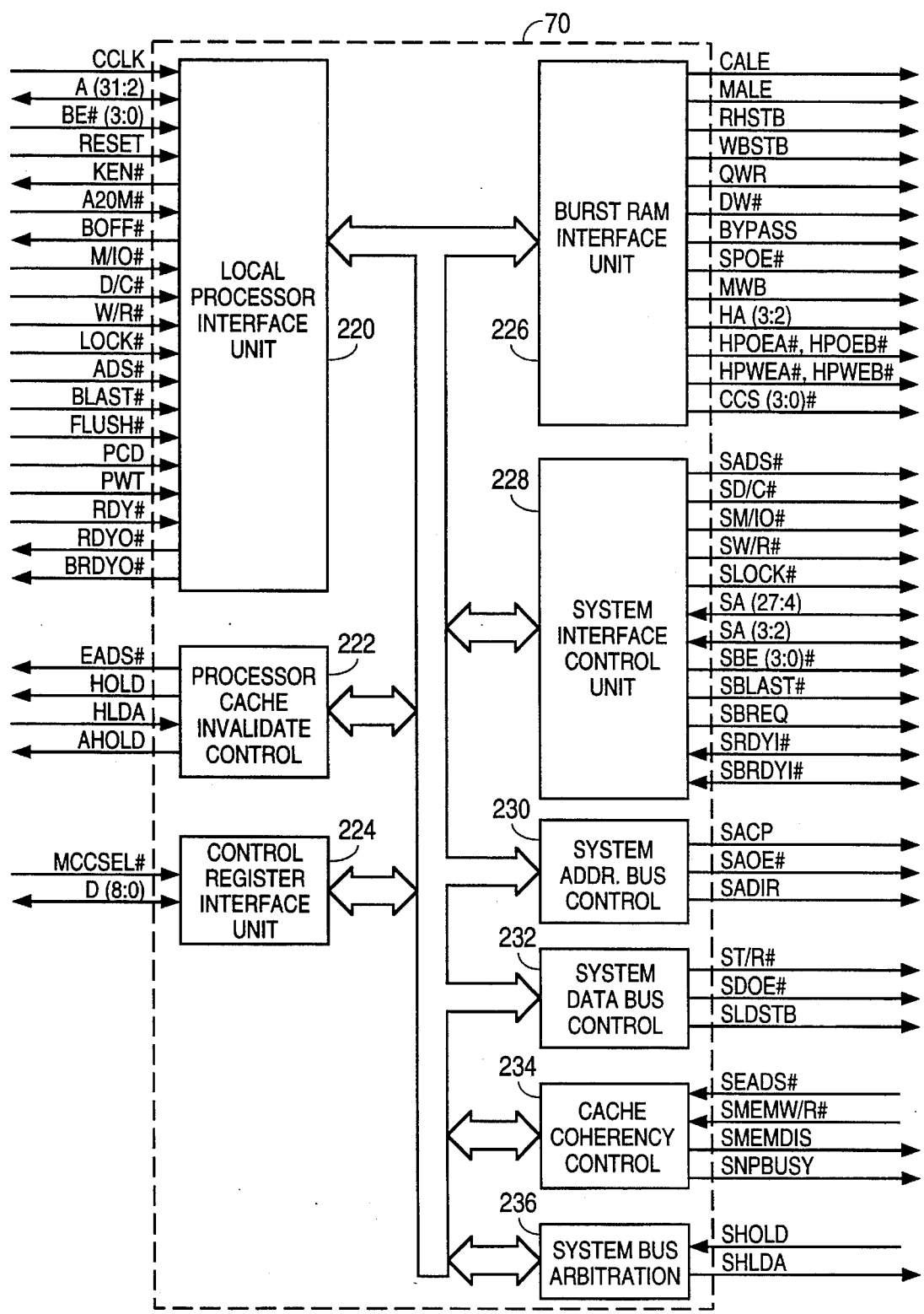
FIG. 33 is a diagram showing functional block pin groups of cache controller 70.

Referring to FIG. 33, controller unit 70 is shown with specific input and output terminals adapted for a 486 microprocessor-based system. Controller 70 is shown with local processor interface unit 220, processor cache invalidate control 222, control register interface unit 224, burst RAM interface unit 226, system interface control unit 228, system address bus control 230, system data bus control 232, cache coherency control 234 and system bus arbitration unit 236. Each of units 220 through 226 provide and receive signals from the other system devices.

REGISTER SET AND PROGRAMMING MODEL

The default configuration of the controller 70 is in write-back mode, configured for operation in a PC-AT environment. Any programming that is necessary will generally be carried out by the BIOS or operating system as part of the initialization process. Once the controller 70 is initialized, few instances will arise where additional programming is necessary.

| Summary of Cache Memory 72 | |
|---|---|
| Condition | System Port Data Comes From: |
| SPOE# and BYPASS# and SELECT# | WBREG |
| SPOE# and BYPASS and SELECT# | WREG |
| Condition | Host Port Data Comes From: |
| SELECT# and SPOE and BYPASS | System Port |
| when SELECT# and BYPASS are low, and either HPOEA# or HPOEB# low and: | Host Port Data Comes From: |
| RHSTB# and WBSTB# | Data Array |
| RHSTB and WBSTBJ | RHREG |
| WBSTB | MUPREG |
| ADS# or CALE: Falling edge makes HADDREG flow-through. Rising edge latches address into HADDREG. | |
| MALE: Inhibits write operations to cache data array. HADDREG address latched into MADDREG. Latches bank select information for future SP operations. | |
| QWR: Contents of MUPREG written into data array at MADDREG. MUPREG mask and valid bits cleared. | |
| WBSTB: Latches data at address in MADDREG into WBREG. | |
| HPWEA# or HPWEB# The falling edge of either of these makes WREG flow-through. Either low on a clock (MALE low) latches HP into WREG. Activates bank select information. | |

The controller 70 contains the following registers. A control register (CREG) determines the operating modes of the controller. An expansion register (XREG) offers cascade expansion mode to the controller 70 architecture. Eight address registers allow the controller 70 to offer four protected address regions. A protection register (PREG) defines the operating modes of these four regions. Availability of these regions eliminates the need for high-speed address decode PALs in a system. These registers will be visible to application programmers, for system customization as desired.

Registers in the controller 70 are accessed by a two-step register indexing method. The index address of the register to be read or written is written to the low I/O location assigned to the controller 70 (i.e., MCCSEL# asserted and A2 is low). The contents of that register can be read or written by performing the corresponding read or write I/O cycle to the high I/O location (i.e., MCCSEL# asserted and A2 is high).

The index value corresponding to each controller 70 programmable register is listed below:

| Index (Hex) | Register | Bits |
|---|---|---|
| 00 | Control Register | CREG<7:0> |
| 01 | Expansion Register | XREG<7:0> |
| 10 | Protection Register | PREG<7:0> |
| 20, | 1st protected region | PR1S<19:12> |
| 21, | start address | PR1S<27:20> |
| 23, | 1st protected region | PR1E<19:12> |
| 24, | ending address | PR1E<27:20> |
| 26, | 2nd protected region | PRS2<19:12> |
| 27, | start address | PRS2<27:20> |
| 29, | 2nd protected region | PR2E<19:12> |
| 2A, | ending address | PR2E<27:20> |
| 2C, | 3rd protected region | PR3S<19:12> |
| 2D, | start address | PR3S<27:20> |
| 2E, | 3rd protected region | PR3E<19:12> |
| 2F | ending address | PR3E<27:20> |
| 30, | 4th protected region | PR4S<19:12> |
| 31 | start address | PR4S<27:20> |
| 32, | 4th protected region | PR4E<19:12> |
| 33 | ending address | PR4E<27:20> |

PROGRAMMABLE REGISTER DEFINITIONS

Control Register (Index Address=00 Hex)

This register identifies the major operating modes of the controller 70. The bit definition of this register is listed as follows:

| Bit Position | Name | Definition |
|---|---|---|
| CREG<0> | Reserved | This bit should always be set to a value of 1. A zero in this field is not supported. |
| CREG<1> | ARDY | Setting this bit will make the controller 70 RDY# input asynchronous. In asynchronous mode, RDY# input will be forwarded to RDYO# in the next clock. This allows the coprocessor with slow RDY# delay to interface to the controller 70. In synchronous mode, RDY# input will be forwarded to RDYO# in the same clock. |
| CREG<2> | Reserved | This bit should always be set to a value of 1. A zero in this field is not supported. |
| CREG<3> | Reserved | This bit should always be set to a value of 1. A zero in this field is not supported. |
| CREG<4> | Reserved | This is a reserved bit. It should always be set to a value of 1. A value of zero in this field is not supported. |
| CREG<5> | Reserved | This is a reserved bit. It should always be set to a value of one. A value of zero in this field is not supported. |
| CREG<6> | Reserved | This is a reserved bit. It should always be set to a value of one. A value of zero in this field is not supported. |
| CREG<7> | SEQ/486# | Setting this bit low implies that 486 burst-order is selected for data transfers between system memory and cache. Otherwise, sequential burst order is assumed. |

Expansion Register (Index Address=01)

This register defines the physical operation address space of each controller 70 in cascade mode. Each controller 70 will provide control for 64K byte of cache memory. Provisions in XREG allow an expansion configuration of up to 256K byte of cache memory using four controllers.

| Bit Position | Name | Definition |
|---|---|---|
| XREG<0> | INV | Setting this bit will cause an invalidation of all cache data entries. The controller 70 will write back all dirty data associated with each entry before invalidation. At the end of the write back operations, the controller 70 will clear this bit. |
| XREG<2:1> | CSIZE<1:0> | These two bits identify the cache memory size as follows:<br>CSIZE<1:0>     Cache size<br>00                    64K byte<br>01                    128K byte |

| Bit Position | Name | Definition |
|---|---|---|
| | | 10        256K byte |
| XREG<3> | DIS | Setting this bit to one will disable the controller 70. All bus cycles will be treated as NCA (Non-Cacheable Address) system cycles. If this bit is used to dynamically disable the cache during normal operation, a cache flush should proceed the disabling, in order to flush any dirty data in the cache. |
| XREG<5:4> | TCF<1:0> | These two bits define the tag array associativity configuration as follows: TCF<1:0> Assoc. Tag Add. Org. 00 DIRECT MAPPED   1X2048X12 01 2-way associative   2X1024X13 |
| XREG<7:6> | Reserved | These bits are reserved. |

Protection Register (Index Value=10 Hex)

The protection register defines the operation of the four available protected regions. Each protected region is associated with an NCA bit and a CWP bit. Note that either the NCA bit or the CWP bit may be set for a protected region, but not both. The bit definition and nomenclature are listed as follows:

| Bit Position | Name | Definition |
|---|---|---|
| PREG<7,5,3,1> | NCA<4:1> | The setting of each of these four bits defines one of the four protected regions of the cache controller to be non-cacheable. NCA<L> high will disable cacheing in the address range defined by PR1S and PR1E. Likewise, NCA<2>, NCA<3> and NCA<4> will disable cacheing in regions two, three and four. |
| PREG<6,4,2,0> | CWP<4:1> | Setting this bit defines the corresponding region as cacheable, but write-protected. Writes to an address region with the CWP bit set will be bypassed to the system by the controller 70. By use of this bit, system and video BIOS may be safely cached. |

Protected Address Region Registers (Index Value=2x to 3x Hex)

As previously discussed, the controller 70 can protect up to four address regions. Each protected region is defined through two 16-bit registers and two operating mode bits, NCA and CWP. The starting (low) address register and the ending (high) address register identify the address range of the protected regions. The starting and ending addresses of all four protected regions may be defined to 4 K byte boundaries. For example, the PR1S and PR1E registers define the start and end of the first protected region. The second through fourth regions are similarly defined. These addresses are exclusive, and therefore not intuitive. For example, to use region 4 as a protected region from address 40000 hex to 7FFFF hex, the start address (PR4S) should be loaded as 003F hex and the end address (PR4E) should be loaded as 0080 hex.

The physical address of each bus cycle is compared against the protected address ranges. An address within any of the range will modify controller response according to the values of the corresponding NCA and CWP bits as follows:

| NCA | CWP | Meaning |
|---|---|---|
| 0 | 0 | Normal (cacheable) region |
| 0 | 1 | Cacheable write protected region |
| 1 | 0 | Non-cacheable address region |
| 1 | 1 | Undefined state; do not use |

An address not contained in any of the four protected regions is assumed to be a cacheable address. Settings such that the value of the starting address is larger than that of the ending address should be avoided; indeterminate effects may result. In addition, a region defined with equal starting and ending address will be cacheable, regardless of the NCA and CWP bits. Note that it is possible to define overlapping protected regions, each with different mode definitions. In this case, the priority will be as follows:

1. CWP (Cacheable Write Protected) regions
2. NCA (Non-Cacheable Address) regions
3. Normal cacheable regions

DEFAULT SETTING FOR CONTROL REGISTERS AT RESET

After reset, the cache controller 70 is essentially ready for use in a PC environment. For easy system integration and best performance, the default register values prepare the controller for use in write-back mode using 486 CPU burst order to memory and assuming use of cache memory 72. For proper operation, all that is necessary for the BIOS or operating system is to set bit 0 of the control register, in order to enable the cache. Three of the protected regions are used at reset, leaving the fourth available for use. The protected address regions and their corresponding protection register bits are initialized as follows:

| Register | | Value <7:0> | | |
|---|---|---|---|---|
| Control Register | | 1111 | 1101 | |
| Expansion Register | | 0001 | 1000 | |
| Protection Register | | 0001 | 0110 | |

| Register | Range | Value A<27:12> | Mode NCA:CWP | Reason |
|---|---|---|---|---|
| 1st region start | 640K | 009F | 1:0 | top 384K of 1 Mb |
| 1st region stop | 1 Meg | 0100 | Non-cacheable | |
| 2nd region start | 768K | 00BF | 0:1 | VGA BIOS |
| nd region stop | 800K | 00C8 | Cacheable Write Protect | |
| 3rd region start | 960K | 00EF | 0:1 | System BIOS |
| 3rd region stop | 1 Meg | 0100 | Cacheable Write Protect | |
| 4th region start | N/A | 0000 | 0:0 | User-definable |
| 4th region stop | N/A | 0000 | Cacheable | |

Before loading any of the non-cacheable region support registers, the cache should be temporarily disabled. This can be done by clearing the CE bit in the control register. After non-cacheable regions are changed, the cache shold then be invalidated by setting the inv bit in the control register. This avoids any data coherency problem as a result of the non-cacheable region redefinition. After the invalidation process is complete, the cache can safely be re-enabled.

FUNCTIONAL DESCRIPTION

This section discusses how the controller 70 responds to the different types of bus cycles generated by the 486 CPU. The discussion covers normal cacheable memory reference (read/write) operations, locked, interrupt acknowledge and halt/shutdown cycles. Special 486 CPU cycles like Flush and Write-back cycles for supporting the 486 CPU INVD and WBINVD instructions are also described. The interface with cache memory 72 burst SRAMs is also discussed.

The controller 70 supports 486 CPU systems with the cache memory 72 Burst-RAMs. The controller 70 only supports write-back mode for 486 systems. Write-through is supported on a cycle to cycle basis through the PWT input. The controller 70/cache memory 72 support burst reads for 486 cache line fills. The controller 70 will follow 486 style address sequence on the 486 CPU local bus. On the system bus, either 486-style or sequential address sequence is supported. Use of cache memory 72 allows miss operations and write-back cycles to be carried out in parallel with hits.

486 CPU Bus Cycle Definitions—M/IO#, D/C# and W/R# are the primary bus cycle definition signals from the 486 CPU. These signals are driven valid in T1, as ADS# is asserted. M/IO# distinguishes between memory and I/O cycles. D/C# distinguishes between data and code cycles. W/R# distinguishes between write and read cycles.

Three other 486 signals provide cycle definition to the controller 70. These signals are:

1. The PCD (Page Cache Disable) pin, which reflects the enabling of the 486 CPU internal cache for the current cycle. The great majority of operations will occur with the 486 CPU internal cache turned on. This is indicated by the 486 PCD output being de-asserted (low). PCD will be asserted high by the 486 if its internal cache has been turned off by software, either entirely or on a per-page basis.

2. The PWT (Page Write Through) pin, which indicates to the controller 70 that the corresponding write cycle should be directed to the system, as well as updating the contents of the data cache if a hit occurs. Like the PCD pin, the PWT pin is used by 486 CPU software on a per-page basis.

3. The LOCK# pin, which asserted indicates that the 486 CPU is performing a read-modify-write operation over several bus cycles. The 486 CPU should retain ownership of the bus while LOCK# is asserted.

Table IV shows the encodings for the various bus cycles that occur in 486 CPU systems. Halt cycles have been moved to location 001 from location 101 for the 386 CPU. Location 101 is now reserved in the 80486.

TABLE IV

| 80486 Bus Cycle Definitions | | | |
|---|---|---|---|
| M/IO# | D/C# | W/R# | 80486 Cycles |
| 0 | 0 | 0 | Int Acknowledge |
| 0 | 0 | 1 | Special Cycles |
| 0 | 1 | 0 | I/O Read |
| 0 | 1 | 1 | I/O Write |
| 1 | 0 | 0 | Memory Code Read |
| 1 | 0 | 1 | Reserved |
| 1 | 1 | 0 | Memory Data Read |
| 1 | 1 | 1 | Memory Data Write |

486 Special Cycle Definitions—In addition to the M/IO#, D/C# and W/R# signals, the 486 CPU provides four special bus cycles to indicate that certain conditions have occurred internally or certain instructions have been executed. These four special bus cycles are defined by the byte enable signals when M/IO#=0, D/C#=0, and W/R#=1. Table V shows the encodings of the 486 special bus cycles.

TABLE V

| 80486 Special Bus Cycle Definitions | | | | |
|---|---|---|---|---|
| BE3# | BE2# | BE1# | BE0# | Special Cycles |
| 1 | 1 | 1 | 0 | Shutdown |
| 1 | 1 | 0 | 0 | Flush |
| 1 | 0 | 1 | 1 | Halt |
| 0 | 1 | 1 | 1 | Write Back |

Differences Between the controller 70 and i486 CPU—The controller 70 presents a very 486 CPU-like interface to system logic. The great majority of system interface pins have the same name and functionality as their 486 CPU counterparts. Because of these features, designing the controller 70 into a system is very straightforward. Glue logic to design in the chipset is minimal. In addition, hooks can be used to drive optional address transceivers and latches on the system side. These devices may be used if additional drive capability is desired; however, the controller 70 system side specifications assume 100 pF of loading. The SA OE# and SA DIR control signals are No Connect pins if address transceivers are not used.

The controller 70 supports all i486 CPU functionality on the host (local CPU) side. A high-speed 32-bit interface is used, with the great majority of cycles completing in two clock cycles. On the system side, the controller 70 has an identical list of pins as does the i486 CPU, except for the following pins:

PCD—Page Cache Disable
PWT—Page Write-Through
AHOLD—Address Hold
BS8#—Bus Size 8

BS16#—Bus Size 16
PLOCK#—Pseudo Lock
KEN#—Cache Enable

These signals are not included in the system-side controller 70 architecture for various reasons:

The 486 CPU architecture intends the PCD and PWT signals to be used by an external cache, and the system bus has no need of these signals.

AHOLD is not needed in current system design. The preferred method of invalidating i486 CPU cache lines is through the SHOLD/SHLDA protocol, and will be discussed later.

BSS# and BS16# are not supported; systems must interface to the controller 70 with a 32-bit interface.

PLOCK# is rarely used in systems. If it is desired to include PLOCK# in a system, a fast AND gate may be used to connect the LOCK# and PLOCK# outputs of the i486 CPU. The resulting AND will then be used as the LOCK# input of the controller 70.

KEN# is not necessary on the system side, as the controller 70 contains register support for four protected address regions, all of which may be either entirely non-cacheable or read cacheable write-protected. Addresses will be decoded by these registers and KEN# returned to the i486 CPU in T1, in order to avoid any performance degradation. Use of the controller 70 in a system eliminates the need for any high-speed address decode PALs. In addition, the programmable register approach for non-cacheable regions is more flexible than PAL implementations, since the end-user can dynamically tailor cacheability.

BOFF#, or Back Off, is not included in the system-side controller 70 architecture. This functionality will be included in the next generation of the controller 70 family of controllers.

In addition, the controller 70 has a bus snooping feature and the ability to intervene on system snoop reads, when the requested data is both present in the cache and also 'dirty'. As a result, the controller 70 has three additional pins to support this functionality:

SNPBUSY—Snoop Busy
SMEMWR—System MEMory Write Read
SMEMDIS—System MEMory DISable The functionality of these pins will be discussed below.

TABLE VI

Summary of controller 70 Response to CPU Cycles

| | |
|---|---|
| System Cycles: | NCA, I/O, Halt/Shutdown, INTA cycles and controller 70 disabled<br>No cache update occurs<br>controller 70 re-drives cycle on system<br>   bus one clock later<br>SBLAST# is driven low, regardless of state of BLAST#<br>System returns SRDYI# or SBRDYI#<br>   to terminate; passed to 486 CPU as RDYO#<br>No write buffering, except NCA writes will be buffered<br>KEN# is deasserted to CPU; no line fill will occur |
| Local Bus Cycles: | Controller 70 Control Register Read/Writes, Weitek Cycles, and CWP Write Cycles<br>No cache operations<br>For control register read/writes, controller 70 returns RDYO#<br>For Weitek cycles, Weitek returns RDY#; passed to 486 CPU as RDYO#<br>CWP Write Cycles are terminated in two clocks with no system cycle |
| Write-Through Cycles: | PCD/PWT/Locked Write Cycles<br>Read Hit/Miss: N/A |
| Write Hit: | Update CPU write data into cache data array<br>controller 70 returns RDYO#<br>   to CPU in zero wait states<br>Buffered write con tissues on system bus until SBRDYI# or SRDYI# |
| Write Miss: | No update of CPU write data into cache data array<br>controller 70 returns RDYO#<br>   to CPU in one wait state<br>Buffered write continues on system bus until SBRDYI# or SRDYI# |
| Normal Cycles: | Normal Read/Write Cycles and PCD/PWT/CWP/Locked Read |
| Read Hit: | controller 70/cache memory 72's supply data in zero wait states<br>controller 70 returns BRDYO#<br>   to CPU; Host port 0transfer terminates with BLAST#<br>CPU assertion of BLAST# terminates host port transfer<br>For normal/PWT reads, KEN# asserted to cause i486 CPU cache line fill<br>KEN# deasserted for PCD and CWP reads; no line fill will occur |
| Read Miss: | System Quad Fetch; data bypassed to CPU, also latched in memory update register set 116<br>System returns 4 SRDYI# or 4 SBRDYI#; either passed to CPU as BRDYO#<br>controller 70 asserts SBLAST#<br>   on fourth (last) cycle<br>For normal/PWT reads, KEN# asserted to cause i486 CPU cache line fill<br>KEN# deasserted for PCD and CWP reads; no line fill will occur<br>CPU assertion of BLAST# terminates host port transfer |

TABLE VI-continued

Summary of controller 70 Response to CPU Cycles

|  |  |
|---|---|
|  | controller 70 assertion of<br>   QWR signal writes<br>   memory update register<br>   set 116 into cache<br>   data array<br>Tag miss requires any<br>   dirty data in write<br>   back register set 118<br>   to be written back<br>   to system |
| Write Hit: | controller 70 returns<br>RDYO#<br>   in zero wait states<br>   (two clocks)<br>CPU write data is<br>   written into cache<br>   data array<br>no system cycle occurs. |
| Write Miss: | Line to be replaced<br>   is stored into<br>   write back register<br>   set 118<br>CPU write data is<br>   written into cache<br>   data array<br>System Quad Fetch;<br>   data not bypassed<br>   to CPU, but latched<br>   in memory update<br>   register set 116<br>System returns either<br>   4 SRDYI# or 4<br>   SBRDYI#<br>controller 70 asserts<br>SBLAST#<br>   on fourth (last)<br>   cycle<br>controller 70 assertion<br>of<br>   QWR signal writes<br>   memory update register<br>   set 116 into cache<br>   data array<br>Tag miss requires any<br>   dirty data in write<br>   back register set 118<br>   to be written back |

Controller 70 Response to 487 to 486 CPU Cycles—As shown in Table VI, the controller 70 distinguishes between four main classes of cycles. These four classes are system cycles, local bus cycles, write-through cycles, and normal (cacheable) cycles.

I) System Cycles: The controller 70 detects a bus cycle as a system cycle through either one of the following conditions:

1. An NCA cycle. An NCA cycle is a read/write cycle to an address defined in the protected address region registers with the NCA (non-cacheable address) bit set.
2. A cycle which is an I/O read or write, an interrupt acknowledge, or halt/shutdown cycle.
3. Controller 70 disabled. If the CE bit in the control register is cleared (0), all cycles will become system cycles.

For this class of cycles, the controller 70 forwards the address and bus cycle control signals to the system bus without performing a cache access. All read cycles are treated as read misses except that the cache directory and the cache data array are not affected. All writes are treated as write misses. NCA write cycles will be buffered. For all system cycles, KEN# is de-asserted to the 486 CPU. This will prevent the returned data from being cached in the CPU.

SBLAST# will be low in ST1, regardless of the state of BLAST# from the 486 CPU. For most system cycles, this will have no impact, as the 486 CPU BLAST# output will be low for I/O, INTA, Halt/Shutdown, and normal write cycles. However, the effect of driving SBLAST# low means that non-cacheable address reads cannot be burst from system memory. By defining an address range to be NCA, it is also defined to be non-burstable.

Figure 34:
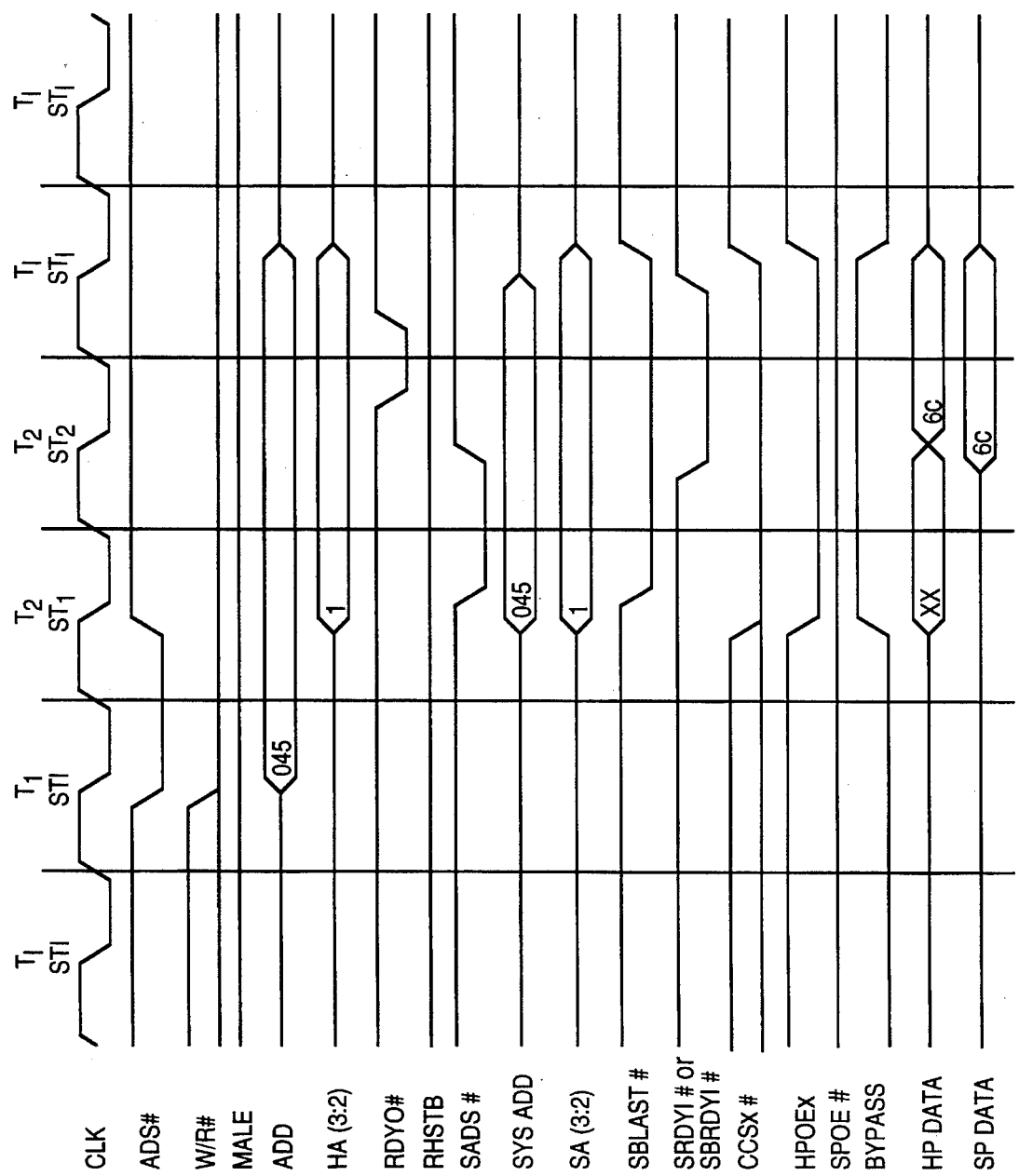
FIG. 34 is a set of waveforms showing control and data signals for a system read cycle operation.

FIG. 34 shows a system read cycle, where the cycle definition is passed on to the system. The controller 70 asserts SADS# the clock after ADS# was asserted. The Bypass signal is asserted to allow returned system data to be passed back to the 486 CPU in the same clock. HPOEx# is enabled to allow the read data to be passed back to the 486 CPU.

Figure 35:
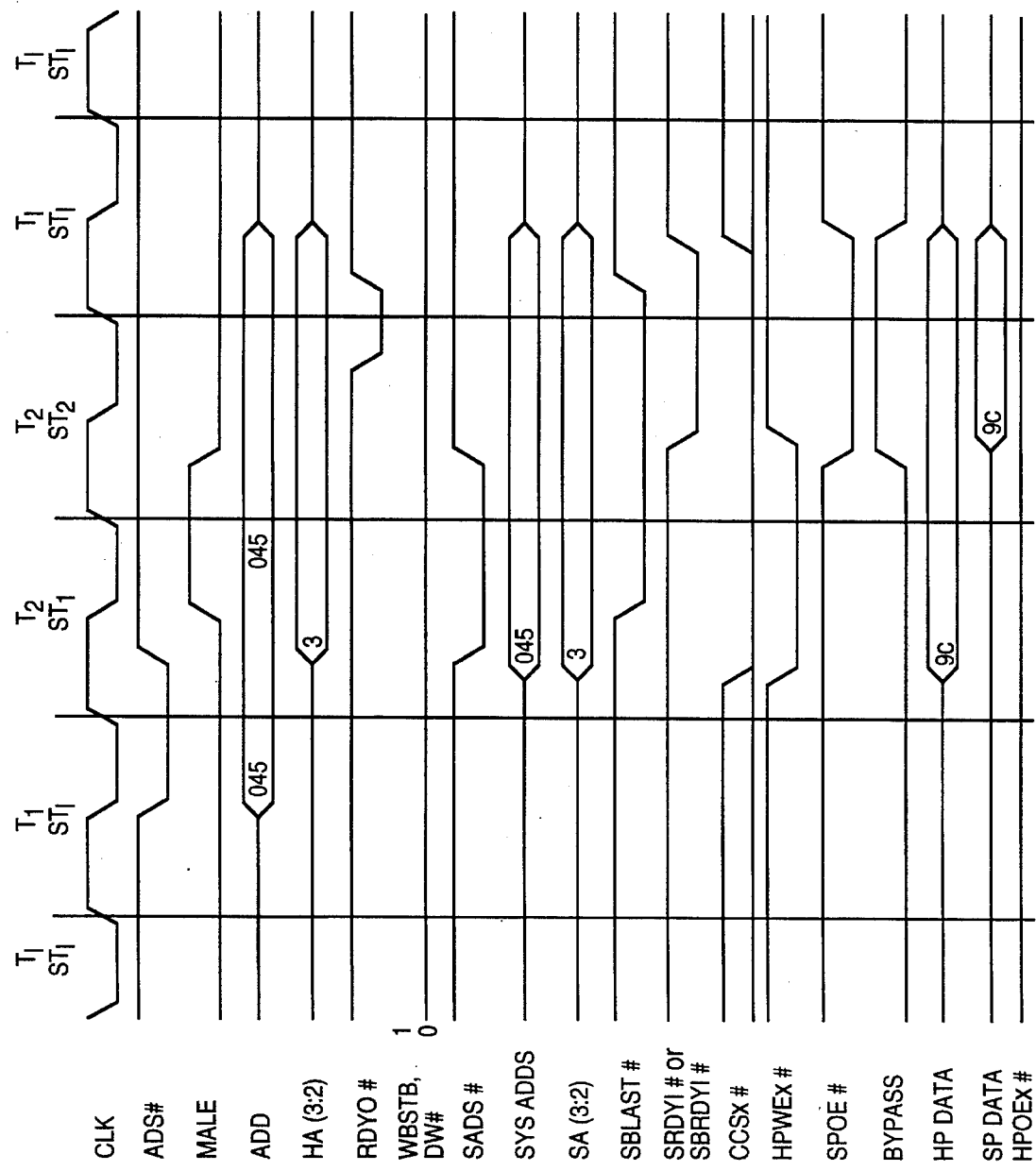
FIG. 35 is a set of waveforms showing control and data signals for a system write cycle operation.

FIG. 35 shows an I/O write cycle, which is passed on to the system without being buffered. SRDYI# and SBRDYI# are passed back to the 486 CPU as RDYO# to terminate this cycle. In the ST2 state, SPOE# is asserted low to enable the system port. MALE is asserted high by the controller 70 in ST2 to inhibit the cache memory 72 write operation.

I/O Cycles—I/O cycles are passed on to the system bus, and terminated when the system asserts SRDYI# or SBRDYI#. Either of these signals are passed to the CPU as RDYO#. I/O cycles are not buffered. I/O cycles will not produce any cache operations.

INTA (Interrupt Acknowledge) Cycles—The 486 CPU generates interrupt acknowledge cycles in locked pairs. The controller 70 will re-drive these to the system, with the same encoding as on the 486 CPU. Also like the 486 CPU, the state of A2 will allow system logic to differentiate between the two INTA cycles. A2 will be driven high during the first INTA cycle, and low for the second. SLOCK# will be asserted between and during both of these cycles.

Data parity for the two interrupt acknowledge cycles is not checked by the 486. External hardware must acknowledge each interrupt acknowledge cycle through SRDYI# or SBRDYI# assertion. The controller 70 will invoke the Bypass signal and HPOEx# to the cache memory 72 during the second INTA cycle so that interrupt vectors are passed from the system bus to the local processor bus.

Halt/Shutdown Cycles—The controller 70 treats halt/shutdown cycles as system cycles. During halt/shutdown cycles, the controller 70 duplicates the encoding of the host processor on the system memory bus. External hardware should acknowledge halt/shutdown cycles through SRDYI# or SBRDYI# assertion. During halt/shutdown cycles, the controller 70 will recognize SHOLD from the system memory bus and will respond by floating the system address, system control definition signals and asserting SHLDA.

NCA (Non-Cacheable Address)Cycles—The address of each bus cycle is compared against the contents of the protected address region registers to determine cacheability of the cycle.

If the address of a 486 CPU cycle is within a protected address region with the NCA bit set, the cycle is determined to be an NCA cycle. The cycle will be forwarded to the system bus without any cache operation taking place. No data will be supplied from the cache in this case. In addition, KEN# is asserted high to the CPU to prevent data on read cycles returned from the system from being cached. KEN# being returned high in T1 prevents the 486 CPU from performing any throwaway line fill cycles, which would degrade performance.

Unlike the other cycles which make up the system class, write cycles to non-cacheable addresses are terminated in two clocks by the controller 70 by assertion of RDYO# to the 486 CPU. These buffered writes are completed on the system bus when either SRDYI# or SBRDYI# is returned by system logic. The Bypass signal will be asserted in either the NCA read or write cycles until the cycle is terminated. For NCA reads, the activation of Bypass allows returned system data to pass to the CPU. For NCA writes, Bypass allows the buffered write data contained in write register 120 to be driven to the system.

Figure 36:
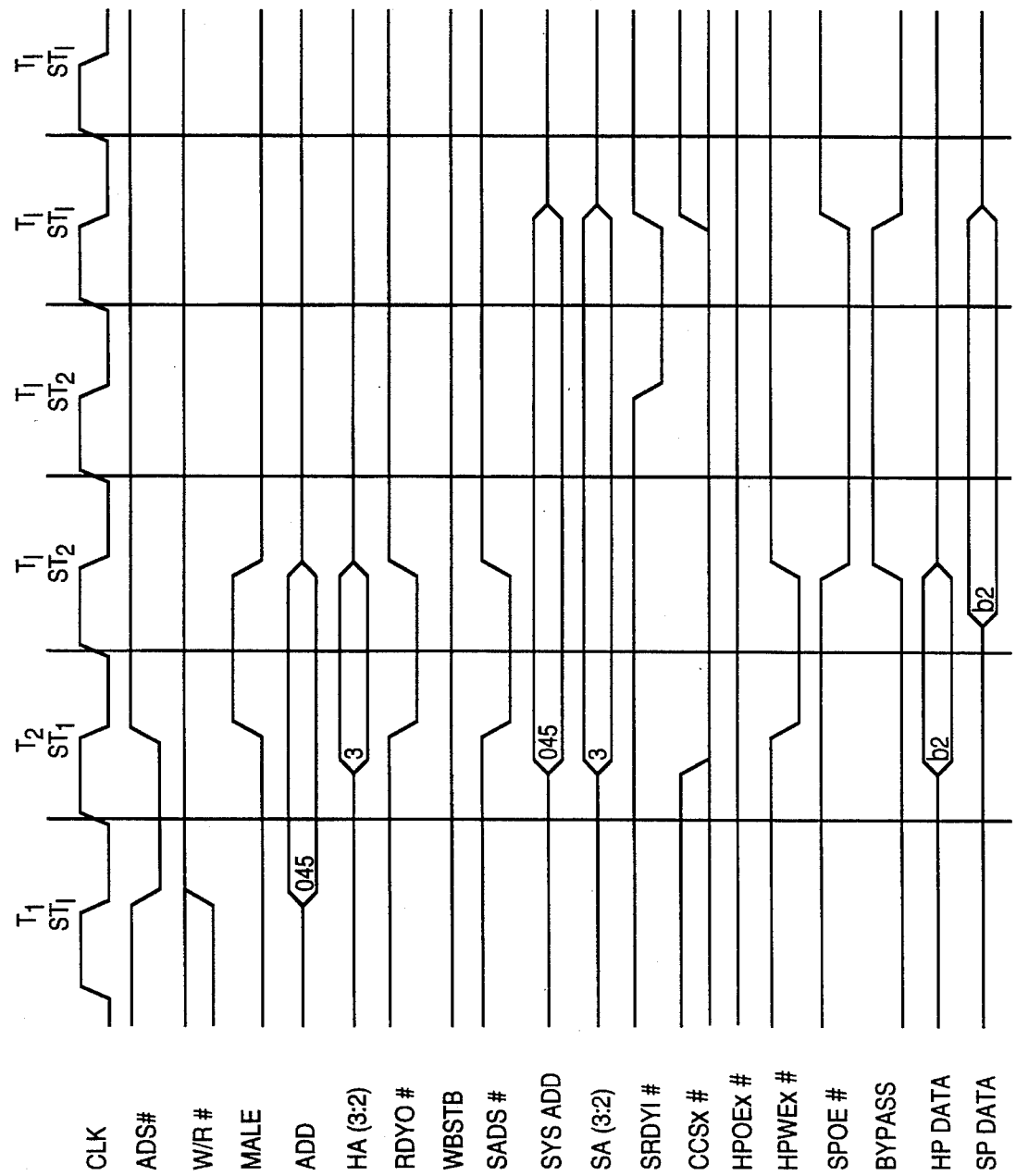
FIG. 36 is a set of waveforms showing control and data signals for a buffered NCA write cycle operation.

FIG. 36 details an NCA write cycle. The write cycle is buffered and terminated on the local CPU bus in two clocks by the controller 70. Note that like a normal cache write hit, HPWEx# is asserted low in ST2. However, the write to the cache data array is inhibited by assertion of MALE. The write data is latched into write register 120. Write register 120 will act as the write buffer in this cycle. The cycle continues on the system side until terminated by SRDYI# or SRDYI#. The Bypass signal stays activated until SRDYI# or SBRDYI# is asserted. Continued assertion of the Bypass signal after the cycle has been terminated on the local CPU side indicates that the data in write register 120 is being driven to the system bus.

II) Local Bus Cycles:—The controller's 70 second class of cycles are Local Bus cycles. Local bus cycles are not passed on to the system, nor do they cause a cache hit/miss determination. Local bus cycles consist of reads and writes to the controller 70 control registers, Weitek bus cycles, and writes to cacheable write-protected regions.

Controller 70 Register Reads/Writes—Control words are read and written to the registers of the controller 70 through a two-step index addressing process. First, a write cycle is performed to the address of the controller 70. The data for this write cycle is the index address of the desired register. A2 should be low for this cycle. This indicates to the controller 70 which register is to be read or written to.

A second cycle is then performed to the controller 70. This cycle performs the actual read or write to the control register. The data lines for this cycle contain or return appropriate read/write data. A2 should be high for this cycle.

Figure 37:
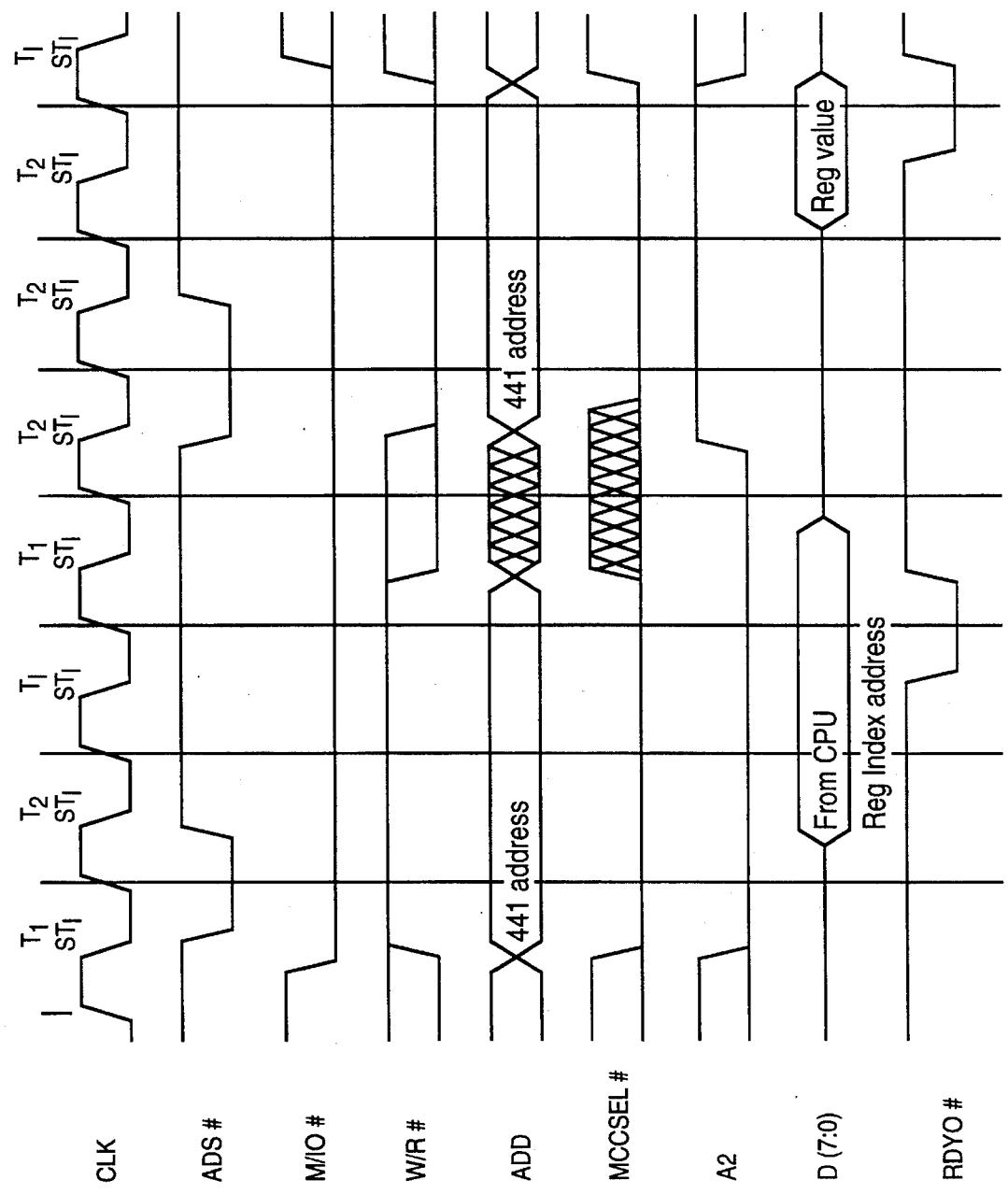
FIG. 37 is a set of waveforms showing control and data signals for a controller register read operation.
Figure 38:
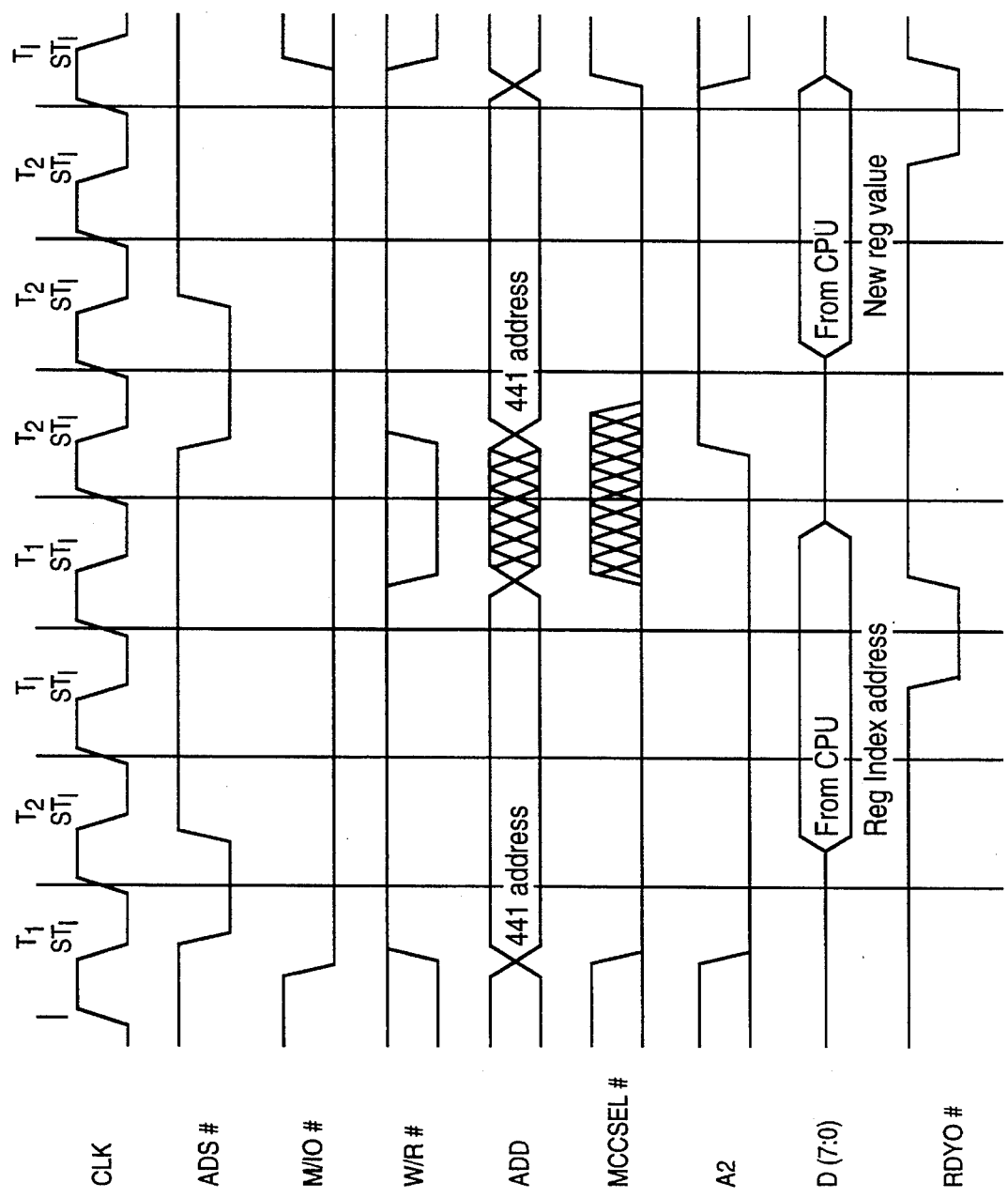
FIG. 38 is a set of waveforms showing control and data signals for a controller register write operation.

FIGS. 37 and 38 show reading and writing to one of the control registers of the controller 70. For these cycles, MCCSEL# should be decoded and asserted to the controller 70 in the T1 state. The controller 70 will return RDYO# to terminate these cycles. Both reads and writes will take on wait state.

Weitek Bus Cycles—The host CPU may execute bus cycles that access the Weitek math coprocessor (4167) in some 486 CPU systems. The controller 70 simply ignores these accesses and does not initiate any activity in the cache or on the system bus. The controller 70 recognizes bus cycles intended for the 4167 through the pattern of A<31:25> being <1100000>. The 4167 acts as a device in a reserved memory space. The 4167 generates its RDYO# signal to the controller 70, which is passed onto the 486 CPU.

Detection of a Weitek coprocessor cycle will unconditionally deassert the KEN# input to the 486 CPU. Data to and from the Weitek coprocessor is regarded as non-cacheable.

If desired, the local RDY# input from the Weitek coprocessor may be operated in an asychronous mode. In this mode, RDY# is latched and sent to the 486 CPU in the following clock, instead of in the same clock. This mode should be used if the synchronous mode RDY# setup time cannot be otherwise met. Bit 1 in the controller 70 control register controls this mode.

CWP Write Cycles—Write cycles to cacheable write-protected regions will be terminated by the controller 70.

RDYO# will be returned to the i486 CPU to complete the cycle in zero wait states, and no system cycle will occur. This will relieve system designers from the duty of decoding and inhibiting writes to regions of memory where code has been shadowed from EPROM to DRAMs.

III) Write-Through Cycles:—The controller 70 defines a third class of cycles to be the write-through cycles. The controller 70 detects a write-through cycle through the following condition:

1. The 486 CPU asserts either the PCD, PWT, or LOCK# pin for a write cycle.

Note that read cycles, by definition, never qualify as write-through cycles. PCD, PWT, and Locked reads are treated as normal read cycles.

When a write-through cycle occurs, the controller 70 will always generate a write to the system bus, regardless if the cycle is determined to be a cache hit or miss.

Write-through cycles which are hits will generate updates to the cache RAM array section 100. In addition, the controller 70 will buffer the write. RDYO# will be returned to the 486 CPU in the first T2 to terminate the write on the CPU bus. The cycle will continue on the system side until the assertion of SRDYI# or SBRDYI#, which indicates that the system has accepted the write data.

Write-through miss cycles will also be buffered writes, although RDYO# will be asserted after three clocks, instead of two as for write hits. Unlike normal write misses, write through miss cycles will neither update the cache nor generate system quad fetches.

IV) Normal (Cacheable) Cycles:—The fourth class of cycles are the normal cacheable cycles. These cycles will be the great majority of cycles which occur. Normal cacheable cycles are the default cycles, and are assumed if a cycle does not fit into any of the previously described categories. Specifically, the controller 70 detects a normal cacheable cycle under either one of the following conditions:

1. A read cycle which is not an I/O, Interrupt Acknowledge, Halt, or Shutdown cycle. In addition, reads whose addresses are contained in the protected address region registers without the NCA bit set are cacheable cycles.
2. A write cycle which is not an I/O, Interrupt Acknowledge, Halt/Shutdown, PCD, PWT, or Locked cycle. In addition, writes whose addresses are contained in the protected address region registers without either the CWP or NCA bits sets are cacheable cycles.

READ OPERATIONS

Cacheable Read Hit Operations—When the 486 CPU initiates a memory data/code read cycle, the assertion of ADS# triggers a compare cycle in the tag array of the controller 70 if the cycle is of the type that can be cached. If a match exists between the cycle address and one of the tag directory entries, a hit results.

Figure 39:
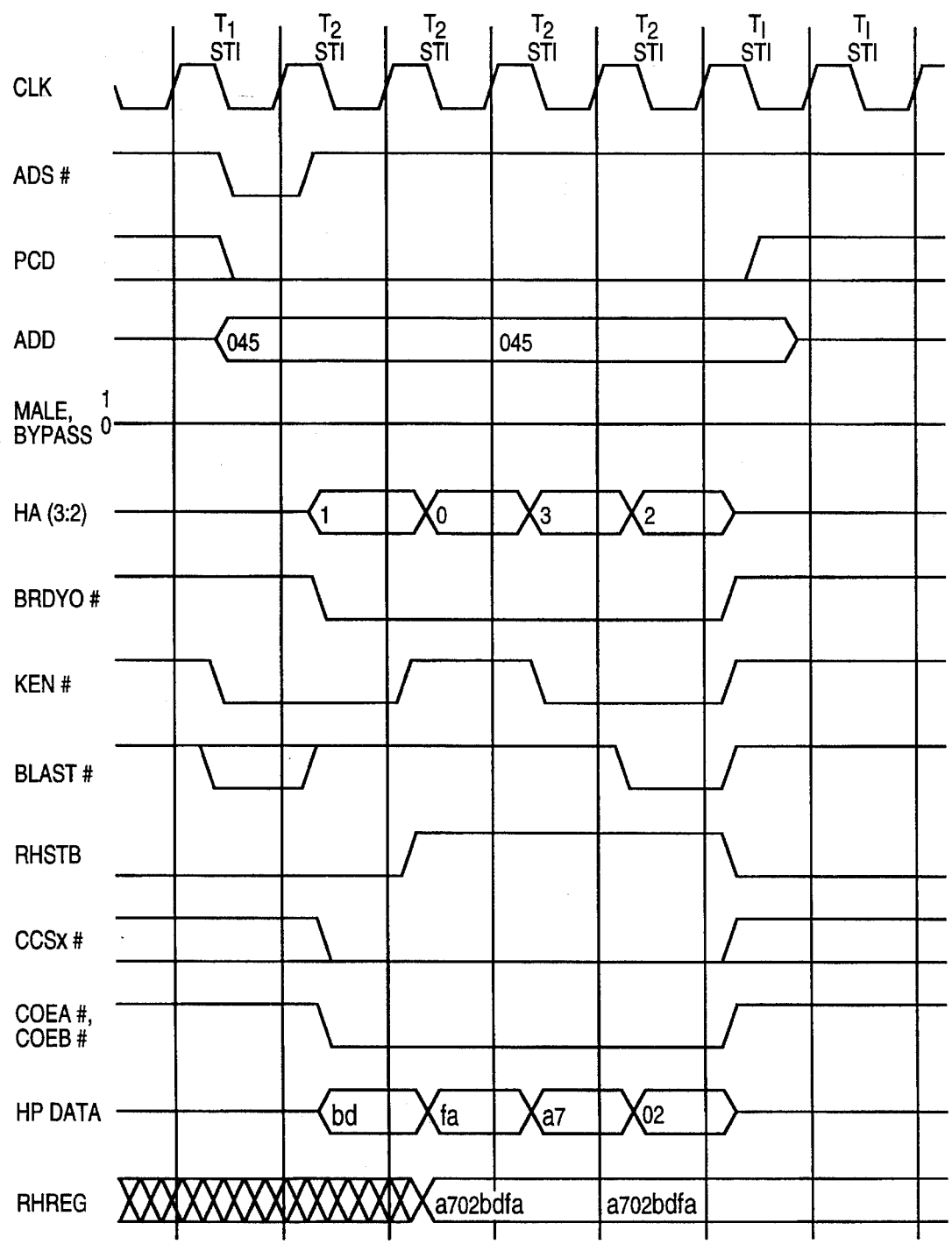
FIG. 39 is a set of waveforms showing control and data signals for a 486 CPU burst read cache hit operation.

A read hit will result in either a single, double, or quad transfer to the 486 CPU. The number of transfers depends on the state of the internal 486 CPU cache, as reflected by the PCD pin. The meanings of the two states of PCD are described below:

1. PCD=0: If the 486 CPU internal cache is enabled and a hit occurs, a quad doubleword transfer will result, in order to fill a line of the 486 CPU. KEN# is returned active (low) twice to the 486 CPU, first in T1 to initiate the line fill, and also the clock before the final transfer. The quad transfer will take five clocks with cache memory 72 burst-RAMs. The demand doubleword will be returned first followed by the other three remaining doublewords in the same line, following the 486 address order. BLAST# will be asserted by the 486 CPU during the fourth transfer. A quad burst transfer from 82C443 Burst-RAMs is shown in FIG. 39).

Figure 40:
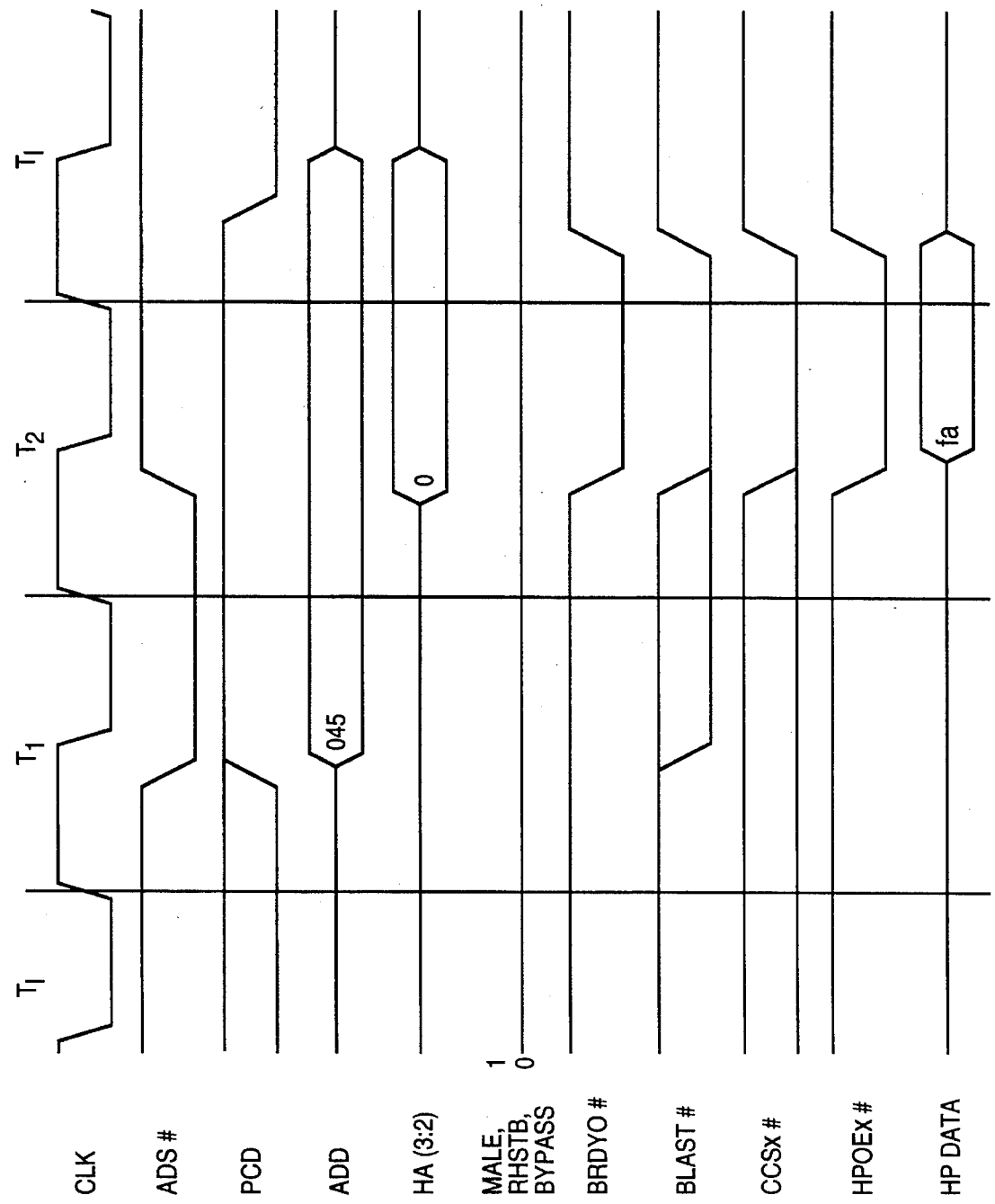
FIG. 40 is a set of waveforms showing control and data signals for a 486 CPU non-burst read cache hit operation.

2. PCD=1: PCD being asserted high by the 486 CPU indicates no line fills will occur in the 486 CPU cache. KEN# will be returned high to the CPU in the T1 state. Either a single, double, or quad transfer will occur in this case, depending on the BLAST# output of the CPU. The controller 70 will monitor BLAST# from the 486 as each transfer is completed. BLAST# assertion (low) indicates that the cycle associated with the corresponding BRDYO# is the last data cycle. BLAST# assertion will terminate the transfers. A single transfer is shown in FIG. 40.

The first demand word will require two bus states. For each of the remaining doublewords, only one bus state is required. BRDYO# will be asserted for each returned doubleword. Single doubleword transfers will require two clocks and double transfers three clocks.

A read cycle to a CWP region will result in the controller 70 returning the KEN# output deasserted (high) to the i486 CPU. This will prevent the corresponding data from being cached inside the i486 CPU internal cache.

The details of hit transfers are as follows. The controller 70 will assert CCSx#. The bank being read is enabled by assertion of HPOEx#. The controller 70 will return BRDYO# to terminate each transfer to the 486 CPU, until BLAST# signals the end of the cycle. The first access will come from the cache data array. However, read hold register set 114 will be loaded with the data to satisfy the entire quad read. Data for the remaining second through fourth transfers will be read from the read hold register set 114. To connect the output of read hold register set 114 to the host port outputs, signal RHSTB will be asserted high in the second ST2 state. For each transfer, the controller 70 will drive HA<3:2> to valid levels to provide 486-style address sequencing. HA3 and HA2 select a doubleword from the four in each line. Although the 486 CPU provides identical functionality as HA3 and HA2 with its A3 and A2 signals, HA<3:2> should be used, since their valid delays are much shorter than those of A<3:2> from the 486 CPU.

Cacheable Read Miss Operations—The tag comparison for a cycle may indicate the occurrence of a read miss. There are two kinds of misses, a tag miss and a line miss. A tag miss results when the tag lookup does not produce a match, or the tag valid bit is not set. A line miss occurs if the tag lookup produces a match and the tag valid bit is set, but any of the four doublewords associated with the line are not valid. Tag misses and line misses are treated differently by the controller 70.

Cacheable read misses generate a system quad fetch. On system quad fetches due to tag misses, data that is retrieved from the system may replace older data existing in the cache. If any of the data which is replaced is both valid and dirty, one or two write-back cycles will occur.

On line misses, there is a tag match, but the line is not wholly existent in the cache data array. Data received from the system will be merged with valid dirty data already contained in the line. As no dirty data is replaced, no write-back cycle(s) will occur from line misses.

The controller 70 examines the LRU bits of the target entries to select which of the two banks is to be replaced. If the "tag-valid" bit for the entry chosen to be replaced is set, the controller then checks if any one of the eight doublewords of the two lines which correspond to the selected tag entry are set "valid" and "dirty". Any such words within either line means that the corresponding line will have to be written back to main memory by later write-back cycle(s). All valid bits as well as the "dirty" (altered) bit for the lines will then be reset.

The controller 70 will latch the read miss address into the cache memory 72's miss address register 110. The miss address together with the LRU bits select the data line to be replaced. This data is then latched into the write back register set 118 of the cache memory 72.

On the host side, the 486 PCD pin affects read miss operations similarly to the read hit case. PCD being low indicates a cache line fill for the 486 and cache memory 72 will occur. The controller will assert KEN# twice to the 486 CPU to perform a line fill, before the first and fourth transfers are completed. If PCD is high, no line will occur in the 486 CPU cache, although a line fill will occur in the cache memory 72. KEN# will be returned high to the 486 CPU in this case.

Cacheable read misses initiate quad fetches on the system side, in order to bring four doublewords into the cache data RAM and fill a cache line. This quad fetch will continue, eve if the 486 CPU does not require all four doublewords (i.e., the 486 CPU internal cache is turned off). The CPU may terminate the fetch on the host side after one or two transfers, while the quad fetch from the system continues until completion. The quad fetch is finished in order to increase the cache hit rate and, as a result, overall performance. The controller 70 will assert SBLAST# on the fourth transfer, to indicate the completion of the cycle.

Figure 41:
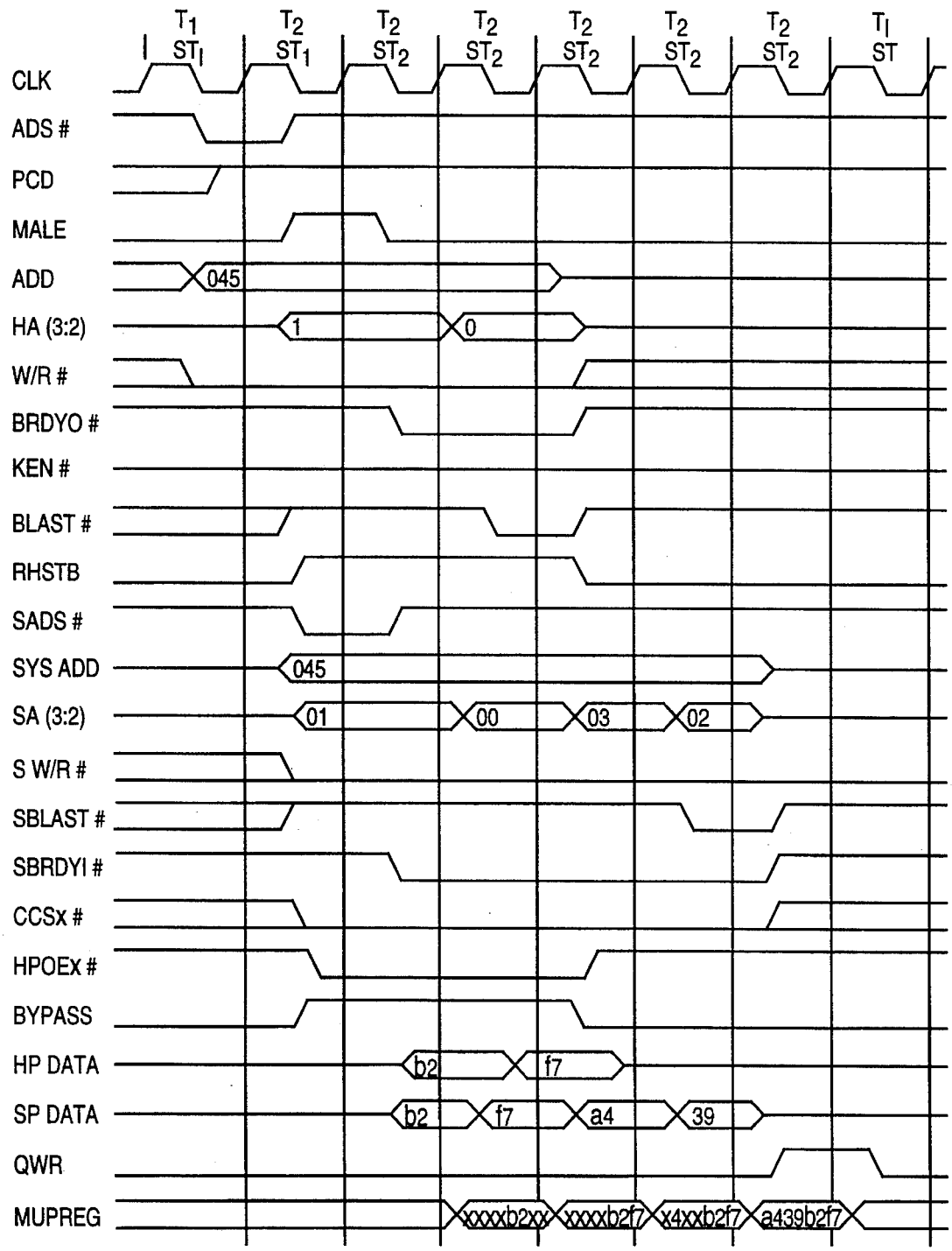
FIG. 41 is a set of waveforms showing control and data signals for a read line miss and resulting quad fetch operation.

FIG. 41 shows a read line miss with PCD asserted by the 486 CPU. A system quad fetch results and completes, although the 486 CPU terminates the cycle on its local bus after only two transfers. Note that another read or write hit could then be processed on the local bus while the system quad fetch completes. The write-back architecture of the controller 70/cache memory 72 isolate local CPU and system bus processing.

In FIG. 41, signal MALE is asserted high in T2 to indicate that a miss has occurred. The assertion of MALE latches the read miss information. Bypass is asserted high to allow data from the system quad fetch to pass on to the 486 CPU in the same clock. The addition of the Bypass propagation delay means that valid data setup time for the cache memory 72 must be greater than that of the 486 CPU. HPOEx# goes low to enable the host port outputs to bypass data received from the system.

During a system quad fetch, system logic can assert either SRDYI# four times or SBRDYI# four times to complete the transfer. A combination of SRDYI# and SBRDYI# assertions (i.e., interrupted burst) is not supported by the controller 70. To sustain high performance, the controller 70 will pass either ready input from the system to the 486 CPU as BRDYO#. BLAST# is monitored as each doubleword is transferred. BLAST# assertion will terminate the cycle on the local CPU side.

The system quad fetch from main memory will not be written directly to the cache data array. Instead, fetched data will be loaded into memory update register set 116. Since the line may have been partially valid and contained some dirty doublewords which should not be overwritten, incoming doublewords from system memory will be qualified before they can be written into memory update register set 116. The controller 70 will assert the DW# signal to indicate to the cache memory 72 that the fetched doubleword may be safely written into memory update register set 116. Inactivation of DW#inhibits dirty and valid miss data from being overwritten by system quad fetch data.

There is a "mask" bit associated with each of the four words of the memory update register set 116. The activation of this "mask" bit disables the corresponding memory update register set 116 word from updating the cache memory 72 RAM array section 100. The update clears all "mask" bits. At the completion of the system quad fetch, the controller 70 will write the contents of memory update register set 116 into the cache memory 72 data array by asserting the QWR signal. Associated "valid" bits of the corresponding line will be set.

The controller 70 will send the appropriate control signals to turn the data transceiver to receive mode. The address sequence to main memory will either follow 486 style address sequence or sequential address sequence.

If the burst order at main memory interface is the same as the 486 (no re-ordering is occurring), the Bypass signal will be activated and the incoming data from main memory will be sent to the local bus through the bypass path inside the cache memory 72. At the same time, the data will be latched in a cache memory 72 register, to be updated into the cache memory 72 once the entire line is received.

Figure 42:
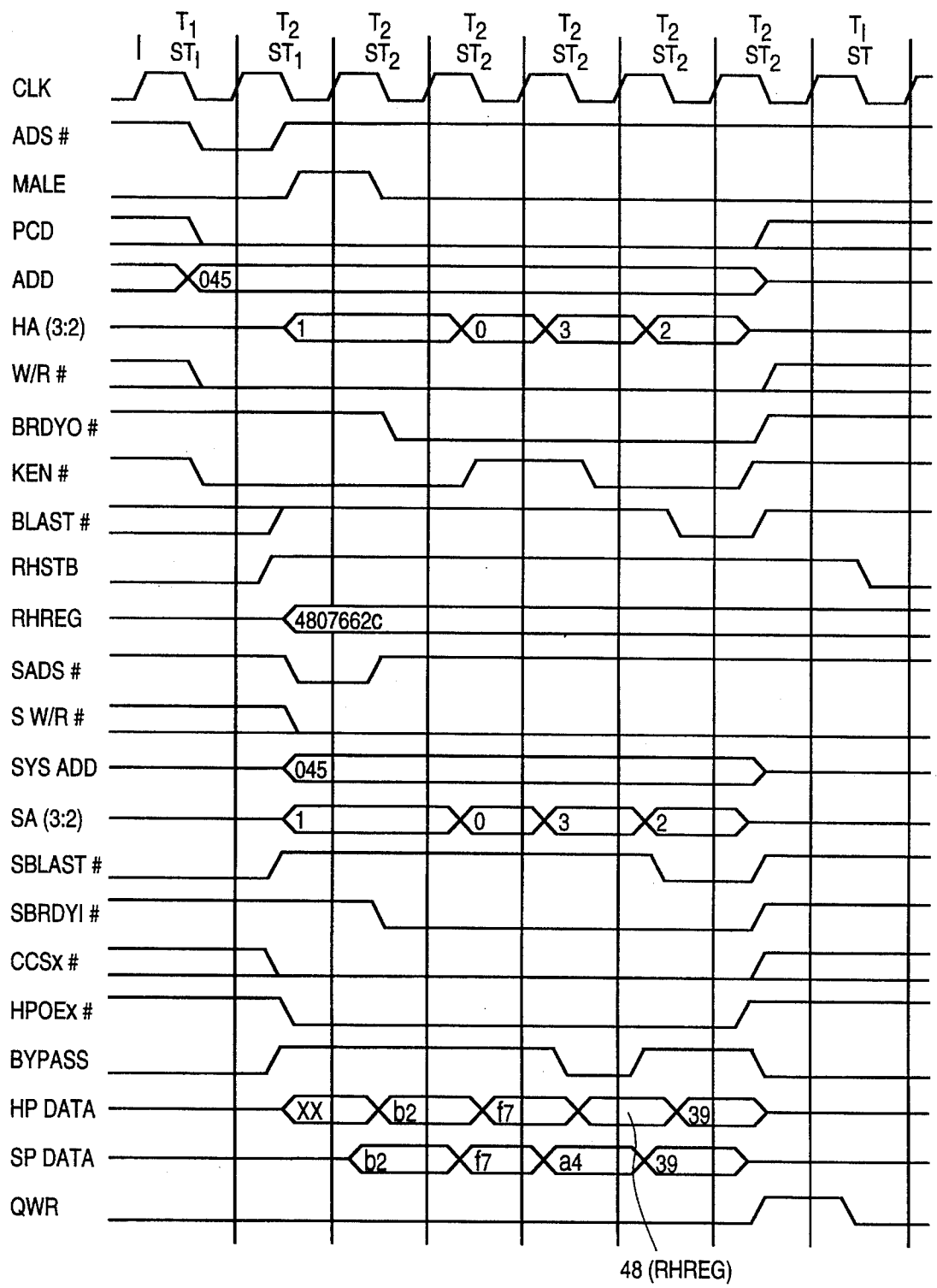
FIG. 42 is a set of waveforms showing control and data signals for a read line miss operation with no replacement.

FIG. 42 details a read line miss, with the controller 70 responding by activating a quad fetch on the system memory bus. Assertion of SADS# and the other control signals initiate the quad fetch. Bypass is activated, so that the data being returned from the system is forwarded on to the 486 CPU in the same clock. Because the read data must propagate through the cache memory 72 Bypass path and still meet 486 CPU setup time specification, the read data setup time to the cache memory 72 is longer than that of a 486 CPU by itself.

To assist the system in performing one clock bursts, the SA3 and SA2 (system address 3 and 2) signals become valid early in each T2 state, much sooner than the 486 CPU would provide them. In addition, the read data is latched into the cache memory 72 memory update register set 116 register. At the completion of the transfer, the controller 70 activates SBLAST# to terminate the cycle. The data in memory update register set 116 is written into the cache memory 72 RAM array section 100 by activation of the QWR (Quad WRite) signal.

FIG. 42 also details a complexity that will sometimes occur. On read line misses, the line is partially present in the cache memory 72 data array, and some of these doublewords may be dirty. When the corresponding address for dirty doublewords is generated during the system quad fetch, the data should be returned from the cache data array instead of the system. For these dirty doublewords, the Bypass signal will be dynamically turned off (low) and the dirty data will be correctly supplied to the 486 CPU from cache memory 72. This process is transparent to the system, which should supply data for all transfers of a quad fetch.

This occurrence is shown during the third transfer in FIG. 42, where Bypass is de-asserted and the data that the 486 CPU receives comes from the cache memory 72 read hold register set 114 instead of the system. Note that to be prepared for this case, signal RHSTB is asserted high in T2 to load read hold register set 114 with the cache data for the miss address line.

Figure 43:
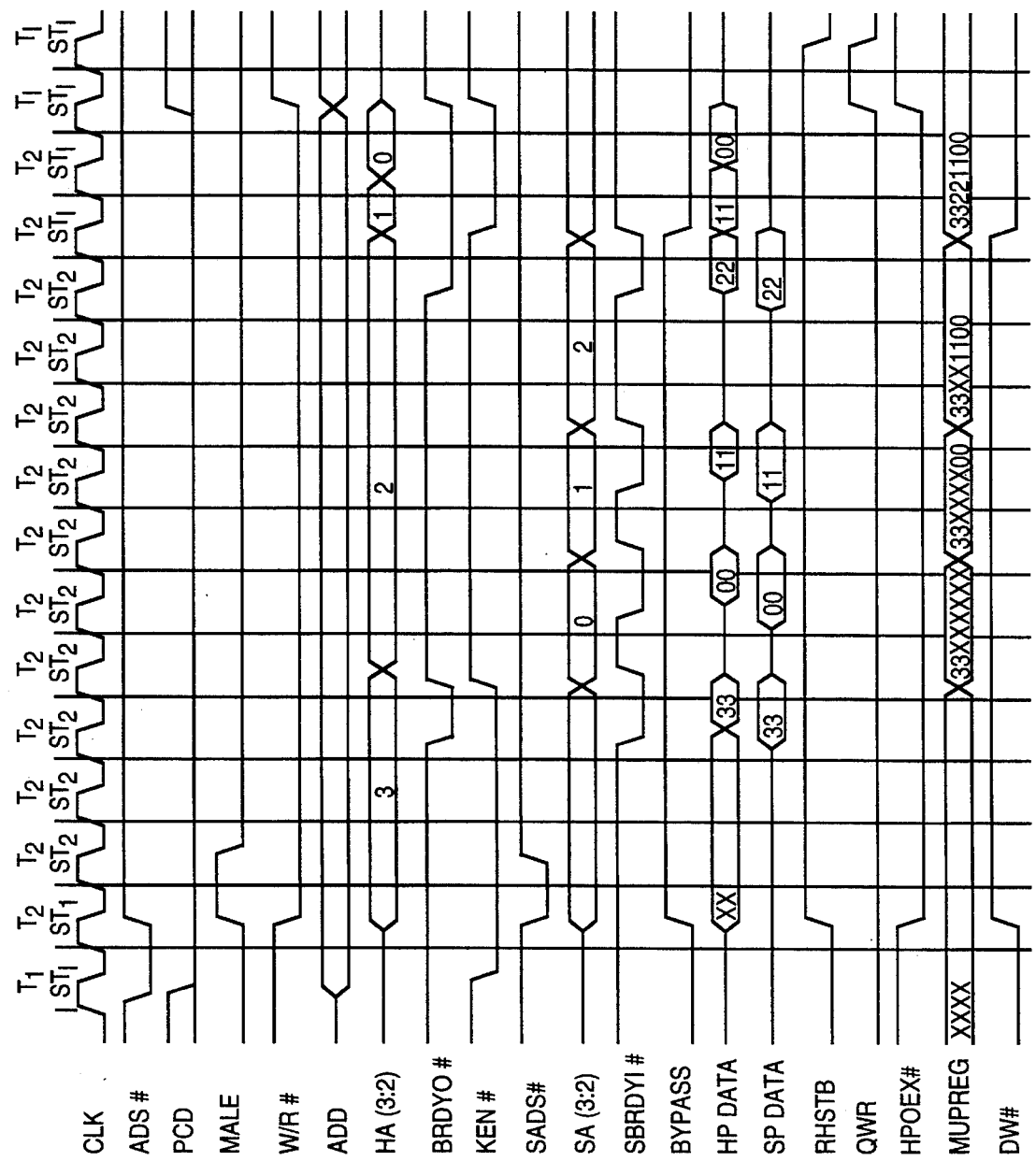
FIG. 43 is a set of waveforms showing control and data signals for a read line miss operation with reordering.

FIG. 43 details a read line miss with reordering. A difference in address order between the main memory interface and the 486 will result in the first demand word to be sent to the local bus through the cache memory 72 bypass path. The second and third doublewords within the line will be latched into cache memory 72 memory update register set 116 as well as being sent to the 486 CPU. However, since reordering is being done, RDYO# will not be asserted to the 486 CPU and it will not latch these doublewords. The fourth doubleword is then returned from main memory, passed to the CPU by way of the cache memory 72 bypass path and latched into memory update register set 116 simultaneously.

The subsequent two remaining doublewords (second and third doublewords transferred) now in memory update register set 116 with 486 burst-order. The controller 70 will generate BRDYO# for these two remaining returned data cycles. Note that as in the previous figure, part of the line may be valid and dirty. The controller 70 will deassert Bypass and supply the 486 CPU with the correct dirty data during the appropriate transfers.

Write-Back Cycles Due to Read Tag Misses:—The new data to be brought into the cache from the system during read misses replaces older data residing in the cache. However, the write-back architecture of the controller 70 requires additional considerations when this old cache data is replaced. A direct replacement algorithm would cause data to be lost if the replaced data is valid and dirty. Data is marked dirty if it has been modified by the 486 CPU but not yet been copied back to main memory.

Because of this, read tag misses and the subsequent loading of a new line of data into the cache from the resulting system quad fetch may be followed by one or two write-back cycles to main memory at the end of the quad fetch. For high performance, the controller 70 allows these quad writes to be burst to main memory, if the system memory controller is capable of receiving such bursts.

The controller 70 will generate either zero, one or two quad write replacement cycles to main memory, which may be bursted by the system. No write replacement cycle will be generated if the selected tag entry is invalid or both lines associated with the selected tag entry contain no dirty data.

If any of the doublewords for a given replaced line are marked dirty and valid, a write-back cycle will occur and write all four doublewords of the line to main memory. Quad fetches due to misses and write-back replacement cycles will not abort due to subsequent miss cycles. Address order on quad-writes may follow either 486 burst order or sequential burst order. Unlike write-back cycles which occur due to flush operations, the CALE signal will not be generated for write-backs due to misses, as the needed address is already contained in the cache memory 72 miss address register 110.

Quad write transfers will contain a mixture of dirty and non-dirty doublewords. As a performance enhancement, the controller 70 provides a signal to avoid performing writes which would contain non-dirty data (which the system already contains). The DW# signal is driven valid in all T2 states of write cycles. To simplify system design, DW# will become valid early in each state.

DW# should be incorporated into two parts of system memory logic. First, DW# should be part of the write enable logic. DW# being low for a transfer indicates that the corresponding data is indeed dirty and should be written into the system memory array. Writes in which DW# is driven low are processed normally by the system.

However, when the DW# is driven high, the data appearing on the cache memory 72 data outputs is not dirty. The system may, at its option, accept this write data.

To add additional system performance, DW# can be incorporated into the SRDYI#/SBRDYI# logic in order to quickly terminate non-dirty writes. The state of DW# being high can be used in combinational logic to terminate non-burst dummy write transfers in two clocks and burst dummy transfers in one clock. Because DW# becomes valid early in each T2 bus state, it can easily be incorporated into system logic without being the most critical path.

At the end of the first write-back cycle, if any of the four double-words from the other line associated with the replaced tag are marked valid and dirty, the controller 70 will invoke another replacement burst write-back cycle through MWB activation. WB STB will be asserted. MWB assertion allows the cache memory 72 internal miss address register (miss address register 110) counter to be pointed at the desired replace line and the assertion of WB STB allows the next accessed replacement data to be latched into write back register set 118. This data will later be written back to main memory through a second write-back cycle.

System assertion of either SRDYI# four times or SBRDYI# four times to terminate the transfers is allowed. Combinations of SRDYI# and SBRDYI# to terminate the transfers of a quad write are not supported. Once the system has asserted either SRDYI# or SBRDYI# to complete the first transfer, it must assert the same signal three more times to finish the transfer. The controller 70 will assert SBLAST# during the fourth transfer to indicate completion of the quad write.

Figure 44:
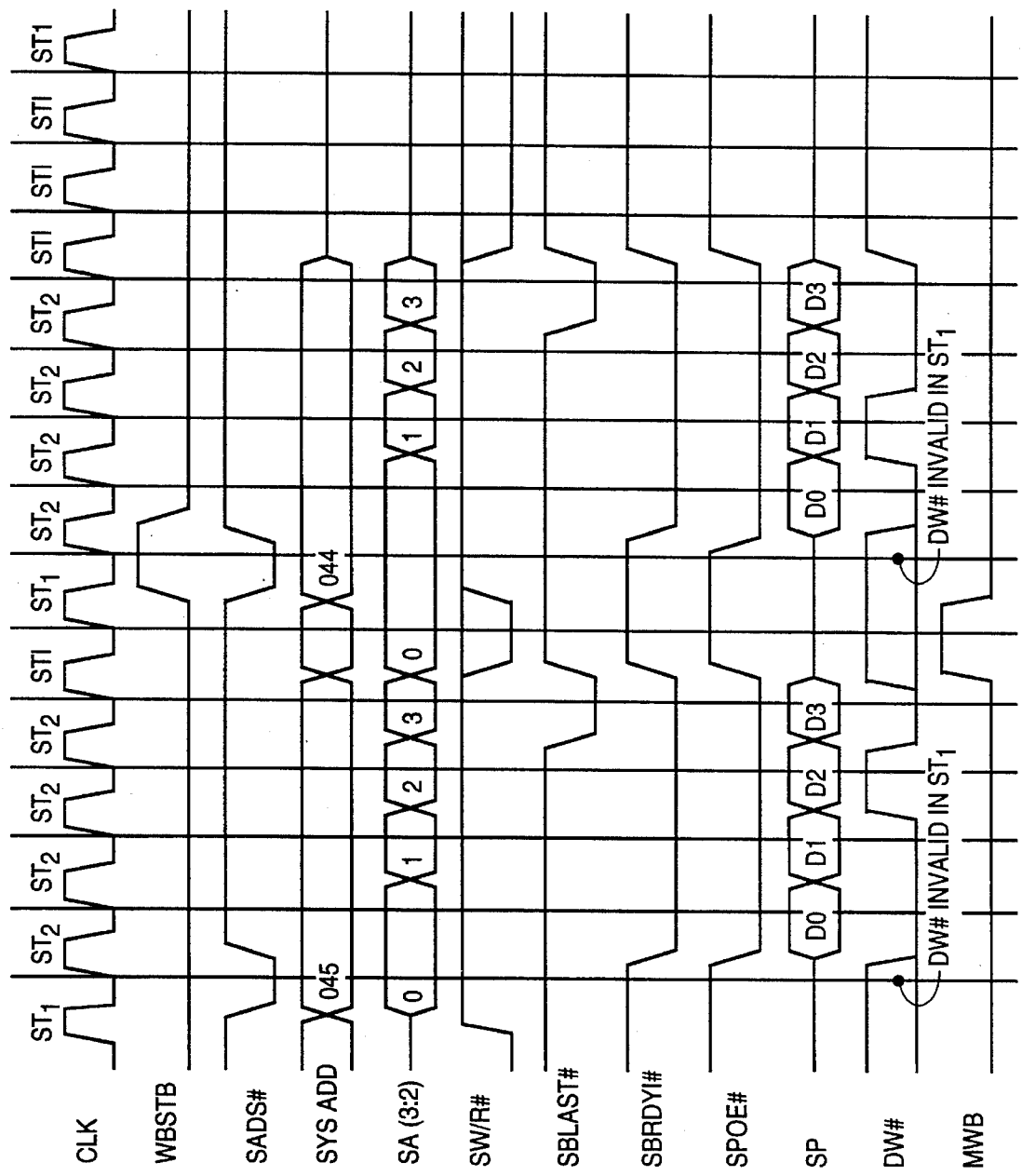
FIG. 44 is a set of waveforms showing control and data signals for a multiple write-back cycle operation.

FIG. 44 details a write-back cycle to memory, where both lines associates with a tag entry contain valid and dirty data. On the system side, SADS# and all system cycle definition signals are driven valid in T1 (with the exception of DW#, which becomes valid in T2). Note DW# toggling each transfer to indicate dirty/non-dirty status. SPOE# is asserted in ST2 to enable the system port 112 of the cache memory 72.

WRITE OPERATIONS

Write Hits

For best performance, the controller 70 supports 486 CPU systems only with write-back mode. Write-through mode is supported on a cycle-to-cycle basis by monitoring the PWT signal on the 486. In write-back mode, the controller 70 updates the cache memory without updating the system memory if a cache hit occurs. Main memory is updated only when a dirty line is replaced.

Figure 45:
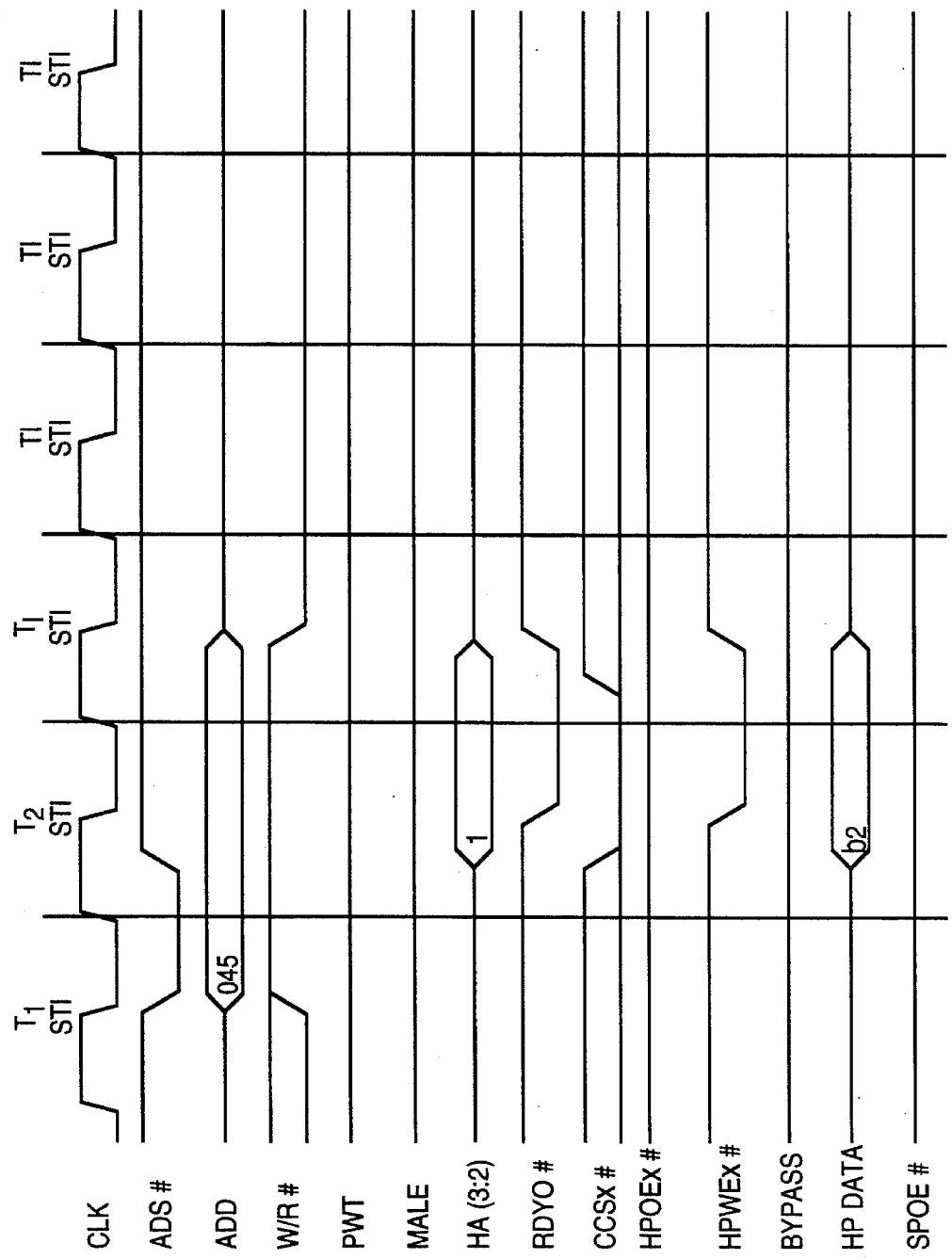
FIG. 45 is a set of waveforms showing control and data signals for a cacheable write hit cycle operation.

FIG. 45 shows a cacheable write hit operation. The cycle is terminated in two clocks by assertion of RDYO# to the 486 CPU. The write data is simply latched into the cache data array by assertion of HPWEx# in T2. The associated valid and dirty bits for the double word are set in the controller 70 tag array. BLAST# will always be asserted on the first transfer, as only scalar writes are supported by the 486 CPU. The 486 CPU cannot burst write more than 32 bits.

Write Miss Operations

Cache memory 72 write-back architecture filters out most of the write traffic induced by the 486 CPU internal cache write-through policy. System write cycle latency is eliminated as the performance bottleneck. Furthermore, use of cache memory 72 allows write misses to be followed by zero wait states read/write hits with no idle bus clocks.

Write Miss Cycles

In order to achieve maximum performance, the controller 70 will essentially treat write miss cycles as write hit cycles, by writing the data directly into the cache and replacing one line in the cache. A one-clock latency is required to first move the data being replaced from the cache data array into the write back register set 118, for later write-back if dirty data was present in the replaced line. As a result of this one-clock latency, write miss cycles will occur in three clocks, instead of two.

A system quad fetch will then occur, in order to bring in the remainder of the 16-byte line. This quad fetch can execute concurrently with any later read/write hit cycles driven by the CPU.

To avoid any coherency or ownership problems in the period of time after the CPU write has occurred and before the system fetch has begun, the write into the cache memory 72 RAM array section 100 (the write miss) and the following system quad fetch much execute as one indivisible operation.

The architecture of the controller 70 guarantees that the local write cycle and the following system quad fetch will in effect be a locked operation (although SLOCK# is not asserted). To ensure this, the write miss will not be completed until the controller 70 owns the system bus (SHLDA deasserted). Write misses when the system bus is granted will be stalled by delay of RDYO# until SHLDA is deasserted. If the controller 70 owns the system bus when the write miss occurs, the controller 70 will perform the system quad fetch to completion, by not granting SHLDA until the fetch and any subsequent possible write-back cycles are completed.

Similar to read misses, write misses are of two types: write line misses and write tag misses:

1. Write line misses:

A cacheable write line miss will latch the write data into the cache data array, and assert RDYO# in three clocks to the CPU to terminate the cycle on the host side. In addition, a system quad fetch will be initiated in order to obtain the remaining data of the cache line. Incoming data from the system quad fetch will be merged with any dirty data in the line, including the just-written miss data from the CPU. No write-backs will occur from write line misses, as no tags are replaced. The details are as follows:

Signal MALE is asserted in T2 to inhibit writes directly into the cache data array. The data is instead written first into write register 120, and then into the data array. A "mask" bit associated with each doubleword of the line inside the cache memory 72 is set. This "mask" bit is used to prevent the data written from the 486 CPU and any other dirty data from being overwritten by the corresponding data which will later be obtained from the pending quad fetch.

RDYO# is asserted to the 486 CPU to terminate the local CPU cycle. This termination happens during the third clock of the cycle (one wait state).

Figure 46A:
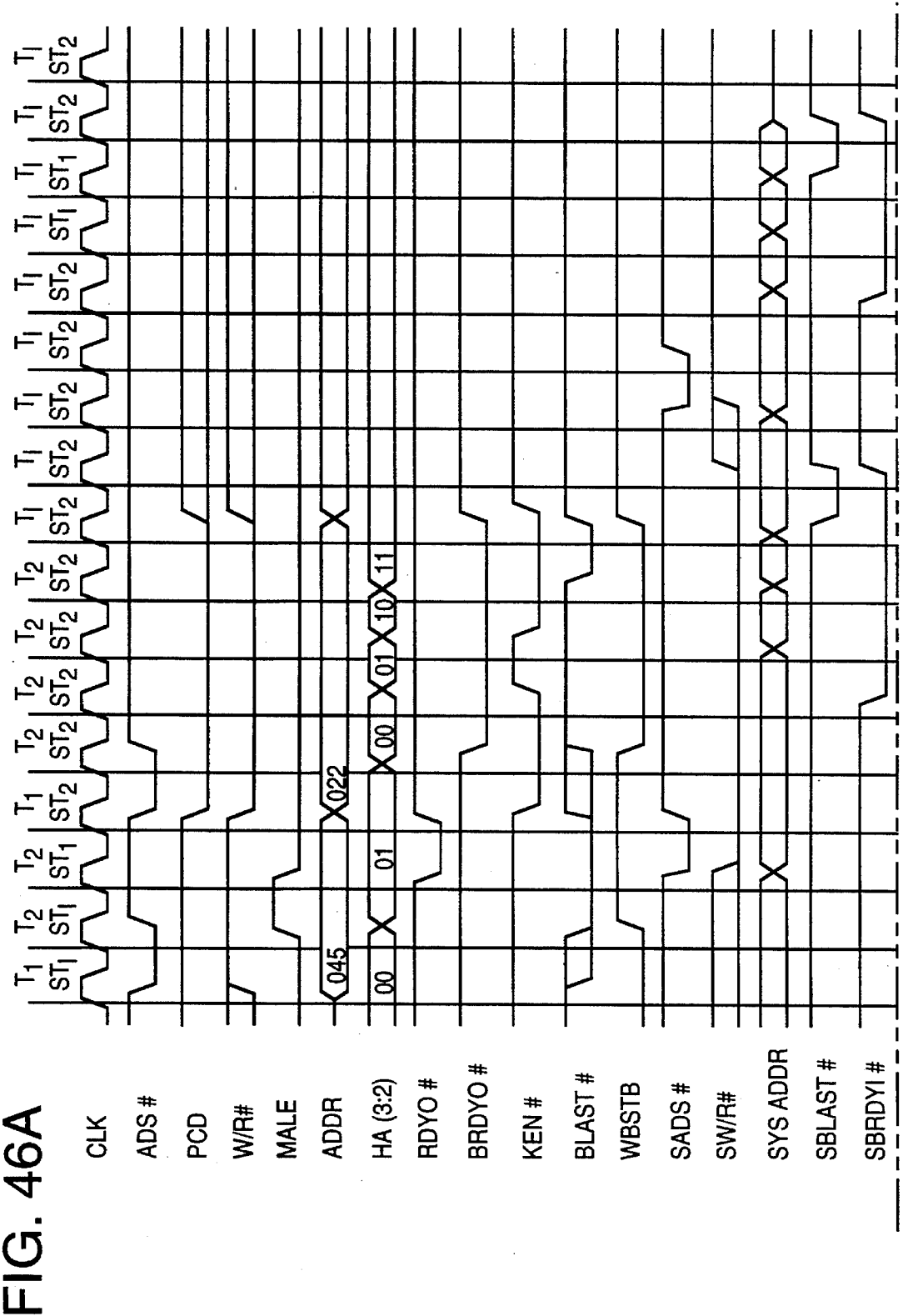
FIG. 46A and 46B are a set of waveforms showing control and data signals for a write tag miss operation with one write-back cycle and concurrent processing.
Figure 46B:
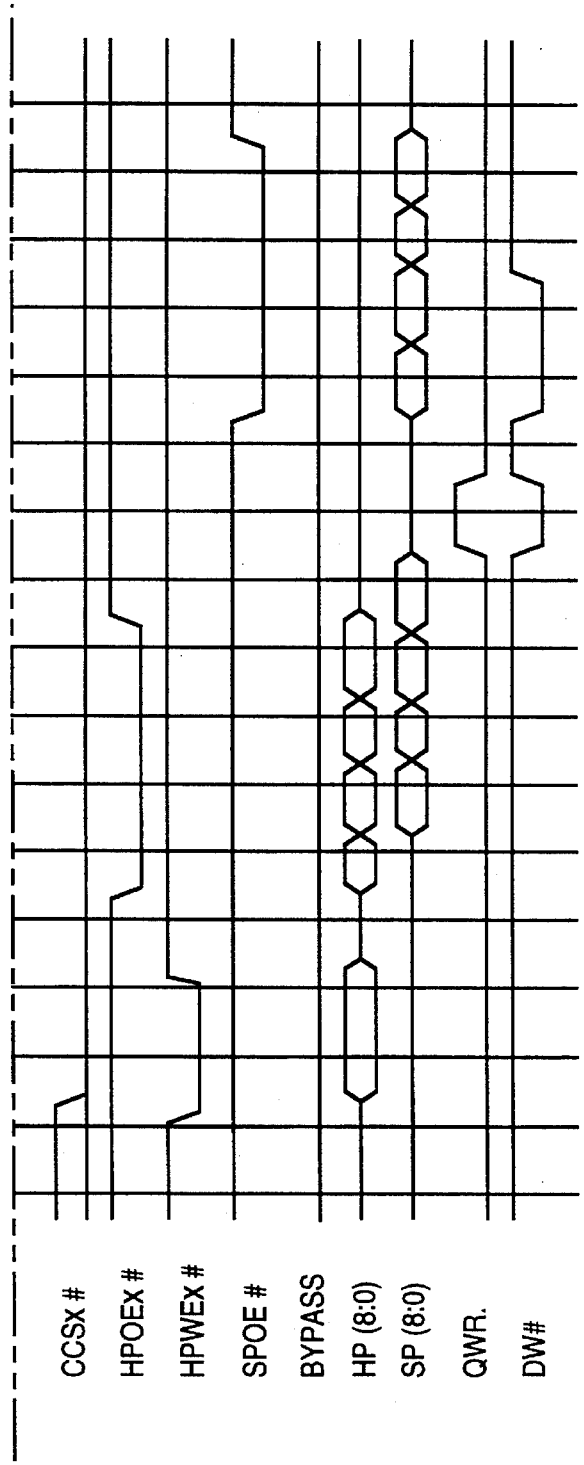

The host port of the cache memory 72 can serve any read/write hits with no wait states following any write miss. FIGS. 46A and 46B show an example of a write miss followed directly by a read hit, and the subsequent processing on both busses that occurs.

A write miss cycle detected by the controller 70 results in the miss address being latched into the cache memory 72 miss address register 110. The controller 70 then generates a quad fetch to main memory, at the location pointed to by miss address register 110. This quad fetch is "wrapped around" the demand miss word on a 16-byte address boundary. The order will either follow 486-style address order or sequential address order.

Data returned from the quad fetch is loaded into the cache memory 72 memory update register set 116. Similar to system quad fetches due to read line misses, the DW# signal is asserted from the controller 70 to the cache memory 72's to qualify incoming quad fetch data, so that the write miss data and any other dirty data is not overwritten.

The controller 70 asserts SBLAST# during the fourth transfer of the quad fetch, to terminal the cycle. At the completion of the system quad fetch, the controller 70 then writes the contents of memory update register set 116 into the cache memory 72 data array by assertion of the QWR (Quad Write) signal. The update entry in the data array is pointed to by the miss address register 110.

Figure 47:
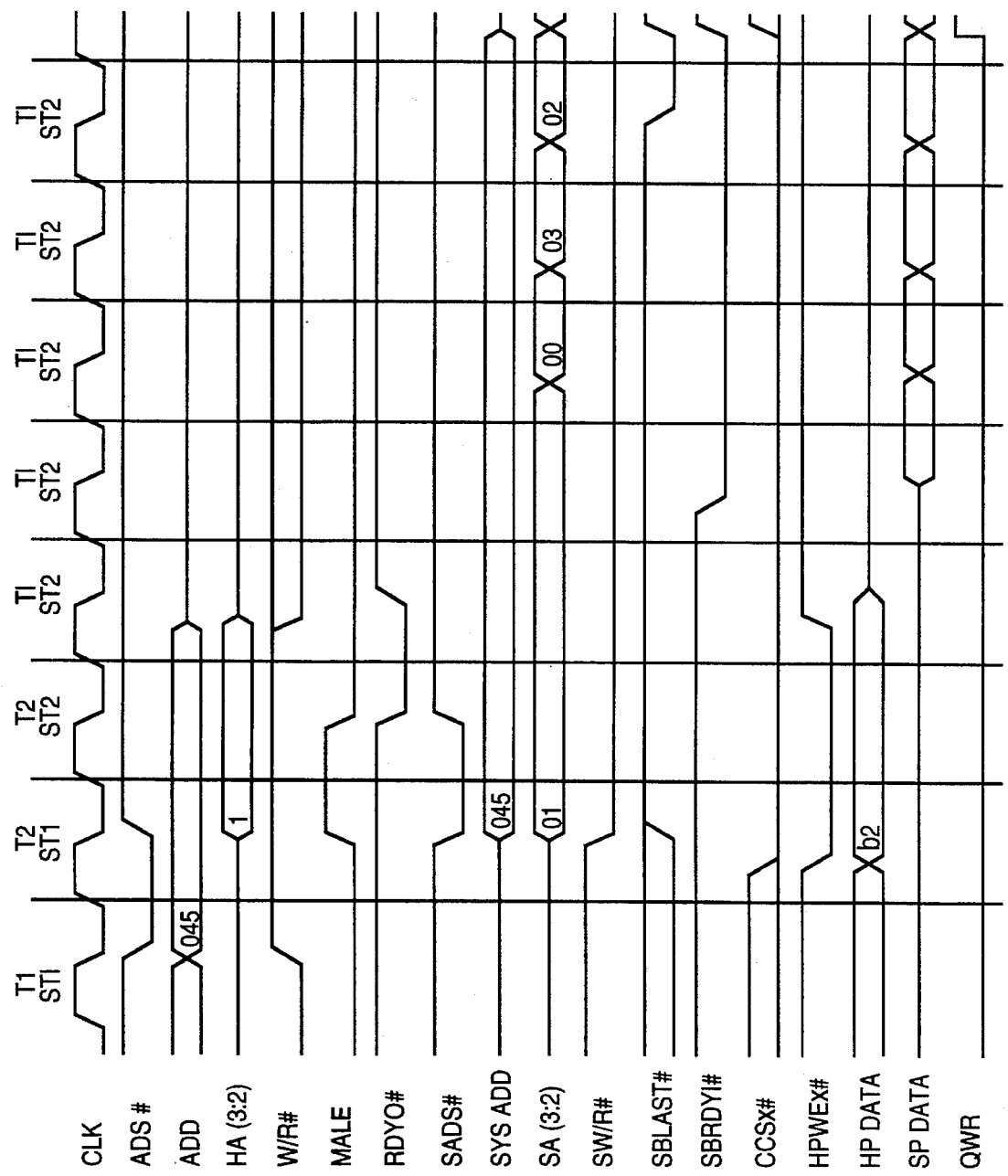
FIG. 47 is a set of waveforms showing control and data signals for a write line miss operation and resulting system quad fetch.

FIG. 47 shows a write line miss being terminated with one wait state, and the resulting system quad fetch that occurs.

2. Write tag misses:

Write tag misses are similar to write line misses. However, a tag will be replaced during write tag miss processing, so write tag misses may be followed by write-back cycles. The quad fetch will be followed by one or two write-back cycles of the data for the replaced tag, if either line contained any "valid" or "dirty" data. Write-back cycles due to write tag misses are otherwise identical to write-backs from read tag misses.

First, MALE is asserted by the controller 70 in T2 to prevent the write data from directly overwriting data in the cache array, since this data may be dirty and must then be written back to memory. Instead, the write data is internally latched into the cache memory 72 write register 120.

Next, a line to be replaced is selected. The controller 70 will select one out of the two selected replace entries if any of the entries are marked "invalid" of 2-way set associative mode has been chosen. The LRU bits and an LRU policy will be used to select if all entries of the replace lines are marked "valid". The selected line is latched into the cache memory 72 write back register set 118.

Now the data in write register 120 is written into the cache memory 72 data array, since any potentially dirty data has been moved to write back register set 118. As described before in the write line miss case, there is a mask bit for each doubleword to prevent the CPU write data from being overwritten by the incoming system quad fetch data.

The controller 70 then terminates the write miss cycle through RDYO# assertion. As in the write line miss case, this will occur in three clocks.

The write miss address is latched into miss address register 110, and a system quad fetch occurs at the address pointed to by the miss address register 110, with the fetched data loading memory update register set 116. As before, SBLAST# terminates the system quad fetch. Assertion of QWR by the controller 70 writes the contents of memory update register set 116 into the cache data array.

A subsequent read/write operation from the 486 with a different miss line address will be 'frozen' through delay of RDYO# or BRDYO# until the replacement cycle (if any) of this write miss is completed.

Finally, one or two write-back cycle(s) will occur if any valid and dirty data was replaced. These write-backs will occur as follows:

Write-back cycles due to write tag misses are functionally identical to the write-backs generated from read tag misses which were previously described. System logic can and should not differentiate between these two cases of write-backs as they serve the same purpose and function identically.

Figure 48A:
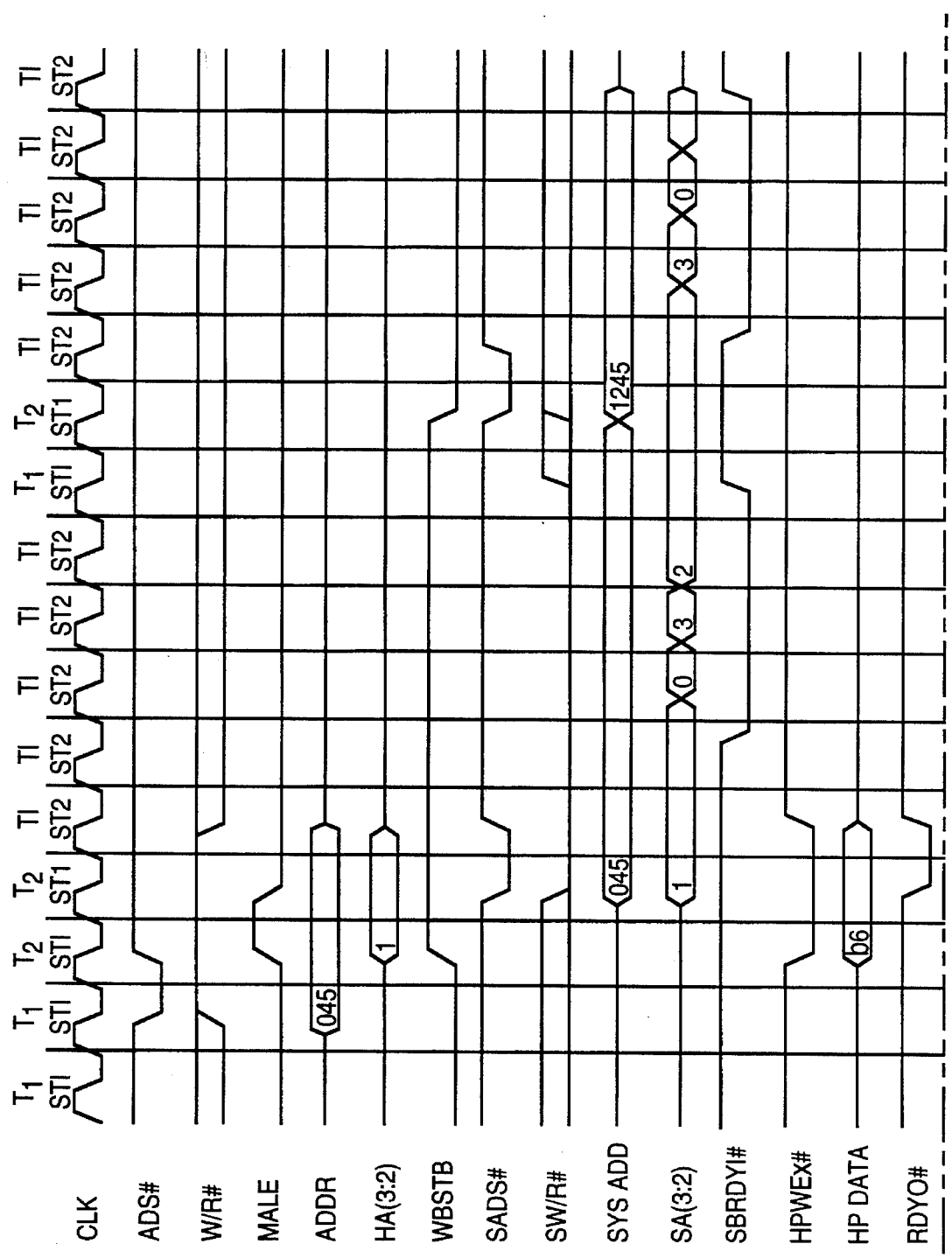
FIGS. 48A and 48B are a set of waveforms showing control and data signals for a write tag miss operation with one write-back cycle.
Figure 48B:
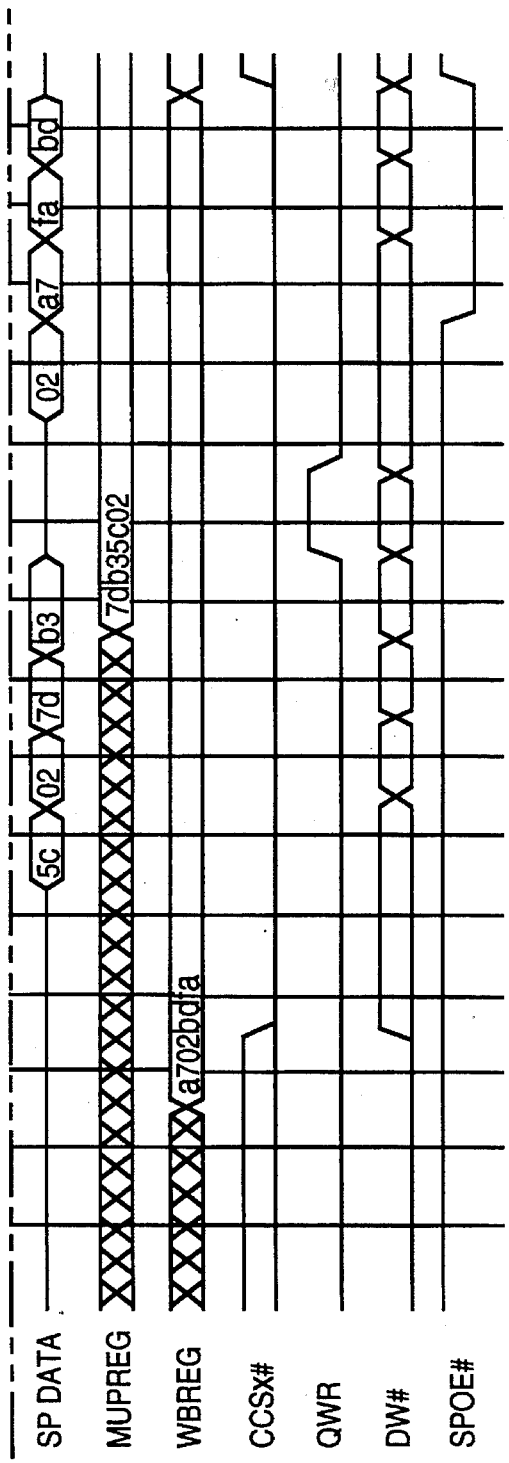

FIGS. 48A and 48B show a write tag miss. The line retrieved from the resulting system quad fetch replaces dirty data and a write-back cycle to main memory is generated.

SYSTEM BUS STATES

All system cycles will begin in the ST1 state, when the controller 70 asserts SADS# (low) and drives the cycle definition and address signals. Bus cycle definition and encodings will emulate that of the i486 CPU, with the exception that SBLAST# will be driven to a valid level in ST1, along with the other definition signals. All controller 70 signals (except one) are driven to valid levels in the ST1 state.

The ST2 state will always follow the ST1 state. The controller 70 will remain in the ST2 state until either SRDYI# or SBRDYI# is asserted. The DW# output of the controller 70 will be asserted only in ST2 states. DW# will not be valid in ST1 states.

If the memory system chooses a non-burst transfer by returning SRDYI# for a multiple-cycle transfer, the controller 70 will re-enter the ST1 state and drive another ADS# signal to the system.

Once either SRDYI# or SBRDYI# is asserted to complete the first cycle in a multiple-cycle transfer, the same signal must again be asserted to complete the remaining cycles, or correct operation is not guaranteed. For example, if the system asserts SBRDYI# to complete the first cycle of a system quad fetch, SBRDYI# must be asserted to complete the remaining cycles of the transfer. This requirement is the same for both multiple cycle read and write transfers. Assertion of SBLAST# by the controller 70 indicates that the next assertion of the ready inputs will terminate this cycle.

In some cases, System Hold Acknowledge (SHLDA) latency can be longer than the corresponding hold acknowledge (HLDA) latency for the i486 CPU. SHOLD will be acknowledged by asserting SHLDA only if no further cycles are required to complete the previous transaction. For example, if a write miss triggered a system quad fetch further followed by two write-back cycles, an SHOLD request occurring during the write miss would not be acknowledged until the write-back cycles had completed on the bus.

OTHER BUS OPERATIONS

This section will detail how the controller 70 will respond to operations other than 486 CPU bus cycles. Reset, flush, assertion of SHOLD, and snoop operations will be covered.

RESET

RESET clears the tag arrays (valid and dirty bits) of the controller 70, RESET should not always be tied directly to the system, as some systems may desire to reset the CPU separatably from the memory array. Unlike write-through caches, the controller 70 must be reset with the memory array in these cases. The controller 70 will be able to respond to SHOLD during RESET, as the 486 recognizes HOLD during RESET.

SHOLD/SHLD OPERATION

The controller 70 grants and receives the system side bus through the use of SHOLD (System Hold Request) and SHLDA (System Hold Acknowledge). SHOLD may be asserted at any time to the controller 70. If the system bus is idle, SHLDA will acknowledge the request by asserted high. However, if a system bus cycle is in process, there will be a latency until the request is acknowledge. If SHOLD is still active at the next system bus cycle boundary (SBLAST# low and either SRDY# or SBRDY# asserted low), SHLDA will then be asserted high in acknowledgement. As in the 486 CPU, short SHOLD requests (those that appear during a bus cycle bus disappear before the first bus cycle boundary) are ignored.

In the same clock that SHLDA is asserted, the controller 70 will float all system side control, address, and data lines to allow another bus master access to the system bus.

Figure 49:
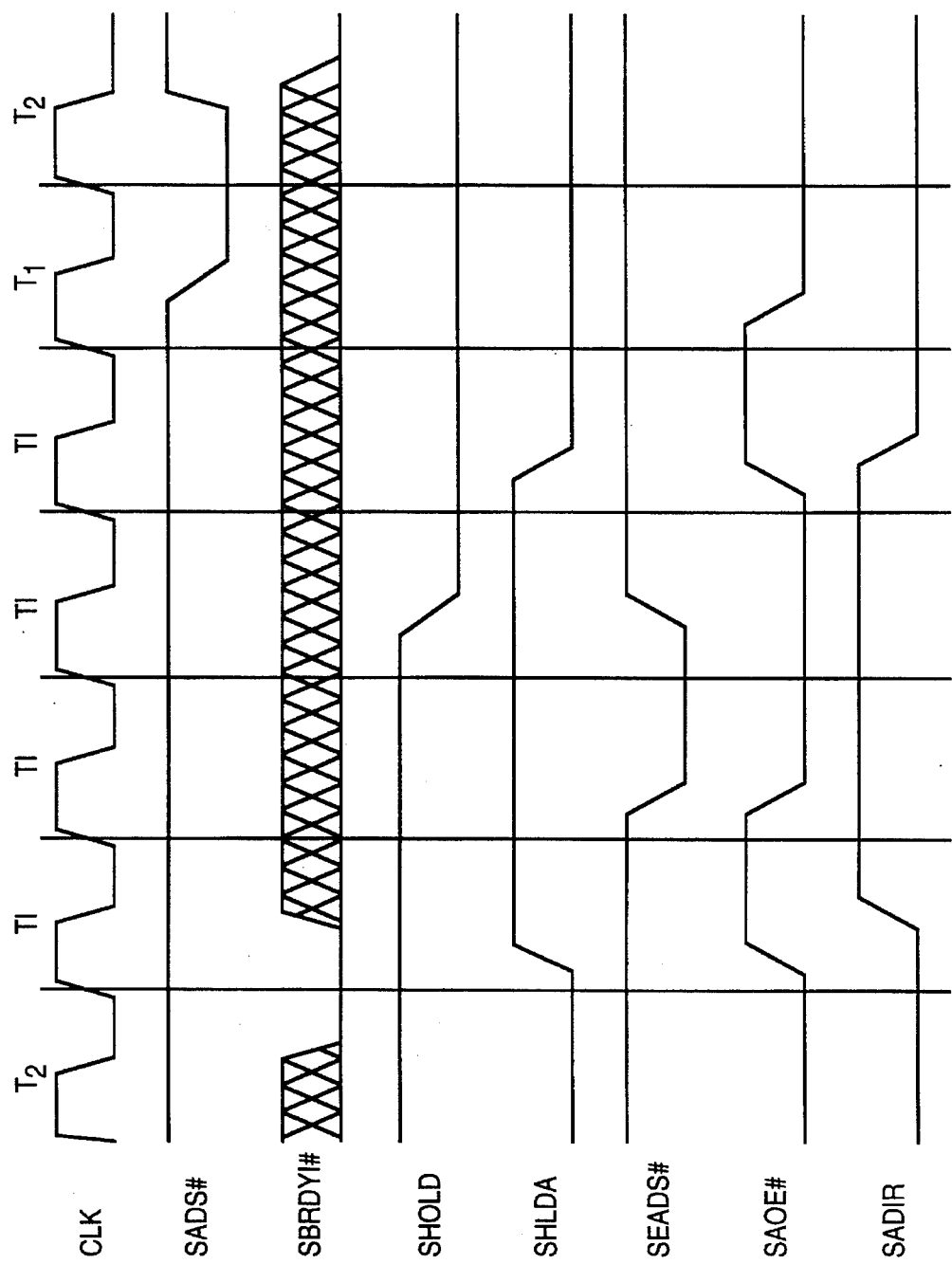
FIG. 49 is a set of waveforms showing control signals for the optional address transceivers.

Operation of the control signals for the optional address transceivers is shown in FIG. 49. These transceivers are turned around when the controller 70 either grants or receives the bus. This turning is transparent when the controller 70 grants the bus, as it occurs during the idle state that SHLDA is asserted, so systems need not wait to drive addresses when they sample SHLDA high.

Due to the one clock latency of turning the transceivers, an extra Ti state will occur when the controller 70 receives the bus. However, the system needs no redesign to account for this. Since this one-clock latency is guaranteed, the SHOLD request may be relinquished one clock early in order to avoid any system performance degradation.

FLUSH OPERATIONS

In 80486 systems, flush operations can be invoked in two ways, one software and one hardware.

The first method of generating flushes is by software execution of the 486 INVD and WBINVD instructions correspondingly. The 486 CPU correspondingly generates special cycles during these instructions, in addition to flushing its internal cache. The INVD produces the Flush cycle, while the WBINVD produces the Write-back cycle. The encodings for these cycles were previously shown.

Because the controller 70 utilizes a write-back architecture, its response to both Flush and Write-back cycles is identical. For both cycles, the controller 70 first copies all lines marked "dirty" back to memory. The duration required to execute the write-back cycles depends on the number of "dirty" lines to be copied back to main memory. The latency for controller 70 to complete this cycle will be much longer than that of the 486 CPU, due to these write-back cycles. Because of this latency, the controller 70 will recognize SHOLD requests during flush operations. SHLDA will be granted at the completion of the write-back cycle(s) corresponding to the tag entry currently being flushed. Next, the controller 70 will clear (flush) all directory valid bits, LRU bits, and dirty bits.

Note that system memory controllers will never explicitly see the Flush and Write-Back cycle encodings. These cycles are intended for external caches, and the controller 70 does not pass them on to the system.

The hardware method of generating a flush is through the activation of the FLUSH# input signal. The controller 70 FLUSH# pin should be connected directly to that of the 486 CPU.

Assertion of the FLUSH# pin is treated as if a Write-back cycles has been received, with the controller 70 writing back dirty data to memory. Since the HOLD/HLDA protocol is used before flush operations are commenced, the 486 CPU will not produce another bus cycle before this write-back is completed. Once the flush operation is completed, HOLD will be deasserted to the 486 CPU and normal operations will resume.

The latency of flush operations will be quite long, since all lines which are partially dirty must be written back to main memory. However, failure of some system devices may occur if the controller 70 requires use of the system bus for such lengthy intervals. Because of this, the controller 70 will acknowledge SHOLD with SHLDA during flush operations. If SHOLD is asserted to the controller 70 during a flush operation, SHLDA will be returned at the end of one or two write-back cycles for the tag entry which is currently being flushed. When SHOLD is released, the controller 70 will resume writing back dirty lines to main memory until completed.

WRITE-BACK CYCLES DUE TO FLUSH OPERATIONS

As discussed, write-back cycles to memory will be performed when either the FLUSH# pin is asserted or either of the FLUSH or Write-back special cycles occur. Flush operations are the second way that write-back cycles can be generated. As previously shown, normal read/write tag misses may also produce write-back cycles.

For each line of the data cache that contains valid dirty data, the entire line will be written to memory in a quad doubleword Operation. Since there are two lines associated with each tag entry, either zero, one or two quad writes will occur for each tag. If two writes occur for a tag (both lines contain valid and dirty data), the controller 70 will assert MWB at the end of the first write in order to inform the cache memory 72 that the second line for the tag must be written to memory as well.

Figure 50:
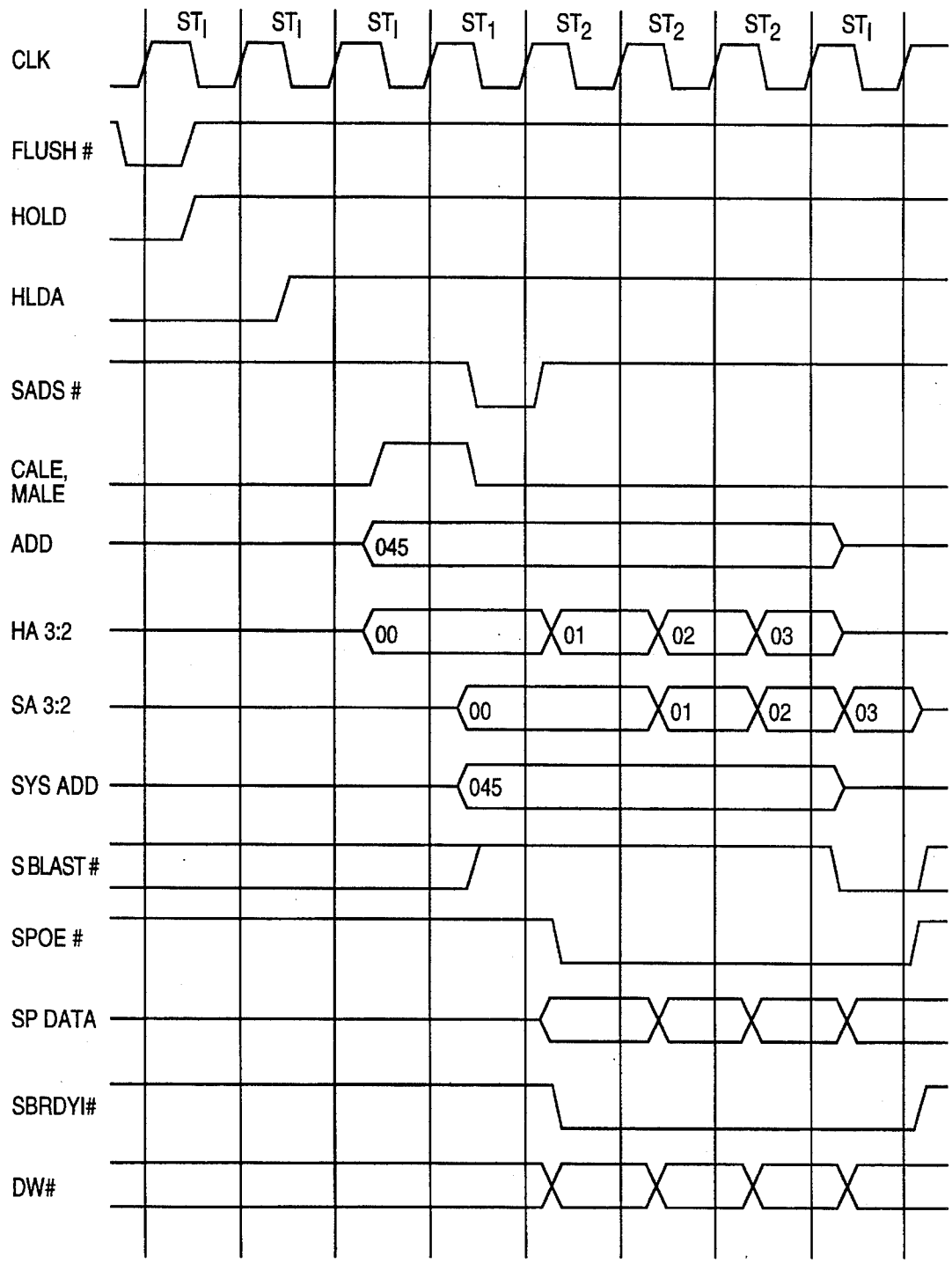
FIG. 50 is a set of waveforms showing control and data signals for a flush activation operation, followed by acquiring local bus and first write-back.

FIG. 50 details the beginning of a hardware flush operation due to assertion of the FLUSH# pin. The controller 70 responds by acquiring the bus from the 486 CPU and begins the process of writing back lines which contain valid dirty data to memory. Flush Write-back cycles are generally identical to write-backs due to read/write tag misses, described before. DW# will be asserted for each doubleword to indicate to the system if the doubleword is dirty or not. System logic should use DW# as described in the Read Miss section, in both write enable logic and to hasten assertion of SRDYI#/SBRDYI# for non-dirty dummy writes.

The controller 70 must be granted the local processor bus, in order to perform the flush operations. To acquire the 486 CPU local bus, the controller 70 will use the HOLD/HLDA protocol for either hardware or software flush operations. If the FLUSH# pin is asserted (hardware flush), the controller 70 will immediately assert HOLD to the CPU. When HLDA is returned by the CPU, the controller 70 will begin the flush operation, by using the local CPU bus to drive out flush addresses (addresses of lines which contain dirty data) and asserting CALE to latch these addresses within the cache memory 72.

Although the concept is the same, software-generated flush operations signalled by the Flush and Write-back cycles will begin slightly differently. As these operations are signalled by 486 CPU bus cycles, the controller 70 will assert HOLD to the CPU, followed by RDYO#. As the CPU recognizes HOLD on bus cycle boundaries, HLDA will be driven at the end of the 486 CPU Flush or Write-back cycle. Having obtained the bus, the controller 70 begins driving out flush addresses and CALE as previously described.

SNOOP OPERATIONS

The system memory controller must accommodate the controller 70 when snoop operations occur on the system bus due to another bus master, whether by DMA or another CPU. The controller 70 supports snoops through the SEADS# pin, which is functionally equivalent to the 486 CPU EADS# pin. In addition, the controller 70 has three new pins not present on the 486 CPU to allow snoop operations to correctly occur: SNPBUSY, SMEMWR#, and SMEMDIS.

As the controller 70 has no SAHOLD (System Address Hold) pin, the controller 70 system bus must be tri-stated through the SHOLD/SHLDA protocol before the snoop can occur. However, this is not a limitation for single-CPU processing, as the SHOLD/SHLDA method is the simplest and preferred method of allowing DMA to occur.

As SEADS# is asserted, the controller 70 will sample SMEMWR# to determine if a snoop read or write is occurring. In either case, the SNPBUSY output toggles high in acknowledgement.

SNOOP WRITES

The combination of SEADS# low and SMEMWR# high informs the controller 70 that a snoop write is in progress on the system bus. Snoop writes will trigger two responses by the controller 70.

First, the controller 70 will obtain the local CPU address bus through assertion of either AHOLD and/or BOFF#. This will allow the controller 70 to drive an invalidation cycle to the i486 CPU at the snoop write address. EADS# will be asserted to the CPU to trigger this invalidate internally in the CPU.

Second, SNPBUSY will be asserted high to acknowledge the snoop operation. The controller 70 will check its internal array to determine if the snoop write is a hit or a miss. If the address is present and valid in the cache (a hit), the controller 70 will write the data for the snoop write directly into the cache memory 72 RAM array section 100.

This will occur if the snoop write is a byte, word (2-byte) or doubleword write, and regardless of whether the data is marked as dirty or clean. This write appears as a local bus operation. No change in the tag array dirty or valid bits will occur. There is no output of the tag lookup to inform the system if a hit or miss has occurred for a given snoop write.

On a snoop write, the system may process the write normally. There are two requirements that must be met in order for the controller 70 to correctly process the snoop write:

1. Since a snoop write hit will be updated into the cache data array, the system must supply valid data and byte enables on the controller 70's system wide for all snoop writes. This data and byte enables should be driven valid along with the system address SA<27:2>, SMEMWR#, and SEADS# pins.
2. As previously stated, SNPBUSY toggles high in response to a snoop operation. SNPBUSY will remain high for some number of clocks, while the snoop operation is continuing. The falling edge of SNPBUSY indicates to the system that the controller 70 has completed its internal lookup and is prepared to terminate the snoop write operation.

The system must return SRDYI# or SBRDYI# after SNPBUSY has fallen, in order to terminate the snoop write operation. Since the external system cannot determine if a hit or miss has occurred, SRDYI# or SBRDYI# must be returned for all snoop write operations. If the snoop write has not completed on the system bus when the falling edge of SNPBUSY occurs, the system is free to withhold SRDYI# or SBRDY# from the controller 70 and add wait states to the operation. SRDYI# and SBRDYI# are not sampled by the controller 70 during the snoop write operation before SNPBUSY has fallen. As a result, the system is free to hold SRDYI# or SBRDYI# low while SNPBUSY is high, in anticipation of terminating the cycle as quickly as possible upon the falling edge of SNPBUSY.

SNOOP READS

Figure 51:
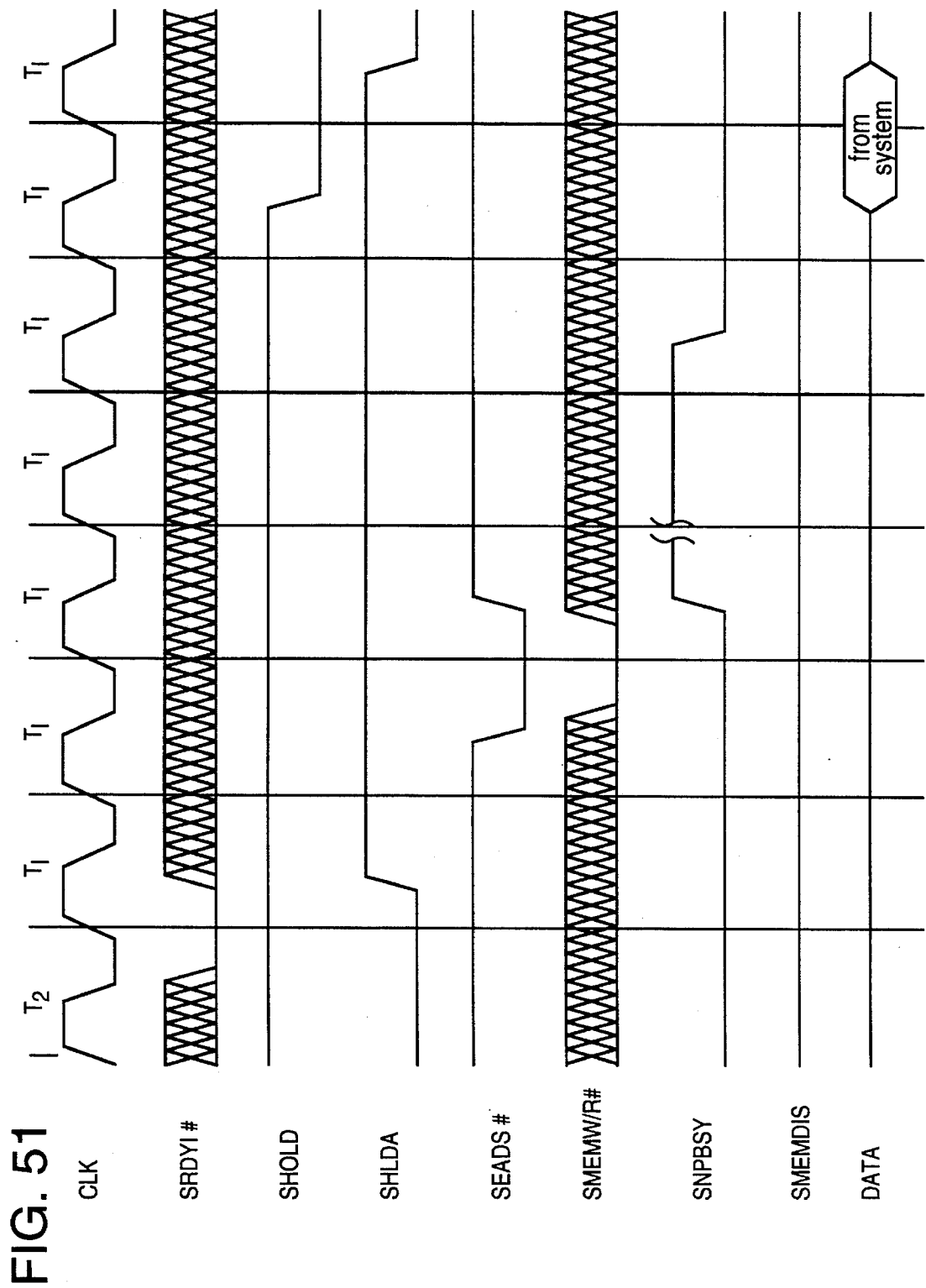
FIG. 51 is a set of waveforms showing control and data signals for a snoop read miss operation.

The controller 70 detects snoop reads through the combination of SEADS# low and SMEMWR# low. When this happens, SNPBUSY toggles and stays high for a varying number of clocks while the tag lookup occurs. While this tag lookup is in progress, the system memory controller should delay the cycle until one or two cases occurs:

1. The requested data is not contained in the cache data array (a snoop read miss), and the system memory must supply the data. This result is indicated by SNPBUSY going low while SMEMDIS has remained low. On the clock that SNPBUSY is sampled low, the system memory controller may determine that it needs to supply the requested data. From the clock in which SEADS# is asserted to the controller 70, latency of performing the snoop read operation will be two clocks for the snoop miss case. A snoop read miss is shown in FIG. 51.
2. The requested data is contained in the cache RAM array and is 'dirty' (a snoop read hit), resulting in the need to supply the requested data to the system bus. SMEMDIS (System MEMory DISable) is the resulting output which will be asserted in this case. A snoop read hit will be indicated to the system by the activation of SMEMDIS (high), while SNPBUSY is still high.

The clock after SMEMDIS is activated, SNPBUSY will be de-asserted and the cache memory 72 enabled by assertion of SP OE# to drive the requested data onto the system bus. The snoop address will be passed to the cache memory 72 via the local CPU bus.

To acquire the 486 CPU local bus from the CPU, the controller 70 asserts AHOLD followed by assertion of the BOFF# output. BOFF# will be released two clocks after the snoop operation has terminated. Any local 486 CPU bus cycle that is aborted in this manner will be restarted by the CPU, anther BOFF# is released. The controller 70 generated the snoop address and asserts both CALE and MALE in T1, latching this address inside the cache memory 72 miss address register 110.

Figure 52:
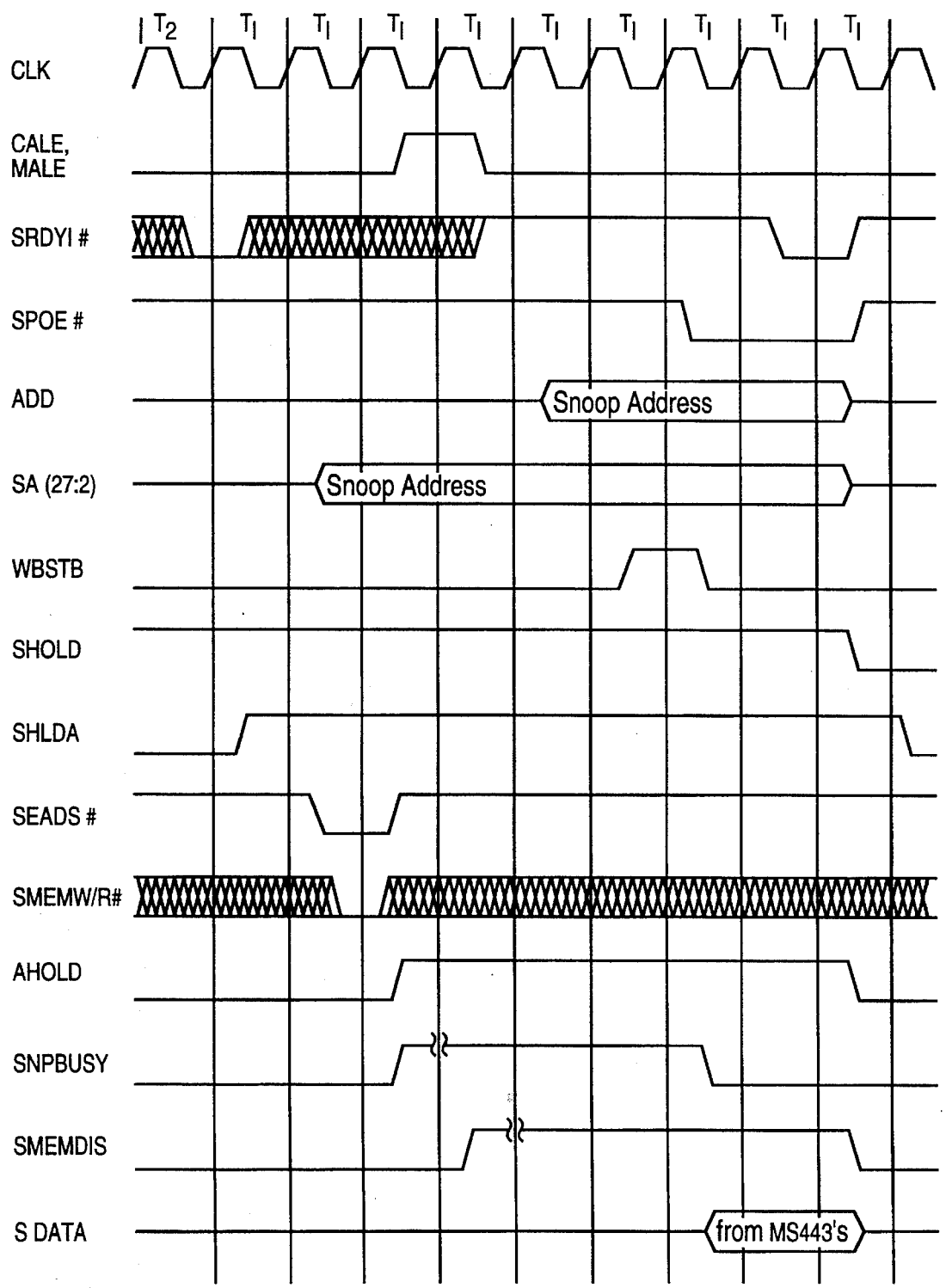
FIG. 52 is a set of waveforms showing control and data signals for a snoop read hit operation.

The cache memory 72 will continue to be driven until the system asserts SRDYI# to the controller 70. SRYDI# is sampled beginning in the clock in which SMEMDIS is activated. SRDYI# being asserted incorrectly in this clock will cause the controller 70 snoop cycle to terminate, even though no snoop data has yet been driven onto the bus. A snoop read hit operation is shown in FIG. 52.

The maximum frequency allowable for snoop writes and reads is different. Due to the basic architecture of the 486 CPU and isolation of the system bus from the local CPU bus, snoops can never be performed on consecutive clocks.

Snoops to the controller 70 may be performed as fast as every third clock if the snoops are consecutive snoop writes, or a snoop write followed a snoop read. A snoop write take three clocks to be processed internally by the controller 70. Three clocks after a snoop write, another snoop of either type may be performed. In addition to performing an internal lookup and possible invalidation, the controller 70 will pass the snoop address and EADS# on to the 486 CPU. From the clock that SEADS# is asserted, there is a latency of three clocks to pass the address and EADS# to the 486 CPU for either the hit or miss case.

Because of the latency of accessing the data in the cache memory 72's snoop reads are necessarily slower than the snoop writes. After a snoop read occurs, the system should not assert another snoop read until SRDYI# is asserted, terminating the present snoop. It is allowable to begin another snoop read in the same clock that SRDYI# is returned.

PARITY

The controller 70 architecture supports the parity function of the i486 CPU. The bytes in the cache memory 72 data array have x9 structure, in order to support parity.

HOST PORT PARITY

Since the i486 CPU generates even parity on write cycles, the cache memory 72 store the parity bit(s) that is driven as the CPU write occurs. When a CPU read hit occurs, the parity bit(s) will be returned to the CPU, along with the requested data.

CACHE MEMORY 72 SYSTEM PORT PARITY

As on the host port 113, the cache memory 72 have no parity generation logic on the system port. For cycles in which data is read into the cache data array from the system port side, it is the responsibility of the system to supply proper parity bits. This applies for both normal read cycles and snoop write cycles.

For normal read operations on the system port, it is sufficient for the system to provide storage for the parity bits, and return them on read cycles. This is allowable, since even parity will be driven from the cache memory 72 write cycles to the system port, whether induced by write-backs or CPU writes which are passed on to the system.

Since data is written into the burst-RAM data arrays during write hits, the system should provide even parity on the data pins during snoop write operations.

CONTROLLER 70 HOST POST PARITY

In addition, the controller 70 supports parity for the accesses that occur to its control registers. Unlike the cache memory 72, however, the cache memory 72 dynamically generates its parity bit during read cycles from these registers. This generation is necessary since the control register contents may change without any explicit write cycles from the CPU. As an example, the CPU may set the Expansion Register INV bit in order to flush the cache. At completion of the flush, the controller 70 will clear this bit in order to resume normal operation.

Referring back to FIG. 32, the sequencing states of concurrent bus control unit 206 of cache controller 70 are next considered. The sequencing states will be described with reference to FIGS. 53–56.

Figure 53:
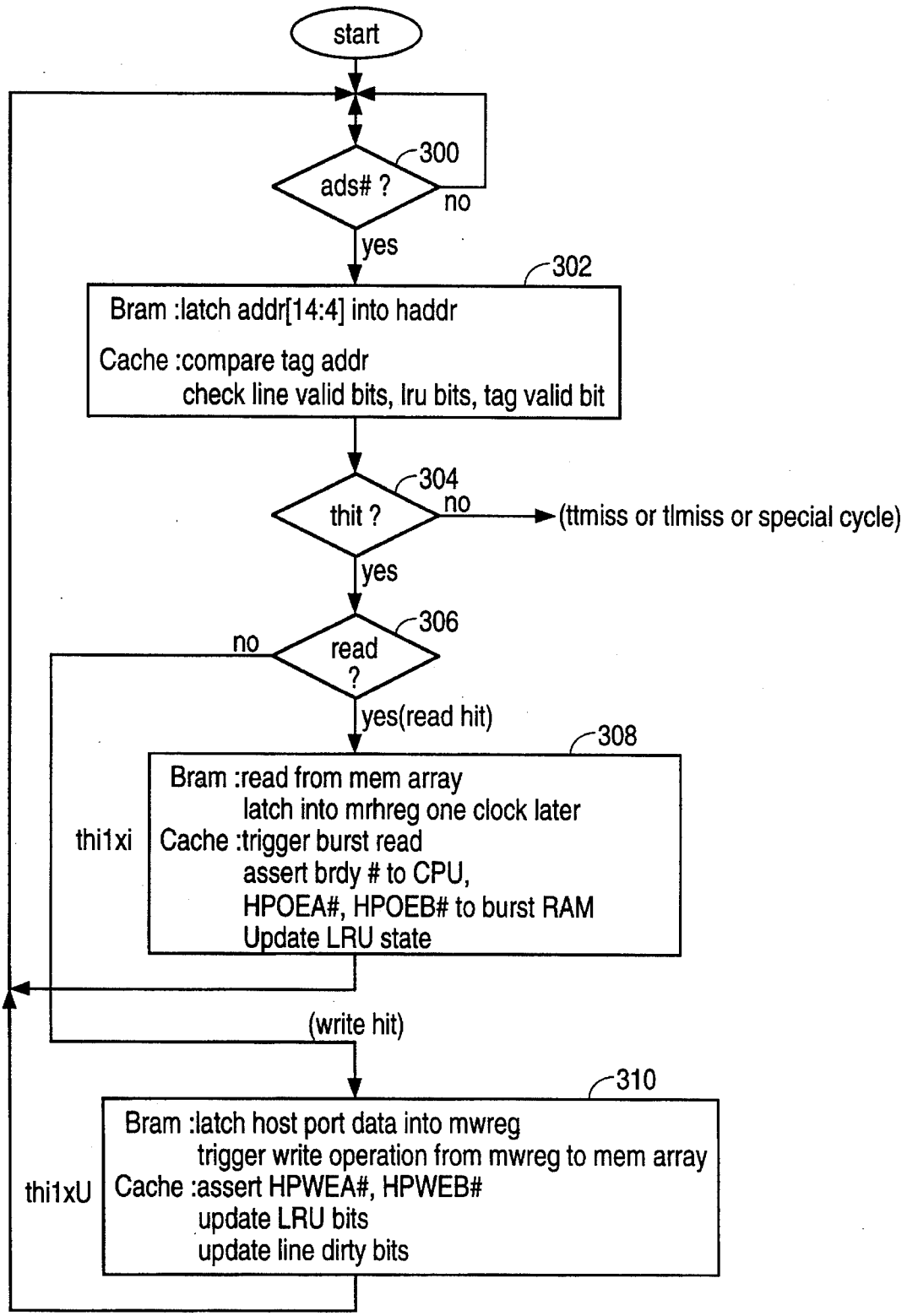
FIG. 53 is a state diagram illustrating the initial sequencing of the concurrent bus control unit of cache controller 70.

Referring first to FIG. 53, the sequencing of the concurrent bus control unit 206 begins when the ADS# signal is received by cache controller 70 (step 300). When the ADS# signal is received, state 302 is entered. At state 302, ADDR<14:4> is latched into the hit address register 109 of cache memory 72. The tag address is compared with the received address, and the line valid bits are checked. It is noted that the address array information ADD ARY indicates the address information stored within controller 70. Furthermore, the attribute array ATT ARY stores line valid, tag valid and dirty bit information, and the IRU ARY array stores bank select information.

If the received address information is a hit read operation as determined by steps 304 and 306, the concurrent bus control unit 206 enters state 308. At state 308, the data from memory array 100 corresponding to the hit address is latched into memory read hold register set 114 one clock later. In addition, controller 70 triggers a burst read operation by asserting BRDY# to the CPU HPOEA#, HPOEB# to the burst-RAM to trigger a read operation from the memory array. Following state 308, the sequencing of concurrent bus control unit 206 returns to its start state, and is available for additional hit operations. LRU array inside cache controller will be updated at the end of state 308.

If the operation is determined to be a write hit operation at steps 304 and 306, the sequencing enters state 310. At state 310, the data at host port 113 is latched into memory write register 120, and a write operation is triggered from memory write register 120 to the RAM array 100. In addition, the controller asserts the signals HW0# and HW1# and the line dirty bits are updated. LRU array data will be updated at state 310. The write in BRAM cache memory 72 is self-timed. Write actions inside cache memory 72 will not start until the next clock after RDY is returned to CPU.

Figure 54A:
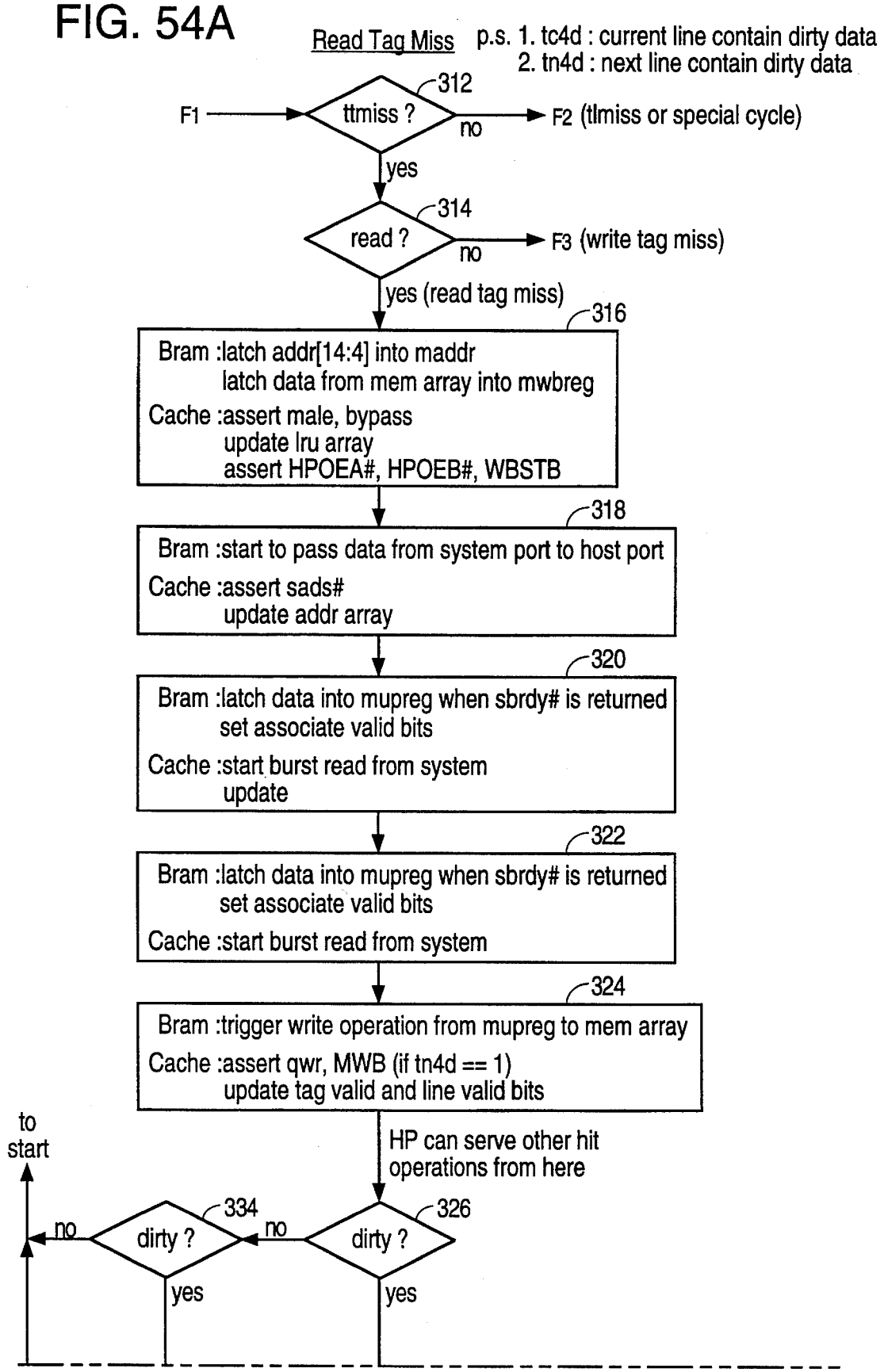

If the operation is determined to be a miss operation by step 304, the sequencing goes to step 312 as shown in FIGS. 54A and 54B. If the operation is a read miss operation as determined by steps 312 and 314, state 316 is entered. At state 316, signal ADDR<14:4> is latched into miss address register 110. In addition the corresponding data from memory array 100 is latched into memory write back register set 118. The controller 70 asserts signals MALE, HPOEA#, HPOEB#, WBSTB, and updates the LRU array. State 318 is thereafter entered. The cache controller 70 asserts signal SADS# and updates the ADDR array, and the signal bypass is asserted by controller 70 and data is thereby caused to pass from the system port 112 to the host port 113. Following state 318, the data is latched into memory update register set 116 when signal SBRDY# is returned, during bus state 320. In addition, the associated valid bits are set. The controller 70 begins the burst read from the system and resets all tag and line valid bits. In addition, controller 70 reads and stores all dirty bits of the replaced line. State 322 is next entered and the subsequent data of the read miss burst sequencing is latched into memory update register set 116, when signal SBRDY# is returned, and the associated valid bits are set. In addition, controller 70 starts the burst read from the system. At state 324, a write operation from memory update register set 116 to memory array 100 is triggered. The controller 70 asserts signals QWR, MWB if the stored dirty bit indicates that the next line of the current replaced block contains dirty data, (if TN4D=1), and the tag valid and line valid bits are updated for the fetched line.

At step 326, it is determined whether the current line contains dirty data. If the current line contains dirty data, state 328 is entered wherein the contents of memory write back register set 118 are dumped to the system port 112. The controller 70 asserts signal SADS#, SPOE# (first replacement). Step 328 is bypassed if the current replaced line contains no dirty data. At step 330 the next line is checked to determine whether it contains dirty data. If the next line contains dirty data, state 332 is entered and the data is latched from memory array 100 into memory write back register 118 after the miss address pointer is bumped by prior MWB assertion through controller 70. In addition, the data in memory write back register set 118 is provided to system port 112. Controller 70 furthermore asserts signals SADS#, SPOE#, MWB (second replacement).

It is apparent from FIGS. 54A and 54B that if either the current line or the next line do not contain dirty data, one or both of states 328 and 332 will be bypassed. Following these states, the sequencing is ready to receive further ADS# signals. However, other hit operations can start processing concurrently after state 324.

Figure 55A:
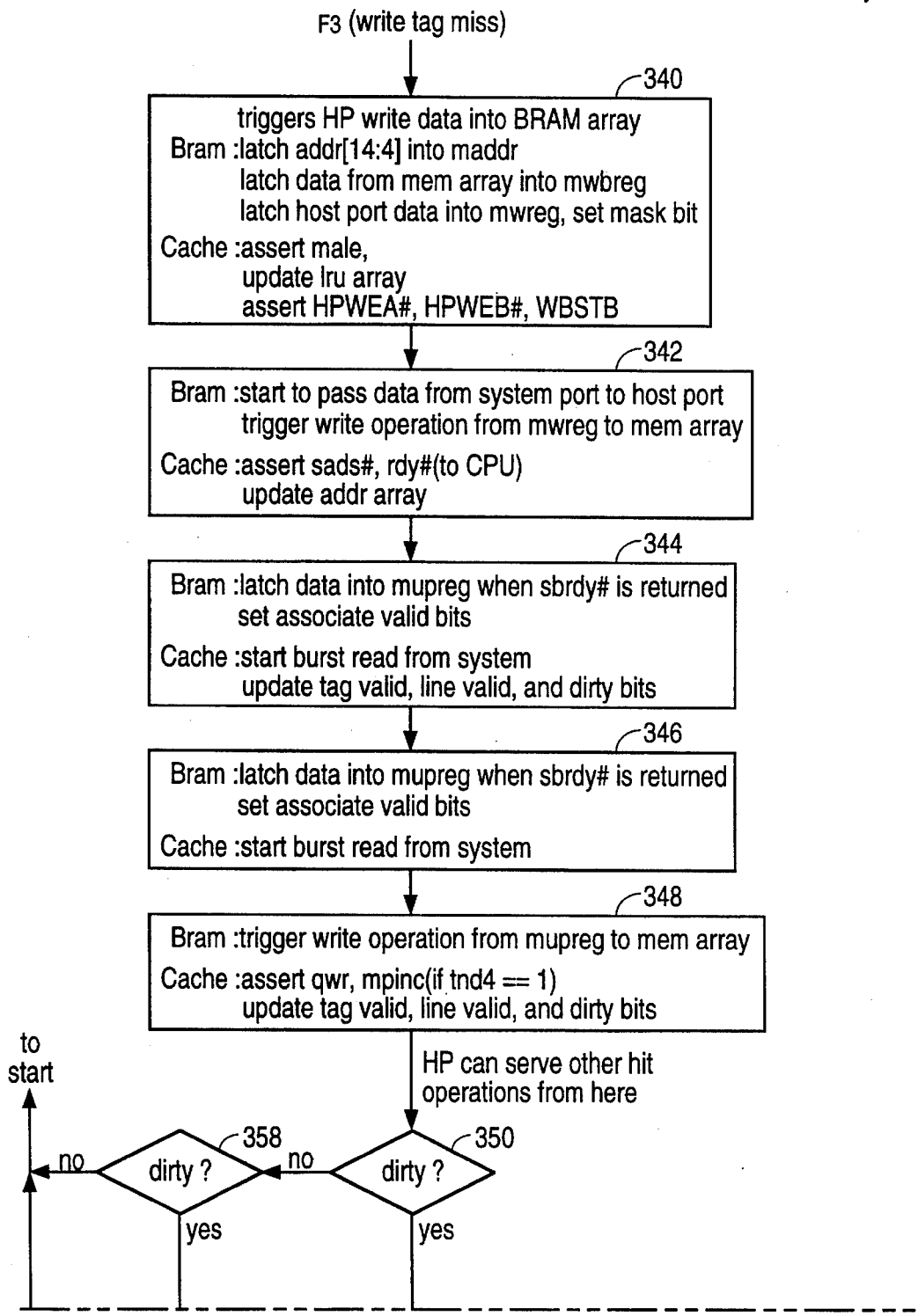
Figure 56:
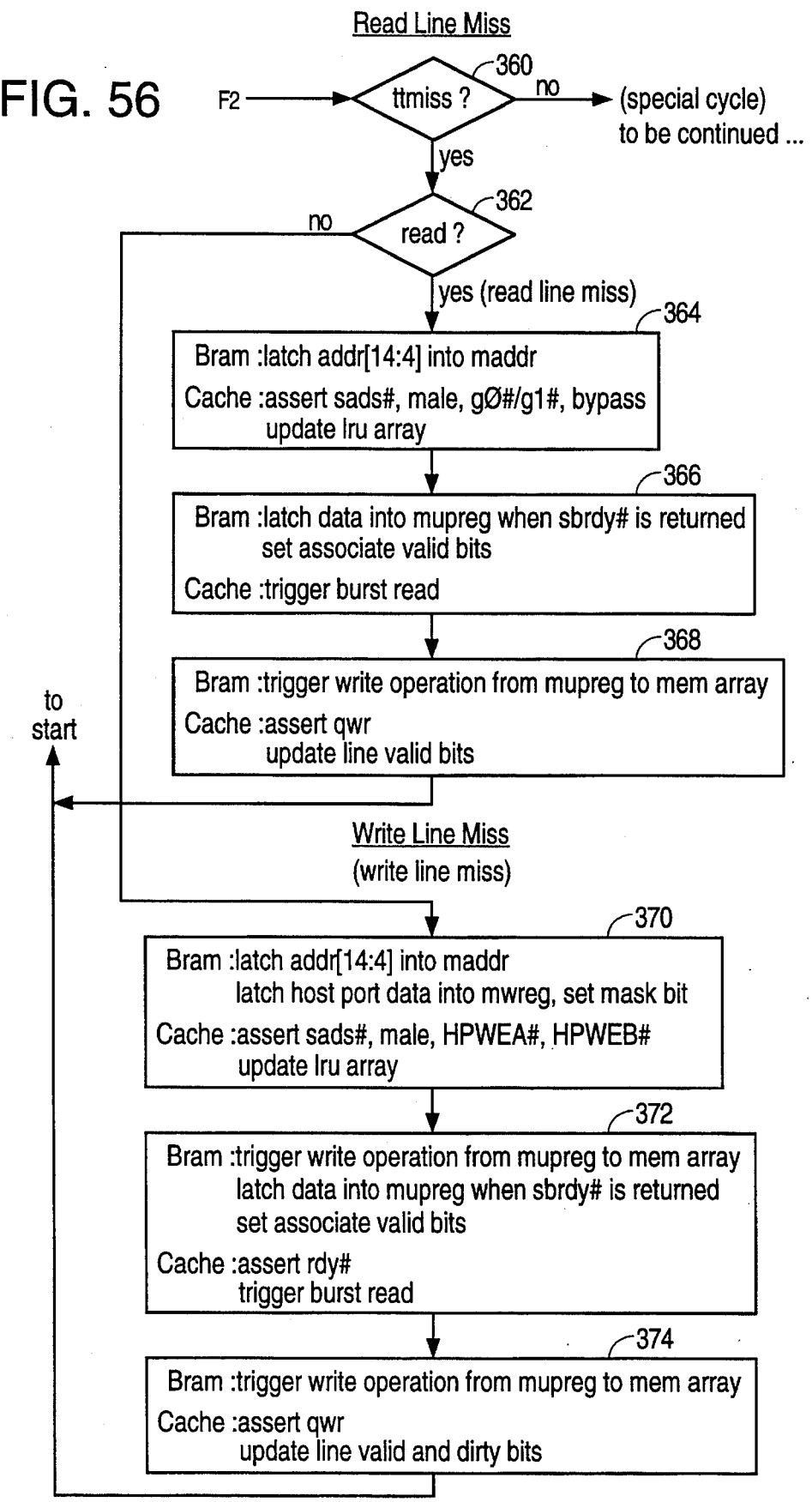
FIG. 56 is a state diagram illustrating sequencing during a read line miss and write line miss operation.

If a write tag miss is determined at step 314, state 340 is entered as shown in FIGS. 55A and 55B. At state 340, ADDR<14:4> is latched into miss address register 110. In addition, the corresponding data in RAM array 100 is latched into memory write back register set 118, and the data at the host port 113 is latched into memory write register 120. Controller 70 asserts signals MALE, HPWEA#, HPWEB#, and WBSTB. The LRU array is furthermore updated. The corresponding mask bit is set during the next clock after state 340 and the host port data is written into the burst-RAM array section 100. State 342 is thereafter entered wherein the data is started to pass from the system port 112 to the host port 113. A write operation from memory write register 120 to RAM array 100 is furthermore triggered. Furthermore, the corresponding mask bit is set. Controller 70 asserts signals SADS#, RDY#, and the address array is updated. At state 344, data is latched into memory update register set 116 when signal SBRDY# is returned, and the associated valid bits are set. Controller 70 starts a burst read from the system, and the tag valid and line valid bits are reset. Dirty bits of the replaced line are read and stored. Next, at state 346, the succeeding data of the burst quad fetch read is latched into memory update register set 116 when signal SBRDY# is returned, and the associated valid bits are set. Controller 70 furthermore starts a burst read from the system. Finally, at state 348, a write operation from memory update register set 116 to RAM array 100 is triggered, and controller 70 asserts signals QWR and MWB if the stored dirty bit indicates that the next line of the current replacing block contains dirty data (if TN4D=1). Furthermore, the tag valid, line valid, and dirty bits are updated for the fetched line.

If the current line is determined to contain dirty data at step 350, state 352 is entered. The data in memory write back register set 118 is provided to system port 112, and the controller asserts signals SADS# and SPOE# (first replacement). Similarly, if the next line is determined to contain dirty data at step 354, state 356 is entered wherein the data from RAM array 100 is latched into memory write back register set 118. Furthermore, the data in memory write back register set 118 is provided to the system port 112. Controller 70 asserts SADS#, SPOE# (second replacement). Subsequent operations may thereafter occur since the sequencing returns to step 300. However, other hit operations can start processing concurrently after state 348.

If a line miss operation is determined at step 312, steps 360 and 362 (FIG. 56) determine whether either a read line miss or a write line miss has occurred. If a read line miss has occurred, the sequencing enters state 364. At state 364, signal ADDR<14:4> is latched into memory address register 120. Controller 70 asserts signals SADS#, MALE, HPOEA#, HPOEB# and BYPASS. Furthermore, the LRU array is updated. State 366 is thereafter entered wherein the data is latched into memory update register set 116 when signal SBRDY# is returned. Furthermore the associated valid bits are set. Controller 70 accordingly triggers a burst read operation. At state 368, a write operation from memory update register set 116 to RAM array 100 is triggered, and cache controller 70 asserts signal QWR. The line valid bits are furthermore updated.

On the other hand, if a write line miss occurs, state 370 is entered. Signal ADDR<14:4> is latched into miss address register 110. In addition, the host port data is latched into memory write register 120 and the associated mask bit is set. Controller 70 furthermore asserts signals SADS#, MALE, and HPWEA#, HPWEB#. The LRU array is furthermore updated. State 372 is thereafter entered wherein a write operation from memory write register 120 to RAM array 100 is triggered, mask bit is set for advanced writes, and the data is latched into memory update register set 116 when signal SBRDY# is returned. In addition, the associated valid bits are set. Controller 70 asserts signal RDY# and a burst read is triggered. Finally, at state 374, a write operation from memory update register set 116 to RAM array 100 is triggered, and controller 70 asserts signal QWR. The line valid and dirty bits are furthermore updated.

Figure 57:
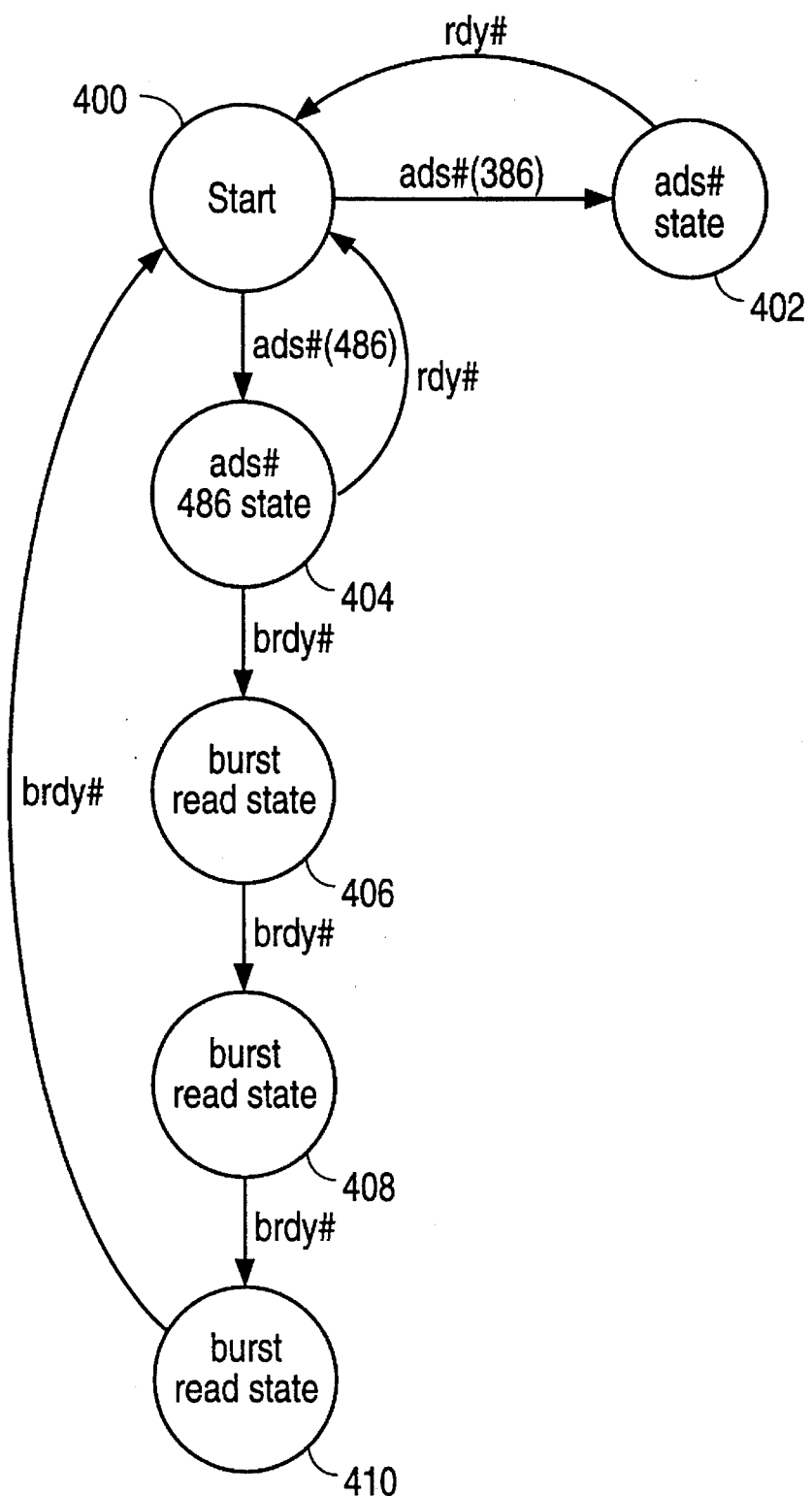
FIG. 57 is a diagram showing the state machines within bus controller 200.

Bus controller 200 of cache controller 70 as shown in FIG. 32 is next considered with reference to FIG. 57. Bus controller 200 controls CPU 60 in accordance with the state machines 400 through 410 as depicted in FIG. 57. The initial state 400 is entered when no operations between the CPU 60 and cache memory 72 occur.

For a 386 based system, if signal ADS# is asserted, the state machine of bus controller 200 enters state 402. Following the sequencing as described above within the concurrent bus control unit 206, the signal RDY# is asserted and the state machine of bus controller 200 returns to its initial state 400.

For a 486 based system, for a write operation, when signal ADS# is asserted, the state machine of bus controller 200 enters state 404. Upon processing of the 404 state by concurrent bus control unit 206, signal RDY# is asserted and the state machine returns to state 400.

In the case of a burst read operation, after state 404 has been processed, signal BRDY# is asserted and the state machine of bus controller 200 enters state 406. The appropriate processing by concurrent bus control unit 206 thereby is initiated and bus states 408 and 410 are sequentially entered. Following execution of machine state 410, the state machine returns to state 400.

Figure 58:
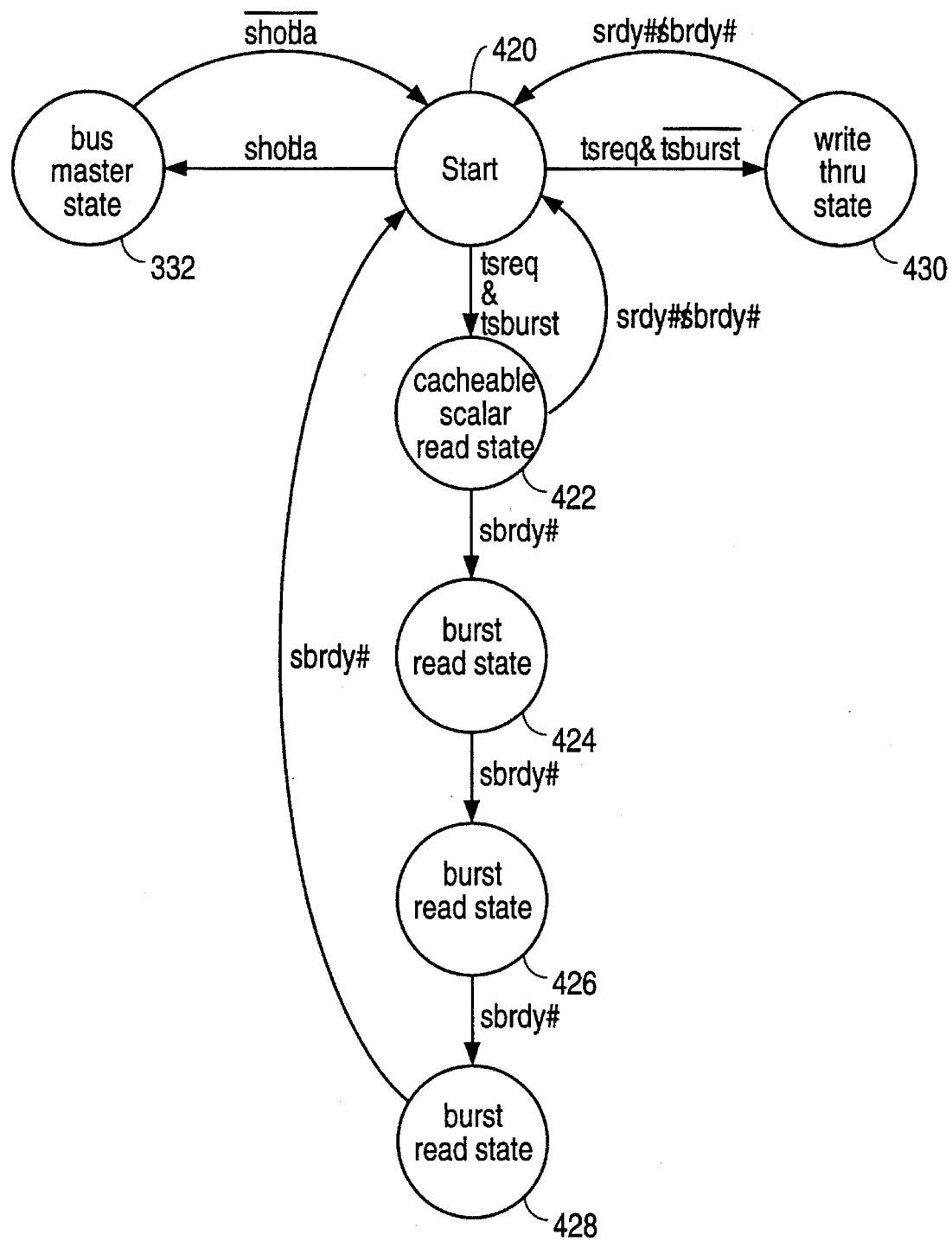
FIG. 58 is a diagram showing the state machines within bus controller 202.

Referring next to FIG. 58, the state machines of controller 202 (FIG. 32) are next described. The initial state is state 420. An operation in write through mode causes the state machine to go to state 430. This state change is initiated by signal TSREQ and the deassertion of signal TSBURST. Upon completion of state 430, signals SRDY#/SBRDY# are asserted. The state machine accordingly resets to state 420.

For signal TSREQ and TSBURST assertions state 422 is entered. The state machine is returned to state 420 upon assertion of SRDY# or SBRDY# for noncacheable or scalar reads. For a burst read operation, signal SBRDY# is asserted when the state machine is at state 422. Subsequent assertion of SBRDY# causes the states to change from state 422 to state 428. Upon completion of the burst read, the state machine returns to its initial state 420.

State 432 is entered if external bus master wishes to own the system bus. System bus ownership is granted upon entering into state 432 and signal SHOLDA is asserted. Once signal SHOLD is deasserted, state machines state 202 returned to initial state 420.

From the above description, it should be noted that the burst RAM cache memory chip in accordance with the invention may also support cache systems with line sizes larger than four doublewords. During a replacement cycle, activation of an external signal by cache control logic causes an internal counter to access neighboring lines of data so that lines of eight or 16 doublewords can be saved for burst write-back operations transparent to system memory 38. This activity does not prevent the read miss data from being fetched first, eliminating what would be a large replacement time penalty.

It is also noted that port 113 interfaces with the Intel 386 or 486 processor in a manner similar to conventional SRAMs. If data parity is not checked as in most 386 systems, HP<8> and SP<8> can be left disconnected.

By decoupling the host and system data buses 112 and 113, processor cache accesses and system memory accesses can proceed simultaneously. Decoupling on a write-back cache allows write misses to be handled with zero wait states since read and write cache hits can proceed in parallel with the write miss data fetching. Moreover, when combined with the procedure implemented by each burst RAM memory chip for saving write-back data during read or write misses, the dual-port architecture allows write-back line replacement cycles to be completely hidden from the processor.

When used in sets of four, the burst RAM memory chips allow internal data transfers of four doublewords (128 bits) on reads or writes, achieving a true 128-bit quadword transfer in only one clock. When doing memory burst operations, the internal structure of the burst RAM memory chip behaves similar to a static column RAM in that the input buffer and word line delays occur only on the first access to the first subarray. Subsequent accesses in the burst are supplied by successive subarrays which are pre-addressed. This structure allows full speed burst accesses without the use of 10 nsec SRAMs.

The architecture of burst RAM cache memory 72 eliminates the historical disadvantage of write-back caches: having to do a replace cycle before doing the data fetch. With burst RAM cache memory 72, the replace data is saved within a set of latches of the burst RAM memory chips (memory write back registers 118A–118D) as soon as a miss is detected and thus allows the fetch to begin immediately. Only after the fetch is complete does a replacement cycle begin, and during that time, the host processor 60 can resume accessing the cache RAM array 100 through the host port 113. As an example, in a system with a two wait state memory and non-burst fetches, the use of burst RAM cache memory 72 allows the 386 to be operating at full speed after a read miss in just 5 clocks. Using standard SRAMs, the same system would take 48 clocks (32 clocks for two lines on a tag miss plus 16 clocks for the new data).

Decoupled buses also avoids the necessity to redesign the system memory subsystem every time the processor module is upgraded. In fact, the processor data bus and the system data bus can run at different speeds. Since the processor will work out of its cache subsystem more than 95% of the time, the system memory need not be redesigned to run at the same speed as the processor. This is especially true if the system uses a burst memory controller so that the cache memories can support burst operation to and from system memory. The main memory system might then operate at a reasonably easy to design speed of 20 MHz, while the processor module (processor, cache controller, and cache memories) operates at 25, 33, or even 40 MHz. Upgrading the processor from an 80386 to an 80486 would involve only minor design changes to main memory.

Also noted above, both of the 9-bit (eight bits plus parity) data ports 112 and 113 of each burst RAM memory chip support "demand word first" wrapped around quadword operations as well as scalar reads and writes. The system port 112 supports burst operations to and from system memory 38 if the system memory controller also supports burst.

The dual-port architecture of the burst RAM cache memory chip permits processor and main memory accesses to occur in parallel, while hiding write-back cycles from the processor, contributing to a substantial performance increase over alternative implementations. The burst RAM cache memory chip fully supports an 80386 using a write-back cache, including support for non-cacheable accesses and multiple replacement cycles for lines longer than 16 bytes.

The cache memory 72 also supports quadword data fetch and, though not common in 386 systems, burst operation with main memory. If the cache and system memory controllers support burst operation, cache memory 72 will also support burst reads and writes to system memory 38. In an 80386 system which is designed for future upgrade to an 80486, the main memory subsystem may use Intel's strongly suggested 64-bit, bank interleaved main memory organization. This memory organization is accessed using the non-sequential burst order used by the 486. Cache memory 72 directly supports that burst order to and from main memory, as well as the sequential burst order used with the smaller, less expensive, and standardized 32-bit sequential memory organization.

If the system memory uses the design-intensive 64-bit, bank interleaved architecture recommended by Intel instead of the standard, 32-bit sequential architecture, then the system port 112 uses the 486 burst sequence to system memory 38 instead of sequential order. Burst RAM cache memory 72 supports both sequential and 486 burst ordering. In either case, the fetch data from main memory is brought in "demand word first" such that the first doubleword passes directly to the 386 through each corresponding bypass path 119 of cache memory 72. The 386 can then resume execution while the remainder of the burst data is brought in and stored in the RAM array 100.

Numerous modifications and variations will become apparent to those skilled in the art once the above disclosure is fully appreciated. It is to be understood that the above detailed description of the preferred embodiment is intended to be merely illustrative of the spirit and scope of the invention and should not be taken in a limiting sense. The scope of the claimed invention is better defined with reference to the following claims.

I claim:

1. A cache memory apparatus comprising:

a random access memory;

a host port;

a system port;

a memory write register for buffering first data received from said host port and selectively providing the first data to one of said random access memory, said system port, and said random access memory and said system port, said memory write register being coupled between said host port and said random access memory and between said host port and said system port; and a write back register for holding second data received from said random access memory and selectively providing the second data to said system port, said write back register being coupled between said random access memory and said system port;

wherein the buffering and selective providing of the first data to said random access memory and the holding and selective providing of the second data to said system port allows memory accesses at said host port to be decoupled from memory accesses at said system port.

2. The cache memory apparatus as recited in claim 1 further comprising a read hold register coupled between said random access memory and said host port for buffering and providing burst read data from said random access memory to said host port.

3. The cache memory apparatus as recited in claim 1 further comprising a bypass path coupled between said host port and said system port for directly allowing passage of data between said host port and said system port.

4. The cache memory apparatus as recited in claim 1 wherein said random access memory includes storage for a plurality of parity bits.

5. The cache memory apparatus as recited in claim 1 wherein said random access memory is organized in a plurality of lines wherein each of said lines comprises a plurality of word storage locations, and wherein each of said word storage locations is selectively writable.

6. The cache memory apparatus as recited in claim 1 wherein said random access memory is written using a read-modify-write operation.

7. The cache memory apparatus as recited in claim 1 wherein said random access memory is single ported.

8. The cache memory apparatus as recited in claim 7 wherein said random access memory is accessed with a wider bandwidth than said host port and said system port.

9. An apparatus as in claim 1, further comprising a memory update register for holding fetched data and providing the fetched data to said random access memory, said memory update register being coupled between said random access memory and said system port, wherein the holding and selective providing of the second data and the holding of the fetched data allows write back and fetch operations at said system port to be decoupled from said random access memory.

10. The cache memory apparatus as recited in claim 9 further comprising means for identifying ones of the fetched data held in said memory update register as not corresponding to ones of the second data held in said write back register for write back to said system port, said identifying means being selective for the ones of the fetched data to be provided from said memory update register to said random access memory.

11. The cache memory apparatus as recited in claim 9 wherein said memory update register can store a plurality of words of the fetched data.

12. The cache memory apparatus as recited in claim 11 further comprising means for masking the providing of selected ones of said words of the fetched data to said random access memory.

13. A cache memory apparatus comprising:
   a random access memory;
   a host port;
   a system port;
   a memory write register coupled to said random access memory, to said host port, and to said system port for buffering and selectively providing input data received from said host port to one of said random access memory, said system port, and said random access memory and said system port; and
   a write back register coupled to said system port and to said random access memory for holding output data received from said random access memory and selectively providing said output data to said system port;
   wherein the input data is provided to said random access memory from said memory write register at the same time that the output data is provided by said write back register to said system port, the buffering and selective providing of the input data to said random access memory and the holding and selective providing of the output data to said system port allowing memory accesses at said host port to be decoupled from memory accesses at said system port.

14. The cache memory apparatus as recited in claim 13 further comprising:
   a miss address register coupled to said host port and to said random access memory for storing a cache miss address signal corresponding to a word of the output data to be received from said random access memory into said write back register; and
   a hit address register coupled to said host port and to said random access memory for storing a cache hit address signal selective for a word stored in said random access memory.

15. The cache memory apparatus as recited in claim 14 further comprising a counter coupled to said miss address register.

16. The cache memory apparatus as recited in claim 15 wherein said counter increments from an address associated with a first line of data to an address associated with a subsequent line of data.

17. A cache memory apparatus comprising:
   a random access memory;
   a host port;
   a system port;
   a memory write register for buffering and selectively writing first input data to said random access memory, said memory write register being coupled between said host port and said random access memory;
   a write back register for holding and selectively furnishing first output data to said system port, said write back register being coupled between said random access memory and said system port, the first input data being provided to said random access memory from said memory write register at the same time that the first output data is provided by said write back register to said system port, the selective writing of the first input data to said random access memory and the selective furnishing of the first output data to said system port allowing memory accesses at said host port to be decoupled from memory accesses at said system port;
   a memory update register for holding and selectively providing second input data to said random access memory, said memory update register being coupled between said random access memory and said system port, wherein the holding and selective furnishing of the first output data and the holding and selective providing of the second input data allows write back and memory update operations at said system port to be decoupled from said random access memory; and,
   a read hold register coupled between said random access memory and said host port for providing second output data from said random access memory to said host port, the second input data being provided to said random access memory from said memory update register at the same time that the second output data is provided by said read hold register to said host port.

18. An apparatus as recited in claim 17 further comprising a bypass path coupled between said host port and said system port for directly allowing passage of data between said host port and said system port.

19. The cache memory apparatus as recited in claim 17 wherein said memory update register can store a plurality of words of the second input data.

20. An apparatus as recited in claim 17, wherein the first input data comprises memory write data, the second input data comprises system fetch data, the first output data comprises system write back data, and the second output data comprises burst read data.

21. The cache memory apparatus as recited in claim 20 further comprising means for masking writing of selected words of the system fetch data into said random access memory.

22. A cache memory apparatus comprising:

a random access memory;

a host port;

a system port;

a bypass path coupled between said host port and said system port for directly passing data between said host port and said system port;

a memory write register for buffering and selectively providing memory write data to one of said random access memory, said system port via said bypass path, and said random access memory and said system port via said bypass path, said memory write register being coupled to said bypass path and between said host port and said random access memory;

a write back register for holding and selectively furnishing write back data to said system port, said write back register being coupled between said random access memory and said system port, said write back register allowing the write back data to be furnished to said system port at the same time that said memory write register provides the memory write data to said random access memory;

a memory update register for holding and selectively providing system fetch data to said random access memory, said memory update register being coupled between said random access memory and said system port, wherein the holding and selective furnishing of the write back data and the holding and selectively providing of the system fetch data allows write back and memory update operations at said system port to be decoupled from said random access memory; and a read hold register coupled between said random access memory and said host port for buffering and providing burst read data from said random access memory to said host port, said read hold register allowing the burst read data to be provided to said host port at the same time that said memory update register provides the system fetch data to said random access memory.

23. The cache memory apparatus as recited in claim 22 wherein said memory update register can store a plurality of words of the system fetch data.

24. The cache memory apparatus as recited in claim 22 further comprising means for masking writing of selected words of the system fetch data into said random access memory.

25. The cache memory apparatus as recited in claim 22 further comprising:

a miss address register coupled to said host port and to said random access memory for storing a cache miss address signal, the cache miss address signal being selective for words of the fetch data to be received into said memory update register and corresponding to words of the write back data to be held in said write back register and replaced in said random access memory by the words of fetch data; and a hit address register coupled to said host port and to said random access memory for storing a cache hit address signal selective for a word stored in said random access memory.

26. The cache memory apparatus as recited in claim 22 further comprising means for identifying ones of the fetched data held in said memory update register as not corresponding to ones of the write back data held in said write back register for write back to said system port, said identifying means being selective for the ones of the fetched data to be provided from said memory update register to said random access memory.

\* \* \* \* \*

UNITED STATES PATENT AND TRADEMARK OFFICE
CERTIFICATE OF CORRECTION

PATENT NO. : 5,488,709

DATED : January 30, 1996

INVENTOR(S) : Alfred K. Chan

It is certified that error appears in the above-indentified patent and that said Letters Patent is hereby corrected as shown below:

Abstract, lines 12-13, delete "A cache memory system decouples a" and insert --The memory cache apparatus decouples the--

Column 13, line 26 (Table 1), delete "RDYOJ" and insert -- RDYO#--

Column 17, line 11 (Table 1), delete RDYOI or BRDYOJ" and insert --RDYO# or BRDYO#--

Column 17, line 73 (Table 1), delete "RAms", and insert --RAMs--

Column 25, line 28 (Table 1), delete "SW/RF" and insert --SW/R#--

Column 25, line 66 (Table 1), delete "SDOEJ and SAOEJ" and insert --SDOE# and SAOE#--

Column 27, line 20 (Table 1), delete "EADSI" and insert --EADS#--

Column 27, line 27 (Table 1), delete "SEADSI" and insert --SEADS#--

Column 27, line 28 (Table 1), delete "SMEKW/R#" and insert --SMEMW/R#--

Column 29, line 25 (Table 1), delete "sarae" and insert --same--

Column 35, line 40 (Table III), delete BALDI1" and insert --VALID1--

Column 35, line 41, delete "HAW•BHW" and insert --HA2•BHW--

Column 49, line 13, delete "nd region stop" and insert --2nd region stop--

Column 51, line 14, delete "BSS#" and insert --BS8#--

Column 52, line 35, delete "0transfer" and insert --transfer--

UNITED STATES PATENT AND TRADEMARK OFFICE
CERTIFICATE OF CORRECTION

PATENT NO. : 5,488,709

DATED : January 30, 1996

INVENTOR(S) : Alfred K. Chan

It is certified that error appears in the above-indentified patent and that said Letters Patent is hereby corrected as shown below:

Column 53, line 45, delete "to 487"

Signed and Sealed this

First Day of October, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,488,709
DATED : Jan. 30, 1996
INVENTOR(S) : Alfred K. Chan

It is certified that error appears in the above-indentified patent and that said Letters Patent is hereby corrected as shown below:

Column 58, line 21, delete "eve" and insert --even--

Column 68, line 42, delete "anther" and insert --another--

Signed and Sealed this

Thirty-first Day of December, 1996

Attest:

BRUCE LEHMAN

*Attesting Officer*     *Commissioner of Patents and Trademarks*